US011741525B2

(12) United States Patent
Pedroso et al.

(10) Patent No.: US 11,741,525 B2
(45) Date of Patent: Aug. 29, 2023

(54) ECOMMERCE SYSTEMS AND METHODS FOR PURCHASING GIFTS AND PARTS OF GIFTS USING CROWDFUNDING METHODOLOGIES AND SOCIAL MEDIA PLATFORMS

(71) Applicants: Filipe Pedroso, Bridgewater, NJ (US); Liana V. Pedroso, Bridgewater, NJ (US)

(72) Inventors: Filipe Pedroso, Bridgewater, NJ (US); Liana V. Pedroso, Bridgewater, NJ (US)

(*) Notice: Subject to any disclaimer, the term of this patent is extended or adjusted under 35 U.S.C. 154(b) by 713 days.

(21) Appl. No.: 16/112,712

(22) Filed: Aug. 26, 2018

(65) Prior Publication Data

US 2019/0066189 A1   Feb. 28, 2019

Related U.S. Application Data

(60) Provisional application No. 62/630,165, filed on Feb. 13, 2018, provisional application No. 62/550,639, filed on Aug. 27, 2017.

(51) Int. Cl.
*G06Q 30/00* (2023.01)
*G06Q 30/0601* (2023.01)
(Continued)

(52) U.S. Cl.
CPC ....... *G06Q 30/0633* (2013.01); *G06F 16/904* (2019.01); *G06Q 20/29* (2013.01);
(Continued)

(58) Field of Classification Search
CPC ........................................ G06Q 30/0601–0645
See application file for complete search history.

(56) References Cited

U.S. PATENT DOCUMENTS 7,013,292 B1   3/2006   Hsu et al.
8,595,080 B2   11/2013  Savilia et al.
(Continued)

FOREIGN PATENT DOCUMENTS

WO   2001027837   4/2001
WO   2008129502   10/2008

OTHER PUBLICATIONS

IBM, Method to Prioritize and Purchase Wish List and Registry Items, Mar. 13, 2009, ip.com (Year: 2009).*
(Continued)

*Primary Examiner* — Marissa Thein
*Assistant Examiner* — Maria S. P. Heath

(57) ABSTRACT

A computer-implemented method of purchasing gifts includes under control of one or more configured computing systems, selecting a gift item desired by a gift recipient, maintaining a list for the gift recipient that includes the selected gift item, and assigning a sales price to the selected gift item on the list. On a visual display, a processor is used for dividing the selected gift item into two or more gift parts that are available for individual purchase by gift contributors. The selected gift item is divided into the two or more gift parts on the visual display by showing a boundary on the visual display that defines a bounded area, showing the selected gift item on the visual display, inside the bounded area and surrounded by the boundary, and generating at least one dividing line inside the bounded area that divides the bounded area into two or more individual sections that are visible on the visual display, whereby each of the gift parts is located inside a different one of the individual sections. A monetary value is assigned to each of the respective gift parts that is less than the sales price assigned to the selected gift item. Gift contributors can purchase at least one of the
(Continued)

gift parts at the monetary value assigned thereto and leave comments that are unique to the gift part.

14 Claims, 44 Drawing Sheets

(51) Int. Cl.
   *G06Q 30/0283* (2023.01)
   *G06F 16/904* (2019.01)
   *G07F 17/26* (2006.01)
   *G06Q 20/34* (2012.01)
   *H04L 51/52* (2022.01)
   *G06Q 20/22* (2012.01)
(52) U.S. Cl.
   CPC ....... *G06Q 20/342* (2013.01); *G06Q 30/0283* (2013.01); *G06Q 30/0621* (2013.01); *G06Q 30/0643* (2013.01); *G07F 17/26* (2013.01); *H04L 51/52* (2022.05)

(56) References Cited

U.S. PATENT DOCUMENTS

| | | | |
|---|---|---|---|
| 8,738,460 | B2 | 5/2014 | Pottier et al. |
| 9,152,992 | B1 | 10/2015 | Vippagunta et al. |
| 9,760,936 | B1 | 9/2017 | Shaw et al. |
| 9,805,338 | B1* | 10/2017 | Ghosn .................. G06Q 30/08 |
| 2003/0200148 | A1 | 10/2003 | Razumov |
| 2004/0182924 | A1 | 9/2004 | Vereecke et al. |
| 2006/0122926 | A1 | 6/2006 | Hsu et al. |
| 2008/0189189 | A1 | 8/2008 | Morgenstern |
| 2010/0023418 | A1 | 1/2010 | Bader et al. |
| 2010/0280879 | A1 | 11/2010 | O'Sullvan et al. |
| 2011/0137749 | A1 | 6/2011 | Kwei |
| 2011/0184834 | A1 | 7/2011 | Perrochon et al. |
| 2012/0150668 | A1 | 6/2012 | Wade |
| 2013/0238465 | A1 | 9/2013 | Calixte-Civil et al. |
| 2013/0262254 | A1 | 10/2013 | Barabash |
| 2013/0282611 | A1 | 10/2013 | Avedissian et al. |
| 2014/0279197 | A1 | 9/2014 | Ainsworth, III |
| 2016/0104229 | A1* | 4/2016 | Craft .................. G06Q 30/0641 705/26.7 |
| 2016/0140632 | A1 | 5/2016 | Kandala et al. |
| 2016/0266738 | A1* | 9/2016 | Martello ............... G06F 40/177 |
| 2016/0300294 | A1 | 10/2016 | Roche |
| 2017/0032426 | A1 | 2/2017 | Salvato |

OTHER PUBLICATIONS

International Search Report for corresponding international patent application No. PCT/US2018/048036, dated Dec. 11, 2018, 5 pages.
Written Opinion of the International Searching Authority for corresponding international patent application No. PCT/US2018/048036, dated Dec. 11, 2018, 14 pages.

* cited by examiner

ECOMMERCE SYSTEMS AND METHODS FOR PURCHASING GIFTS AND PARTS OF GIFTS USING CROWDFUNDING METHODOLOGIES AND SOCIAL MEDIA PLATFORMS

CROSS-REFERENCE TO RELATED APPLICATIONS

The present patent application claims benefit of U.S. Provisional Application Ser. No. 62/630,165, filed Feb. 13, 2018, and U.S. Provisional Application Ser. No. 62/550,639, filed Aug. 27, 2017, the disclosures of which is hereby incorporated by reference herein.

BACKGROUND OF THE INVENTION

Field of the Invention

The present patent application is generally related to the retail commerce industry, and is more particularly related to electronic commerce systems ("ecommerce") used to make retail purchases.

Description of the Related Art

Individuals buy and offer gifts to enforce connections, and strengthen relationships. Gift giving is a socially and economically driven action. Gifting represents a means to an end, however, it may also be considered a means to achieve personal satisfaction.

In recent years, gift card sales have surged. When people are asked why they purchase gift cards, the top reasons provided are: (a) gift cards allow the recipient to select their own gifts (50.5%); (b) gift cards are easier and faster to buy than traditional gifts (25%); (c) it is easier to mail/ship a gift card than a traditional gift to out-of-town gift recipients (5.6%); (d) the gift recipient does not have to worry about returning merchandise (5.6%); and (e) giving gift cards helps the giver stick to their holiday budget (5.2%). The top two reasons make up 75% of the gift card influences. However, some still feel gift cards are too impersonal (25.3%). *Prosper Insights & Analytics*, Monthly Consumer Survey.

In spite of the economic growth of the gift giving industry, there is currently no system in existence that provides a method for a recipient to request the crowdfunding of an item or multiple items from contributors by permitting the recipient to search for the item(s) he or she wants in the system's database (or outside databases as may be applicable), then divide the item into parts, each part having a unique value and collectively totaling the total cost of the item with taxes, shipping and other fees as may be applicable, and then permitting the contributor to purchase one, several, or all the pieces, thereby contributing in part or in whole, to the item that the recipient wants to receive.

In addition, there is currently no system in existence that provides a method for a recipient to request the crowdfunding of multiple items from contributors by permitting the recipient to search for the items he or she wants in the system's database (or outside databases as may be applicable), organize the items into order of preference, from most desired to least desired, and then have the system divide the items, individually or collectively, into parts, each part having a unique value and collectively totaling the total cost of the items with taxes, shipping and other fees as may be applicable, and then permitting the contributor to purchase one, several, or all the pieces, thereby contributing in part or in whole, to the items that the recipient wants to receive.

Moreover, there is currently no system in existence that provides a method for a recipient to automatically receive the item or items selected once the item or items are funded by the contributor(s), and if the item is unavailable for delivery or if funding exceeds the available items, then automatically issuing a gift card or a credit, minus the applicable fees, to the recipient.

Further, there is currently no system in existence that provides an internal social connection between the recipient and the contributor(s) by providing: (a) A constant flow of social comments adjacent to the item(s); (b) Identify the part of the item with the contributor and link the social media comment with the part(s) that the contributor paid for; and (c) provide a portal of dialogue and social discussion on the system itself, without leaving to a different platform, between the recipient, the contributor(s), other individual(s), and each other.

Still further, there is currently no system in existence that allows the recipient to, at any time, select to purchase any and all the pieces remaining to be purchased, thereby contributing in part or in whole, to the processes described above.

Thus, there remains a continuing need for ecommerce systems and methods that use computer software, the internet, on-line stores, gift registries, crowdfunding methodologies, and social media platforms to overcome the above deficiencies, and allow individuals to purchase and receive gifts.

SUMMARY OF THE INVENTION

In one embodiment, a computer-implemented method of purchasing gifts preferably includes under control of one or more configured computing systems, selecting a gift item desired by a gift recipient, maintaining a list for the gift recipient that includes the selected gift item, and assigning a sales price to the selected gift item on the list. In one embodiment, the sales price may be updated periodically based upon price changes in the selected gift item, whereby the sales price will be updated to reflect the new sales price.

In one embodiment, the method includes, on a visual display, using a processor for dividing the selected gift item into two or more gift parts that are available for individual purchase by gift contributors. In one embodiment, the selected gift item may be divided into the two or more gift parts on the visual display by showing a boundary on the visual display that defines a bounded area, showing the selected gift item on the visual display, inside the bounded area and surrounded by the boundary, and generating at least one dividing line inside the bounded area that divides the bounded area into two or more individual sections that are visible on the visual display. In one embodiment, each of the gift parts is located inside a different one of the individual sections.

In one embodiment, a monetary value may be assigned to each of the respective gift parts, whereby the monetary value is preferably less than the sales price assigned to the selected gift item. In one embodiment, the method includes receiving from at least one of the gift contributors a communication for purchasing at least one of the gift parts at the monetary value assigned thereto.

In one embodiment the selected gift item shown on the visual display may be an image of the selected gift item such as one or more photographs, artwork, and/or text.

In one embodiment, the boundary shown on the visual display desirably includes one or more boundary lines that define a shape such as squares, rectangles, parallelograms, triangles, circles, ovals, objects having at least one curved line, and objects having at least one straight line. In one embodiment, the boundary may have an irregular shape. In one embodiment, the boundary may have an edge that has the appearance of puzzle pieces.

In one embodiment, the at least one dividing line may include one or more horizontal lines, one or more vertical lines, one or more diagonal lines, one or more curved arcs, one or more straight lines, one or more squiggly lines, and one or more lines having the appearance of puzzle pieces. In one embodiment, the dividing lines include intersecting horizontal and vertical lines that divide the bounded area into a matrix of square sections. In one embodiment, the dividing lines may be circles disposed within the bounded area.

In one embodiment, each gift part is located inside a different one of the individual sections. In one embodiment, the individual sections displayed on the visual display may show an available indicator when the gift part assigned to that individual section is available for purchase and an unavailable indicator when the gift part assigned to that individual section has been purchased and is unavailable for purchase. In one embodiment, the available indicator has a different visual appearance than the unavailable indicator. For example, the individual section may be darkened or opaque when the gift part is available for purchase and may be transparent or clear when the gift part has already been purchased.

In one embodiment, the method may include selecting one of the gift parts shown on the visual display, such as by moving a cursor over the part or pressing the part, and showing on the visual display the cost to purchase the selected gift part and a selector button to purchase the selected gift part. Users may engage the different parts appearing on the screen to determine the price of the part and, if the part has been purchase, the contributor who purchased the part.

In one embodiment, the method may include using the selector button to purchase the selected gift part, posting a message that is unique to the purchased gift part, and linking the posted message to at least one social media platform or one or more social media networks. In one embodiment, the social media platform may be controlled by the controller, owner, or organizer of the gifting systems and methods disclosed herein. The social media platform may include a homepage or an electronic store front or on-line store.

In one embodiment, the method may include summing the monetary values of the purchased gift parts of the selected gift item, and executing a buy order for the selected gift item when the sum of the monetary values of the purchased gift parts equals or is greater than the sales price to the gift item.

In one embodiment, a method may include notifying the gift recipient when at least one of the gift parts has been purchased by one of the gift contributors.

In one embodiment, a method may include the use of communication protocols such as homepages, social media platforms, social media networks, e-mail systems, text messaging systems, facsimile communication system, printed communications, and/or written communications for notifying gift contributors of the selected gift item desired by the gift recipient. In one embodiment, gift contributors desirably include individuals who have purchased a gift part desired by the gift recipient and potential gift contributors. In one embodiment, the terminology potential gift contributors desirably means individuals who have been made aware of the selected gift desired by the gift recipient and individuals who may be made aware of the selected gift desired by the gift recipient.

In one embodiment, a method preferably includes notifying retailers of the selected gift item, obtaining best selling price offers for the selected gift item from the retailers, and using a lowest one of the best selling price offers from the retailers as the sales price assigned to the selected gift item. The sales price may be updated on a periodic basis to obtain a better, lower, or latest price for the selected gift item.

In one embodiment, a method may include adding user selected ornamentation to the visual display that shows the selected gift item. The ornamentation may include wrapping paper and/or bows that are displayed on the visual display adjacent to or covering the selected gift item.

In one embodiment, a method includes showing a first side of the selected gift item on the visual display, whereby the first side of the selected gift item has the boundary that defines the bounded area. In one embodiment, a method includes showing a second side of the selected gift item on the visual display, whereby the second side of the selected gift item has a second boundary that defines a second bounded area. In one embodiment, a method includes showing at least a second portion of the selected gift item inside the second bounded area, and generating at least one second dividing line inside the second bounded area that divides the second bounded area into two or more second side individual sections that are visible on the visual display. In one embodiment, each of the gift parts shown on the second side of the selected gift item is located inside a different one of the second side individual sections.

In one embodiment, a method may include selecting a second gift item desired by the gift recipient, adding the second gift item to the list, assigning a priority rank order to the first and second gift items on the list to identify a higher ranked gift item and a lower ranked gift item, and dividing the second gift item into one or more gift parts that are available for individual purchase by the gift contributors. In one embodiment, the second gift item is divided into gift parts using the methodologies described herein. In one embodiment, the method desirably includes authorizing purchase of the one or more gift parts of the lower ranked gift item only after all of the gift parts of the higher ranked gift item have been purchased.

In one embodiment, a computer-implemented method of purchasing gifts preferably includes under control of one or more configured computing systems, selecting two or more gift items desired by a gift recipient, assigning a highest to lowest rank order for the selected two or more gift items to generate a prioritized list, maintaining the prioritized list for the gift recipient listing the selected two or more gift items, and assigning a sales price to each of the selected two or more gift items on the prioritized list. The sales prices may be updated periodically.

In one embodiment, the method may include dividing each of the selected two or more gift items into two or more gift parts that are available for individual purchase by gift contributors. In one embodiment, each of the selected gift items may be divided into the two or more gift parts on the visual display by showing a boundary on the visual display that defines a bounded area, showing the selected gift item on the visual display and inside the bounded area, and generating at least one dividing line inside the bounded area that divides the bounded area into two or more individual sections that are visible on the visual display. In one embodiment, each of the gift parts is desirably located inside a different one of the individual sections.

In one embodiment, a monetary value may be assigned to each of the gift parts for each of the selected two or more gift items. In one embodiment, the monetary value is preferably less than the sales price assigned to each of the selected two or more gift items. In one embodiment, the method may include receiving from at least one of the gift contributors a communication for purchasing at least one of the gift parts at the monetary value assigned thereto.

In one embodiment, the method preferably includes authorizing purchase of the gift parts of a lower ranked gift item on the prioritized list only after all of the gift parts of a higher ranked gift item on the prioritized list have been purchased.

In one embodiment, the method desirably includes after confirming that the sum of the monetary values assigned to the purchased gift parts of the higher ranked gift item equals the sales price of the higher ranked gift item, executing a purchase order for the higher ranked gift item. In one embodiment, after the prices for the respective gift parts have been established, the sales price may be updated to a new sales price, which requires the sale of fewer gift parts than originally contemplated. For example, if the original sales price was $100, each gift part may be sold for $10. If the sales price is updated to $90, the purchase order may be executed after selling nine gift pieces (9×$10=$90) rather than waiting to sell all 10 gift pieces at $10 per gift piece.

In one embodiment, a method may include displaying the selected two or more gift items on the visual display, linking the selected two or more gift items to one or more social media networks, enabling the gift recipient, the gift contributors, retailers, and third party users to generate comments that are uniquely related to each of the respective gift parts of the selected two or more gift items, and transmitting the generated comments that are uniquely related to each of the respective gift parts of the selected two or more gift items to the one or more social media networks.

In one embodiment, a computer-implemented method of purchasing items preferably includes under control of one or more configured computing systems, creating a list having items that are sold by retailers, locking together any of the items on the list that are sold by a first retailer, and prioritizing the items on the list from a highest ranked item to a lowest ranked item, whereby the items on the list that are locked together by the first retailer move together up and down the list as the list is re-prioritized.

In one embodiment, a method includes locking together any of the items on the list that are sold by a second retailer, wherein the items on the list that are locked together by the second retailer move together up and down the list as the list is re-prioritized.

In one embodiment, a method includes creating a second list having items that are sold by retailers, and moving the items that are locked together by the first retailer from the first list to the second list.

In one embodiment, a method includes prioritizing the items on the second list from a highest ranked item to a lowest ranked item, wherein the items on the list that are locked together by the first retailer move together up and down the second list as the second list is re-prioritized.

In one embodiment, a method includes creating multiple lists, each of the multiple lists having items that are sold by retailers, for each list, locking together the items on the each list that are sold by a single retailer, moving the locked items from the first list to a second list, wherein the locked items from the first list remain together as they are moved from the first list to the second list, and moving the locked items from the second list to the first list, whereby the locked items from the second list remain together as they are moved from the second list to the first list.

In one embodiment, a method includes after moving the locked items on the first list to the second list, re-prioritizing the order of the items on the second list, whereby the locked items that have been moved from the first list to the second list move together up and down in priority as the second list is re-prioritized.

In one embodiment, a method includes purchasing the items on the list that are locked together by the first retailer, and shipping the items on the list that are locked together by the first retailer jointly to a purchaser.

In one embodiment, the gifts that are locked by retailer may be moved together either automatically or manually. In an automatic embodiment, a user may engage or click a selector that is designated "sort by retailer" and the system disclosed herein will automatically sort the entire list by retailer groups. The user may then engage or click a selector to lock the sorted list, which has been sorted by retailers. In one embodiment, a user may manually drag the items or gifts from a common retailer so that they are listed together prior to locking the list by retailer groups.

In one embodiment, a computer-implemented method of purchasing items preferably includes under control of one or more configured computing systems, creating a list having items that are sold by retailers, sorting the list so that the items on the list that are sold by a common retailer are located adjacent one another on the list, locking the sorted list so that the items that are sold by the common retailer are locked together in a locked group, and prioritizing the items on the list from a highest ranked item to a lowest ranked item, wherein the items on the list that are locked together in the locked group move together up and down the list as the list is re-prioritized.

In one embodiment, a method includes moving the locked group from the first list to a second list, whereby the items in the locked group move together between the first list and the second list. In one embodiment, a locked group is moveable automatically using code or manually by dragging the locked group from the first list to the second list. In one embodiment, a locked group is moveable up and down a list automatically using code or manually by dragging the locked group.

In one embodiment, a gifting system preferably includes one or more configured computing systems, and a gift application executable in the one or more configured computing systems. In one embodiment, the gift application may include code for selecting a gift item, code for maintaining a list that includes the selected gift item, code for assigning a sales price to the selected gift item on the list, whereby the sales price may be periodically updated, and code for showing the selected gift item on a visual display.

In one embodiment, the gift application may include code for showing a first side of the selected gift on the visual display, whereby the first side of the selected gift item has a first boundary that defines a first bounded area, code for showing at least a first portion of the selected gift item inside the first bounded area, and code for generating at least one first dividing line inside the first bounded area that divides the first bounded area into two or more first side individual sections that are visible on the visual display. In one embodiment, each of the gift parts shown on the first side of the selected gift is preferably located inside a different one of the first side individual sections.

In one embodiment, the system may include code for assigning a monetary value to each of the respective gift parts that is less than the sales price assigned to the selected gift item, and code for receiving from at least one of the gift contributors a communication for purchasing at least one of the gift parts at the monetary value assigned thereto.

In one embodiment, the system may include code for showing a second side of the selected gift on the visual display, whereby the second side of the selected gift item has a second boundary that defines a second bounded area. In one embodiment, the system desirably includes code for showing at least a second portion of the selected gift item inside the second bounded area, and code for generating at least one second dividing line inside the second bounded area that divides the second bounded area into two or more second side individual sections that are visible on the visual display, whereby each of the gift parts shown on the second side of the selected gift is desirably located inside a different one of the second side individual sections.

In one embodiment, a gift item may have multiple sides. In one embodiment, only one side of a gift item may be shown on a visual display at any one time. In one embodiment, two or more different sides of a gift item may be shown on a visual display at any one time. A gift item may be rotated to move from one side to another side or to show multiple sides at the same time.

In one embodiment, when a first side of a gift item is fully purchased or selected for purchase, the second side may be shown and the first side may no longer be visible. In one embodiment, when the second side is fully purchased or selected, the third side may be shown and the first and second sides may no longer be visible. At any given time, users may scroll and/or rotate the gift item to view each side of the gift, one at a time, to look at all of the sides of all of the gifts that are available for contribution or that have been funded.

In one embodiment, the gift application executable in the one or more configured computing systems may include logic for visually distinguishing the gift parts that are available for purchase from the gift parts that are unavailable for purchase.

In one embodiment, the ecommerce systems and methods disclosed herein allow retailers to sell one or more items to an individual (i.e., a recipient), whereby the recipient requests others (i.e., contributors) to contribute to the purchase price of the one or more items, in part or in whole, by dividing each item into parts so that the contributors may purchase distinct parts of the whole item.

In one embodiment, after a gift item is broken into gift parts, the system may assign a unique identifier to each of the gift parts. In one embodiment, the unique identifier assigned to each of the gift parts is used to create and/or establish a link to a social media feed that is specific to that gift part only. For example, if a gift item has 100 gift parts, in one embodiment, 100 different links to 100 different social media feeds will be created. In one embodiment, the unique identifier assigned to each of the respective gift parts is internally created by the system for tracking all of the parts of the gift, on all sides of the gift. In one embodiment, gifts lists may be given identifiers GL1, GL2, GL3, etc.; the gifts on each of the lists may be given identifiers GG1, GG2, GG3, etc.; and the gift parts of each gift may be given identifiers GP1, GP2, GP3, etc., so that the three identifiers together GL:GG:GP will identify a unique gift part and link the unique gift part to a unique social media feed.

In one embodiment, a computer-implemented method for communicating about a product preferably includes under control of one or more configured computer systems, selecting a product having a unique identifier (UID), using the unique identifier (UID) for the selected product to link a unique social media feed to the selected product, and enabling users to access the unique social media feed for engaging in social media conversations about the selected product.

In one embodiment, a method may include selecting a second product having a second unique identifier (2UID), using the second unique identifier (2UID) for the selected second product to link a second unique social media feed to the selected second product, and enabling users to access the second unique social media feed for engaging in social media conversations about the selected second product.

In one embodiment, the unique identifier (UID) may be serial numbers, random numbers, names maintained by a central registry, and/or codes maintained by a central registry.

In one embodiment, the unique identifier (UID) assigned to the selected product may be a Stock Keeping Unit (SKU), a Universal Product Code (UPC), a Global Trade Item Number (GTIN), an International Article Number (EAN), and/or an Australian Product Number (APN).

In one embodiment, the unique social media feed may be an interactive internet-based application through which the users can share, co-create, discuss, and/or modify content. In one embodiment, the content may be user-generated content and/or pre-made content posted online.

In one embodiment, the content may be text posts, text comments, comments, digital photos, videos, audio files, digital music, voice messages, digital files, digital media, and/or data generated through on-line interactions.

In one embodiment, the users may be retailers, wholesalers, distributors, manufacturers, importers, traders, trade organizations, consumers, organizations, groups, churches, clubs, gift recipients, and/or gift contributors.

In one embodiment, a method may include creating the social media feed for the selected product, maintaining the social media feed for the selected product, and storing the one or more social media conversations about the selected product in memory and date storage.

In one embodiment, a method may include dividing the selected product into two or more product parts that appear on a visual display by generating a boundary on the visual display that defines a bounded area, showing an image of the selected product on the visual display, wherein the image of the selected product is located within the bounded area and surrounded by the boundary, and generating at least one dividing line inside the bounded area that divides the bounded area into two or more product part sections that are visible on the visual display, whereby each of the two or more product parts is assigned to a different one of the product part sections. In one embodiment, a unique product part identifier is assigned to each of the respective product part sections for distinguishing the two or more product parts from one another.

In one embodiment, a method may include using the unique identifiers for the respective product part sections to link unique social media feeds to each of the respective product part sections, and enabling users to access the unique social media feeds for engaging in social media conversations about the respective product parts.

In one embodiment, the unique product part identifiers may be serial numbers, random numbers, names maintained by a central registry, and/or codes maintained by a central registry.

In one embodiment, the unique product part identifiers assigned to the respective product parts may be a Stock Keeping Unit (SKU), a Universal Product Code (UPC), a Global Trade Item Number (GTIN), an International Article Number (EAN), and an Australian Product Number (APN).

In one embodiment, a method may include using a first unique product part identifier to input a first comment that is uniquely linked to a first product part, and transmitting the first comment that is uniquely linked to the first product part to a first social media feed that is linked to the first product part.

In one embodiment, a method may include using a second unique product part identifier to input a second comment that is uniquely linked to a second product part, and transmitting the second comment that is uniquely linked to the second product part to a second social media feed that is linked to the second product part.

In one embodiment, the boundary shown on the visual display may include one or more boundary lines that define a shape that may include squares, rectangles, parallelograms, triangles, circles, ovals, objects having at least one curved line, and/or objects having at least one straight line.

In one embodiment, the at least one dividing line may include horizontal lines, vertical lines, diagonal lines, curved arcs, straight lines, squiggly lines, and/or lines having the appearance of puzzle pieces.

In one embodiment, a system for communicating about products preferably includes one or more configured computing systems, and an application executable in the one or more configured computing systems including code for selecting a product having a unique identifier (UID), code for using the unique identifier (UID) for the selected product to link a unique social media feed to the selected product, and code for enabling users to access the unique social media feed for engaging in social media conversations about the selected product.

In one embodiment, a system may include code for selecting a second product having a second unique identifier (UID), code for using the second unique identifier (UID) for the selected second product to link a second unique social media feed to the selected second product, and code for enabling users to access the second unique social media feed for engaging in social media conversations about the selected second product.

In one embodiment, the unique identifier (UID) assigned to the selected product may be a Stock Keeping Unit (SKU), a Universal Product Code (UPC), a Global Trade Item Number (GTIN), an International Article Number (EAN), and/or an Australian Product Number (APN).

In one embodiment, the ecommerce systems and methods disclosed herein use gift registry methodologies, whereby a gift list may be created by a recipient and contributors may purchase specific items, or parts of the items, from the gift list in an order and priority as set by the recipient.

In one embodiment, the ecommerce systems and methods disclosed herein provide a portal for individuals engaged in gift giving to also participate in social media in the same portal by associating their gift contribution to their social media accounts.

In one embodiment, the ecommerce systems and methods disclosed herein connect individuals who want a particular item (i.e., a "recipient") with individuals who are willing to pay (i.e., a "contributors"), in part or in whole, towards the purchase price of the item that the recipient has requested.

In one embodiment, the systems and methods disclosed herein automatically divide a desired item into parts for easy crowdfunding. In one embodiment, the one or more contributors may pay for distinct parts of the selected item, or for the entire purchase price of the item, whereby the recipient will receive the item. In one embodiment, the systems and methods disclosed herein enable the recipient to list multiple items that the recipient may want, and prioritize the list from the most desired item to the least desired item.

In one embodiment, the ecommerce systems and methods disclosed herein allow the list to be collectively available for crowdfunding so that the contributor may pay for a portion an item that has been divided into parts, or for the entire item.

In one embodiment, the ecommerce systems and methods disclosed herein may automatically issue purchase orders in the same order of funding, as prioritized by the recipient, when an item is fully funded by the contributors.

In one embodiment, if the item that has been funded by the one or more contributors is not available in the retailer's inventory, the system may skip the unavailable item and apply the funding to the next item in the recipient's list.

In one embodiment, once all of the available items on a list, whether one item or several items, is/are executed for order or not available in the retailer's inventory, then the balance of the proceeds, minus any fees, may be automatically processed into a gift card or gift cards or store credit or any type of credit, as pre-selected by the recipient at time of item(s) selection, and delivered to the recipient.

In one embodiment, an integrated social media system allows the recipient and the one or more contributors to engage in social media while using the system.

In one embodiment, the ecommerce systems and methods disclosed herein associates the individual parts with social media communications, which, in turn, are associated with each specific part and may associate the individuals and the parts of the item(s).

In one embodiment, the ecommerce systems and methods disclosed herein enables individuals to engage in the exchange of gifts.

In one embodiment, the ecommerce systems and methods disclosed herein enhances the gifting experience by switching focus from the product to consumer satisfaction.

In one embodiment, the ecommerce systems and methods disclosed herein permit a recipient to select desired gifts. In one embodiment, the ecommerce systems and methods disclosed herein provides an easier and faster way to buy gifts because the contributor does not have to leave the home, think about what gift to purchase, find a gift, and may engage in the user experience on their computer, tablet, smart phone, or any other future media allowing the system to display on its platform. As a result, a contributor does not have to bother mailing or shipping the gift because the entire process is handled by the ecommerce system. The contributor may feel ease in knowing that he or she is contributing to the gift that the recipient actually wants to receive, thereby limiting the worry of possible returns. In one embodiment, the recipient may organize a list of items and receive them in the order of recipient's own choosing instead of traditional gift registries where the gift givers have to specifically select the gift from a general list of items. In one embodiment, the contributor may choose to purchase as many parts of the item(s) as the contributor desires within the contributor's own budget, without concern for deciding which particular gift to choose for purchase.

In one embodiment, the ecommerce systems and methods disclosed herein allow recipients to post an item or items they want to receive, divide the item into specific parts so that each part has a value that collectively all the parts together total the item(s) price, taxes, shipping fees, and other fees, whereupon a contributor may purchase one, several or all the parts, thereby providing a simplified method for the crowdfunding of an item or items.

In one embodiment, the ecommerce systems and methods disclosed herein provide a novel method of preparing wish lists and/or gift registries. In one embodiment, a recipient may add, delete and/or manage items as in traditional lists. In one embodiment, unlike traditional lists, the recipient may prioritize and receive the items in the precise order that is listed. In one embodiment, the contributor may contribute towards the item(s) by paying for the number of parts that the contributor can afford or desires to pay.

In one embodiment, the ecommerce system may execute the order for delivery as all of the parts for a specific item are fully paid or the total amount funded is sufficient to purchase the item (i.e., the whole item is fully funded), whereby such orders are completed in accordance with the priority set by the recipient. In the event that the item's order is unable to be executed, this system may automatically apply the funds to the next item on the list. In the event that there are no other items on the list and there are funds credited to the recipient by the contributor, the system may automatically issue one or more gift cards as selected by the recipient or store credit or any type of credit.

In one embodiment, the recipient may select to have the system automate grouping items by retailer name. In another embodiment, the recipient may select which items to lock together from the same retailer so that items are shipped together, thereby increasing efficiency and potentially reducing shipping costs. In one embodiment, if items are locked together from the same retailer, then when the recipient requests to the change the order of priority for item(s) contribution, the locked items are dragged together.

In one embodiment, the system may separate an item into parts to be made available to purchase as individual parts for contributors to crowdfund an item or items posted by the recipient.

In one embodiment, the system may link individual parts of the overall item to specific social media comments and interactions, thereby increasing and improving the gifting experience by personalizing and enhancing the important emotional connection between gift giver and gift receiver.

In one embodiment, the ecommerce systems disclosed herein provide methods for separating a selected item into parts for purchase, which has substantial benefits for the retail marketplace.

In one embodiment, the ecommerce systems and methods disclosed herein simplify the gift giving experience, save time for gift givers, provide the gift recipient exactly what they want, enhance the social involvement and connection in the process by encouraging social media interactions, allow the contributor to budget and spend only what they can afford, allow the recipient to ask for a particular gift and ultimately receive the exact gift that they want, and greatly enhance and simplify the entire gift giving process.

These and other preferred embodiments of the inventive ecommerce systems and methods will be described in more detail below.

DETAILED DESCRIPTION OF PREFERRED EMBODIMENTS

Definitions for various terms used in the present patent application are set forth below.

Figure 1:
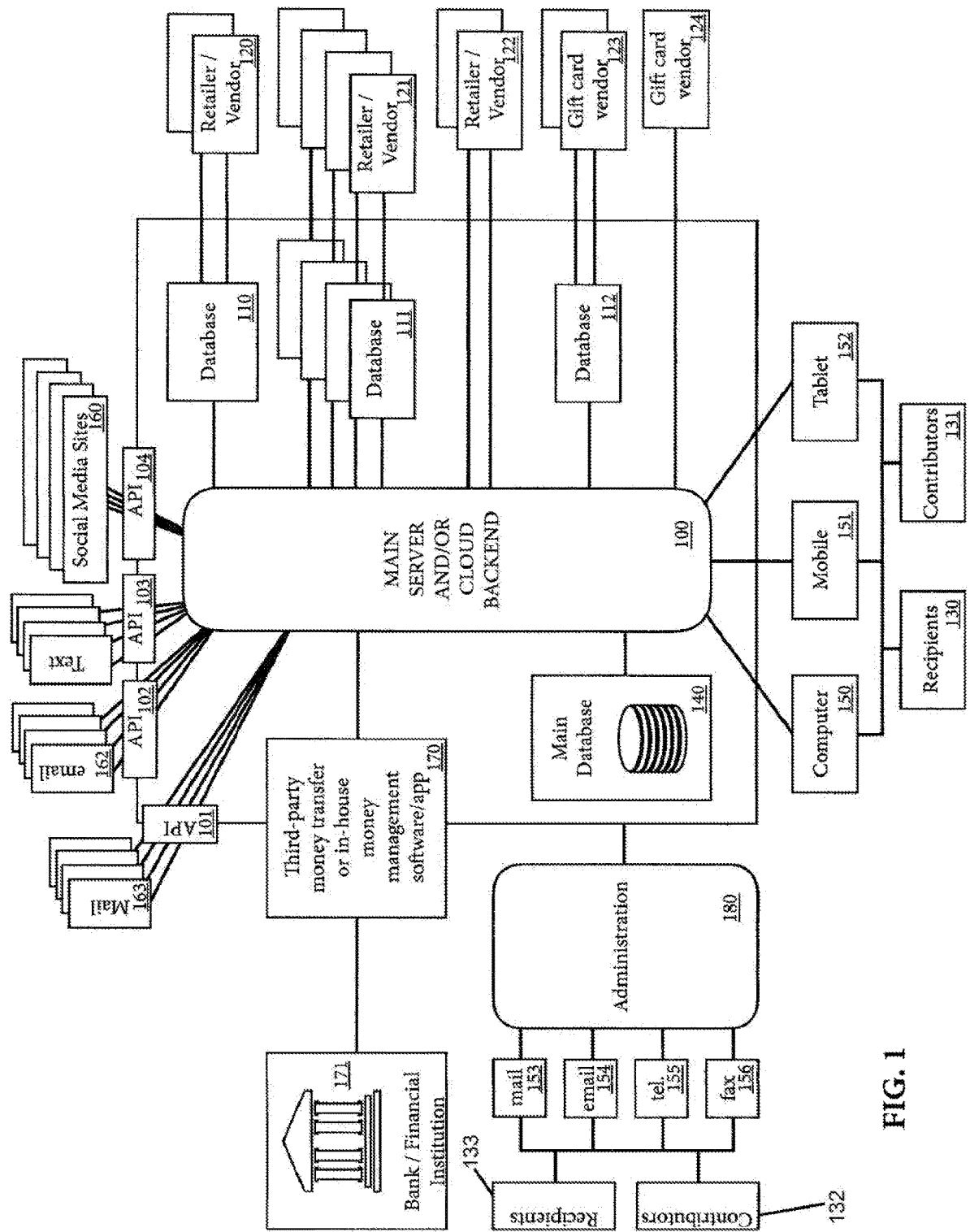
FIG. 1 shows a block diagram for an ecommerce system, in accordance with one embodiment of the present patent application.

Administration—All the office staff, management and administration running, operating and managing the entire system within the administration lines as depicted in FIG. 1.

Button—any graphical control element that provides the user a simple way to trigger an event, like searching for a query at a search engine, or to interact with dialog boxes, like confirming an action.

Buy-button—A command button or push button, and may refer to any graphical control element that provides the user a simple way to trigger an event, in this case, a purchase of an item.

Click—Synonymous with "Select".

Contributor—The party which pays for, in part or in whole, for the item or items that were posted by the recipient, and by the contributor's purchase of parts of the item, the contributor assists the recipient in acquiring, or attempting to acquire, ownership (in case of goods), or benefit or usage (in case of services), by using the services provided by the server 100. The contributor is the party who pays for the part of the item, or contributes towards the purchase to be sent to the recipient. The one who gives a gift. Also called gift giver. The contributor is identified in FIG. 1 by reference numbers 131 and 132. Gift contributors may also include potential gift contributors who have been made aware of the gift item or gift items desired by the gift recipient. Potential gift contributors may be made aware of the gift item desired by the gift recipient via various methods including but not limited to visiting websites, e-mail notification, facsimile, social media postings, text messages, phone messages, voice mails, letters, electronic notification, word of mouth, etc.

CRUD—In computer programming, create, read, update, and delete (as an acronym CRUD) are the four basic functions of persistent storage. Alternate words are sometimes used when defining the four basic functions of CRUD, such as retrieve instead of read, modify instead of update, or destroy instead of delete. CRUD is also sometimes used to describe user interface conventions that facilitate viewing, searching, and changing information; often using computer-based forms and reports.

Current funding price—An amount that is equal to or less than the total execution price. This is the actual amount needed to finalize and execute a purchase on the day and time that the current price is checked with the seller of the item, plus any applicable costs, fees, taxes, shipping and others, minus any applicable discounts and/or promotions.

Display—Any output device for presentation of information in visual or tactile form; by way of example, but not limiting, includes TV, computer monitor, mobile phone, smart phones, tablets, portable computers, projector, and any other output device for presentation as herein defined. In one embodiment, the Display is identified in FIG. 1 by reference numbers 150, 151, and 152.

Event—Any planned social event, whether public or private. Can be any occurrence. Event(s) may be organized by individuals or corporations.

Fully funded—When the item that was posted for crowdfunding has been paid in full within the time period allocated for the funding. Fully funded is reached when all the parts associated with an item have been purchased, so that there is no other part available for purchase, or the funding amount has reached an amount sufficient to execute the purchase, plus any applicable shipping, taxes, and/or additional fees. Referring to FIG. 1, the item is then ready for order execution from the server 100 to the appropriate and applicable retailer 120, 121, and 122.

Gift card—is a prepaid stored-value money card usually issued by a retailer or bank to be used as an alternative to cash for purchases within a particular store or related businesses. As used herein, gift card is also meant to encompass the meaning of store credit, a financial amount issued by the retailer, bank or a company, in an electronic format or other document, that may be used for purchase at the issuing retailer's, bank's, or company's business with the same value as if the credit was cash.

Figure 4:
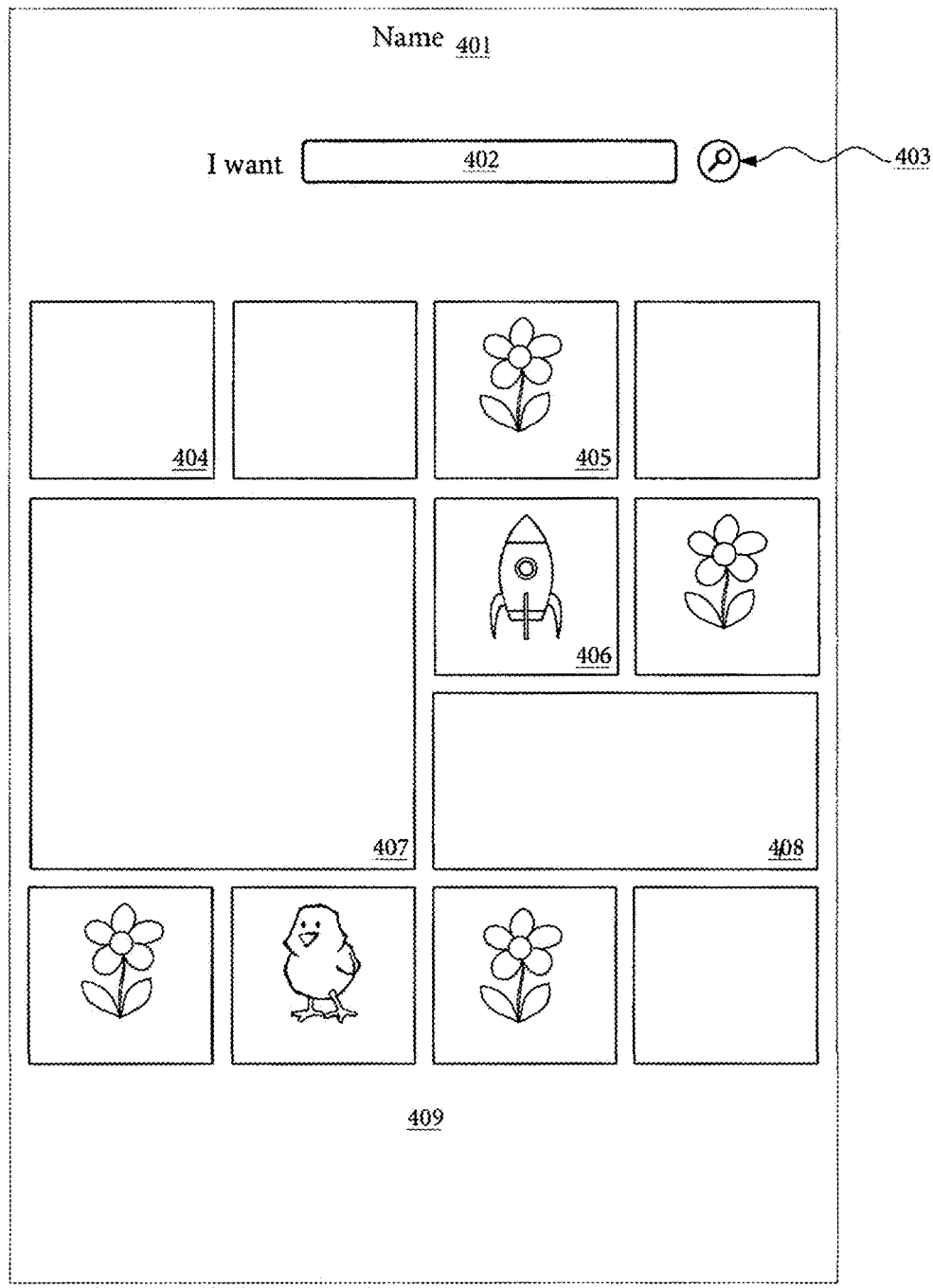
FIG. 4 shows a visual display for an electronic device, in accordance with one embodiment of the present patent application.

Homepage or home page—The initial or main web page or application page of the website or browser or application that is the user interface between the user experience on the display and the server 100 (FIG. 1). The home page is used to facilitate navigation to other pages on the site by providing links to items, retailers, program functions, sign-in, account management, information, news, advertisements, and providing a search bar. Referring to FIG. 4, the homepage may, but without limitation, include a header 401, a search bar 402 and execution icon 403, recommended items for selection or purchase, retailer information, links to outside website(s) and/or application(s), advertisement, random items, product information, social media platform integration, information, and any other text or graphic.

Figure 22:
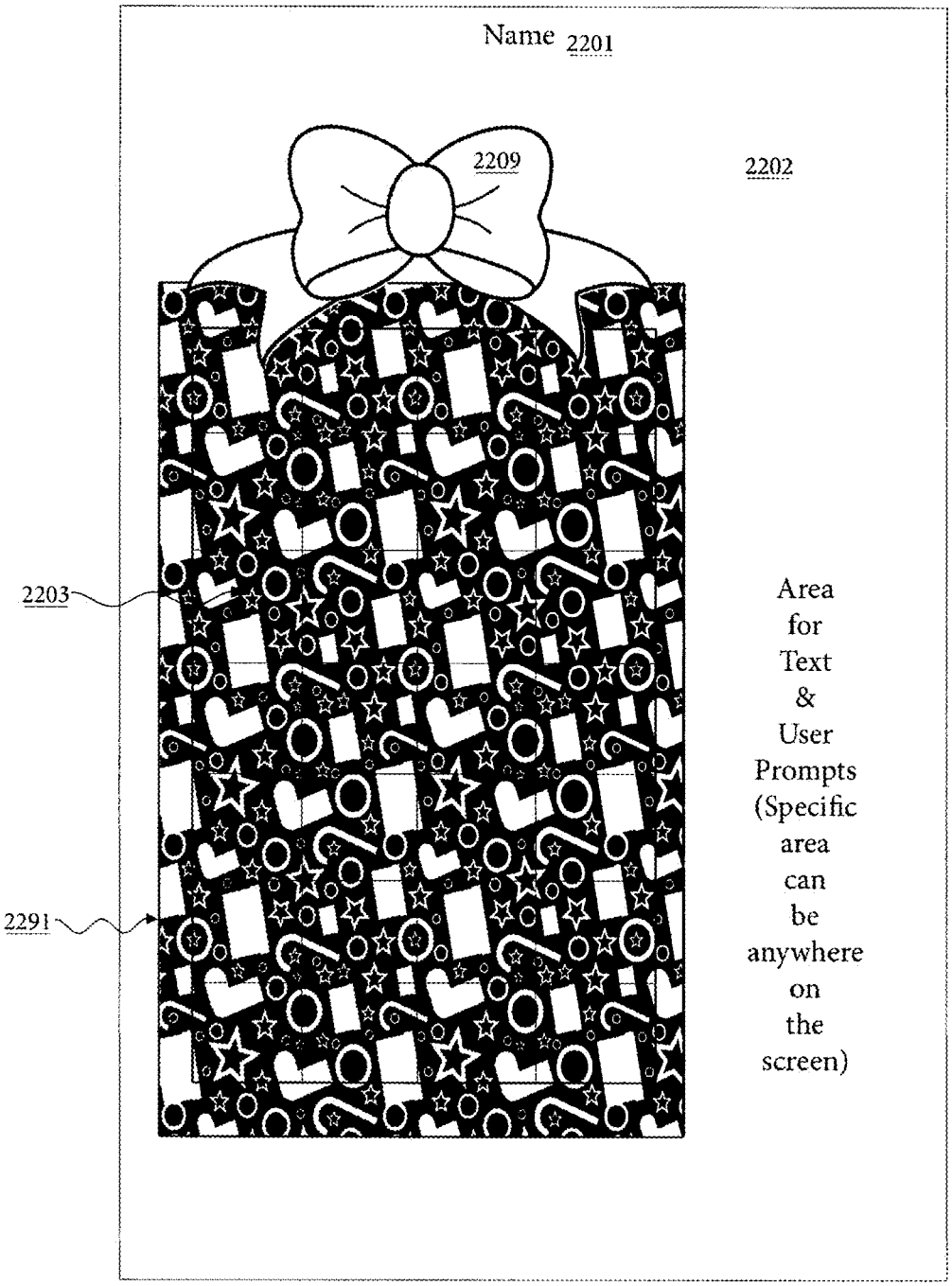
FIG. 22 shows a visual display for an electronic device, in accordance with one embodiment of the present patent application.
Figure 23:
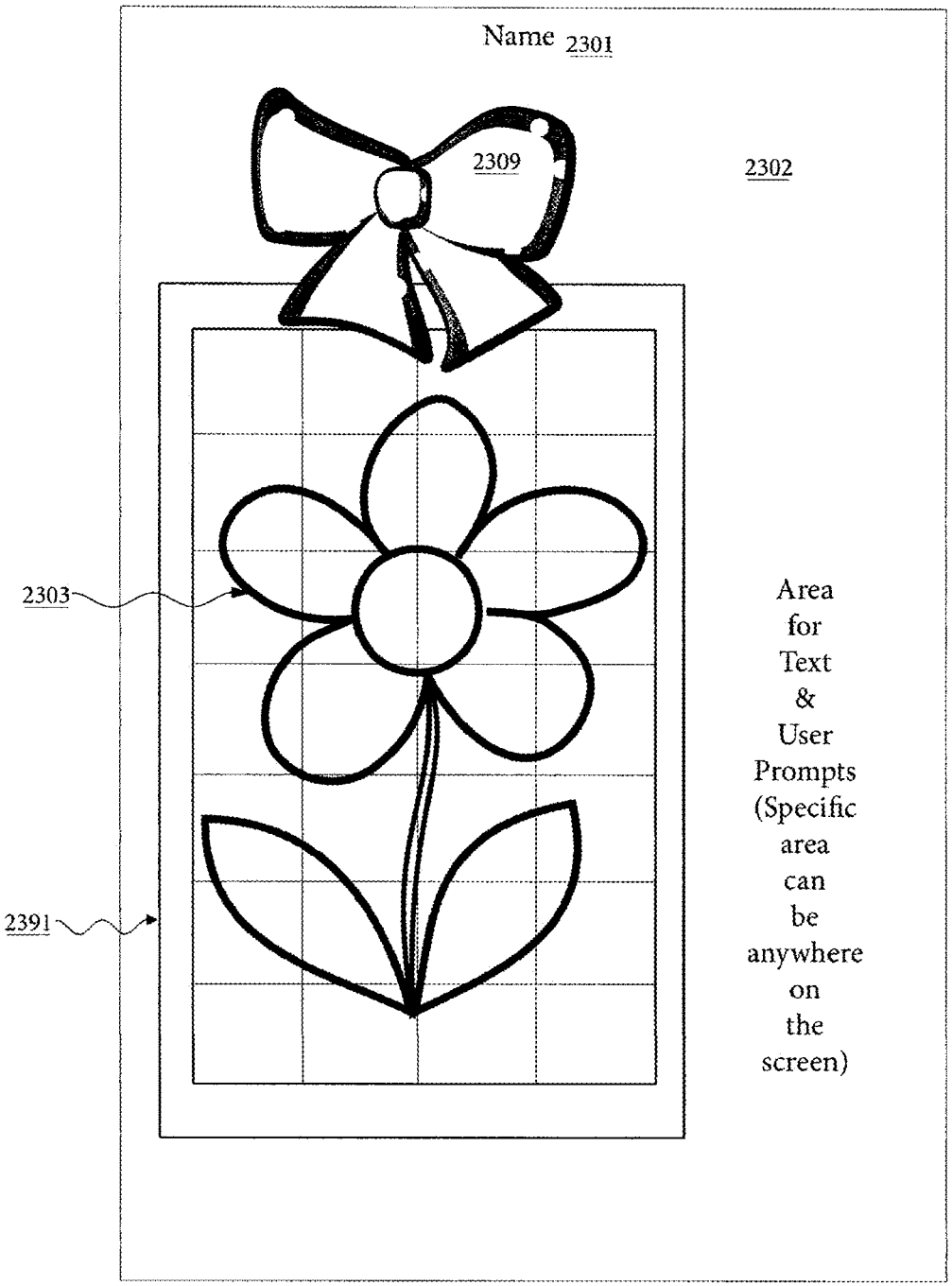
FIG. 23 shows a visual display for an electronic device, in accordance with one embodiment of the present patent application.

Item—Any identifiable product which may be given its own identification code or identified by its unique characteristics. In one embodiment, the item is the product that is sold by the retailer, available to search and find through the homepage or search bar, and may be selected for purchase or crowdfunding using the systems and methods disclosed herein. By way of examples, in the diagrams, items are sometimes demonstrated in FIG. 5 as a flower 503, rocket 507, and chick 508; in FIG. 6 as a flower 603, rocket 604, and chick 606; in FIGS. 7-16, 18-21, and 23, as a flower 703, 803, 904, 1003, 1103, 1203, 1303, 1403, 1503, 1603, 1803, 1903, 2003, 2103 and 2303; in FIG. 22, the item 2203 is behind the decoration 2291; these figurative images of the flower, rocket and chick are used as hypothetical examples of item's graphical images.

Item container—The area and space defining the outermost area of the item, its border and anything within these borders; the border may be visible with a physical marking or invisible without any markings. By way of example, the item container is the area in FIG. 7 identified as 791; or in FIG. 8 identified as 891; or in FIG. 9 identified as 991; or in FIG. 10 identified as 1091; or in FIG. 11 identified as 1191; or in FIG. 13 identified as 1304.

Page—The page usually means what is visible in the display and scrollable beyond what is visible but without having to click any hyperlinks or buttons other than a scroll bar or swiping with a finger or input device. When scrolling through the page, if the page dimensions are larger than the visual display, the user may view different parts of the page.

Figure 7:
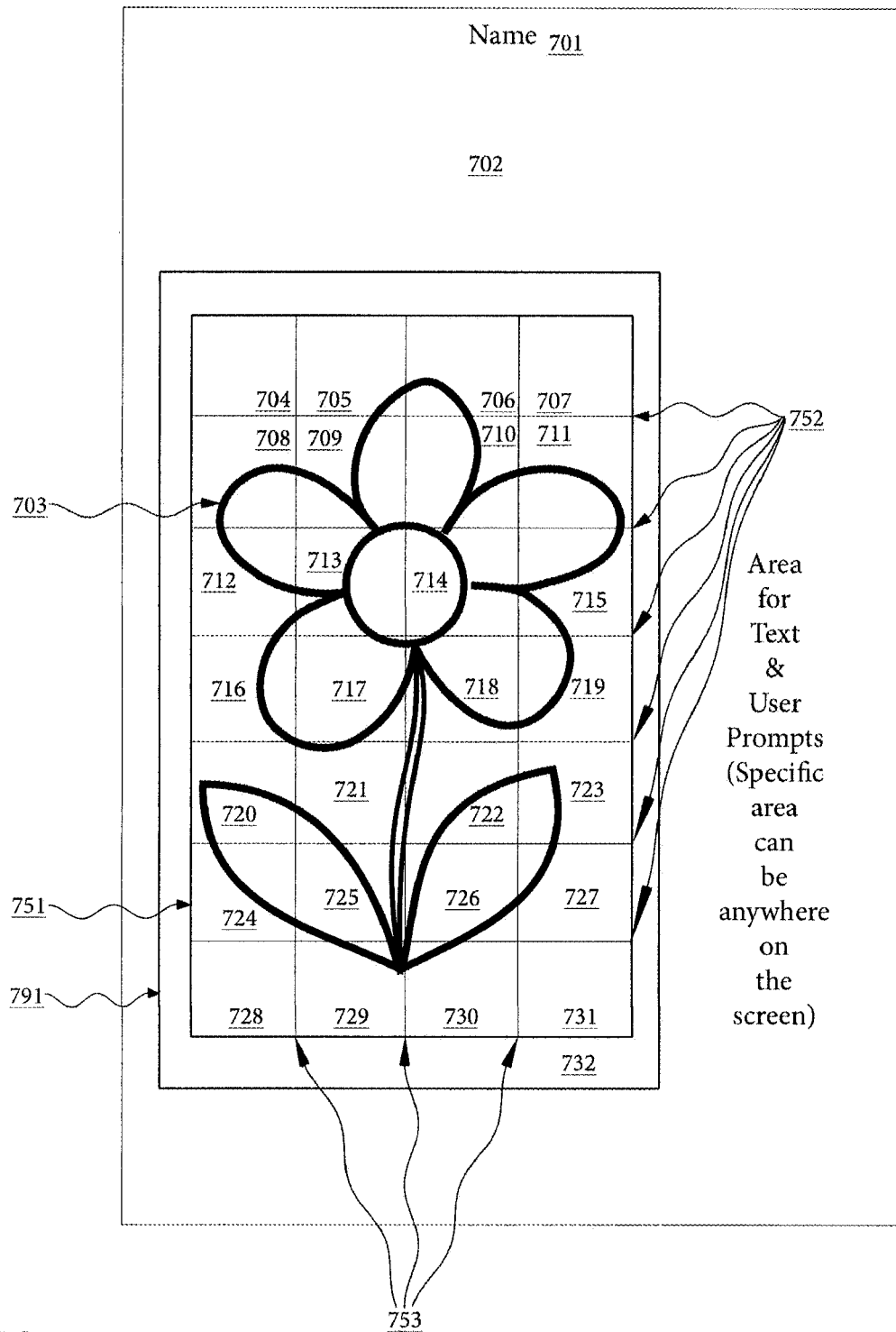
FIG. 7 shows a visual display for an electronic device, in accordance with one embodiment of the present patent application.
Figure 8:
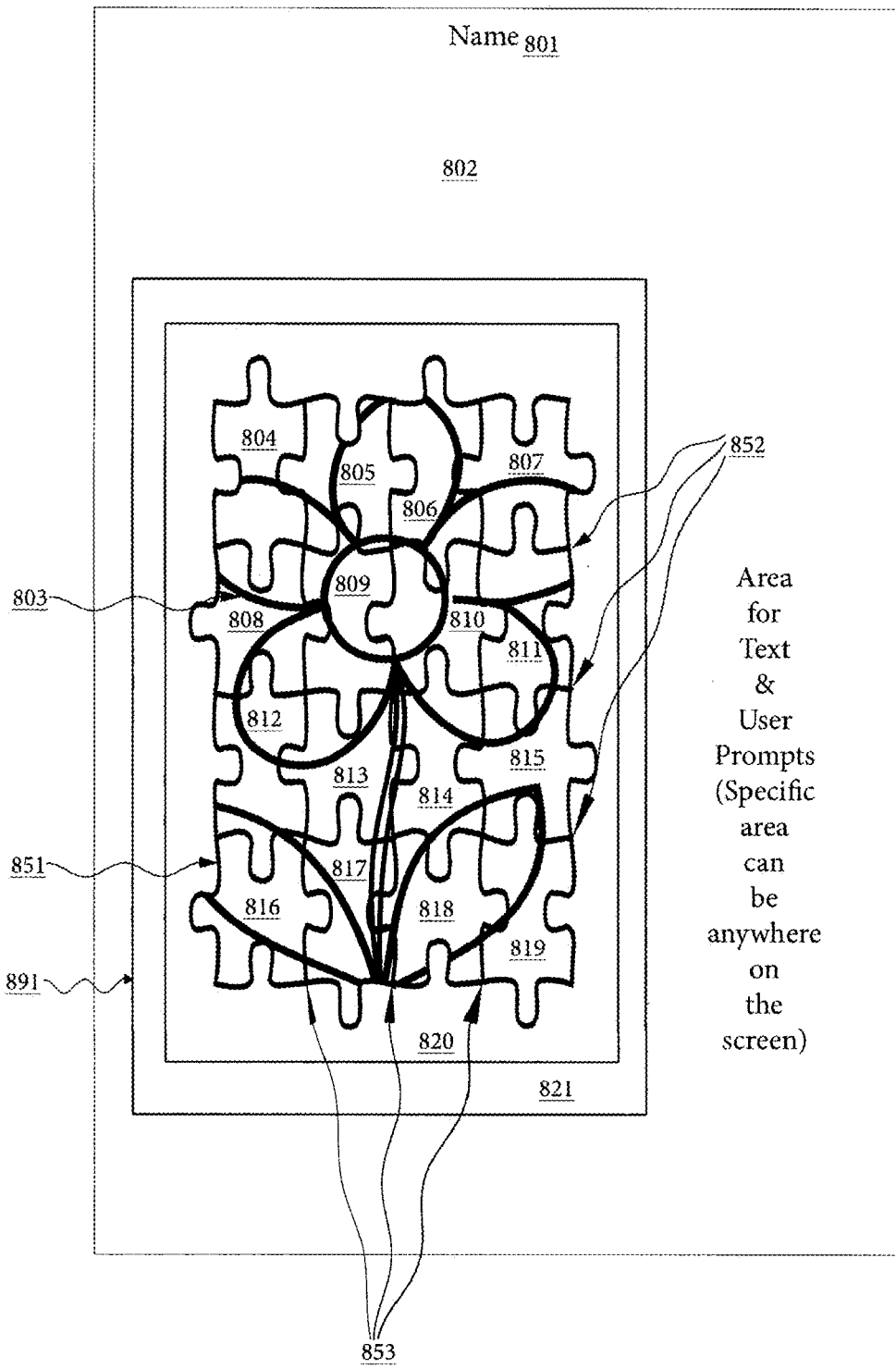
FIG. 8 shows a visual display for an electronic device, in accordance with one embodiment of the present patent application.
Figure 9:
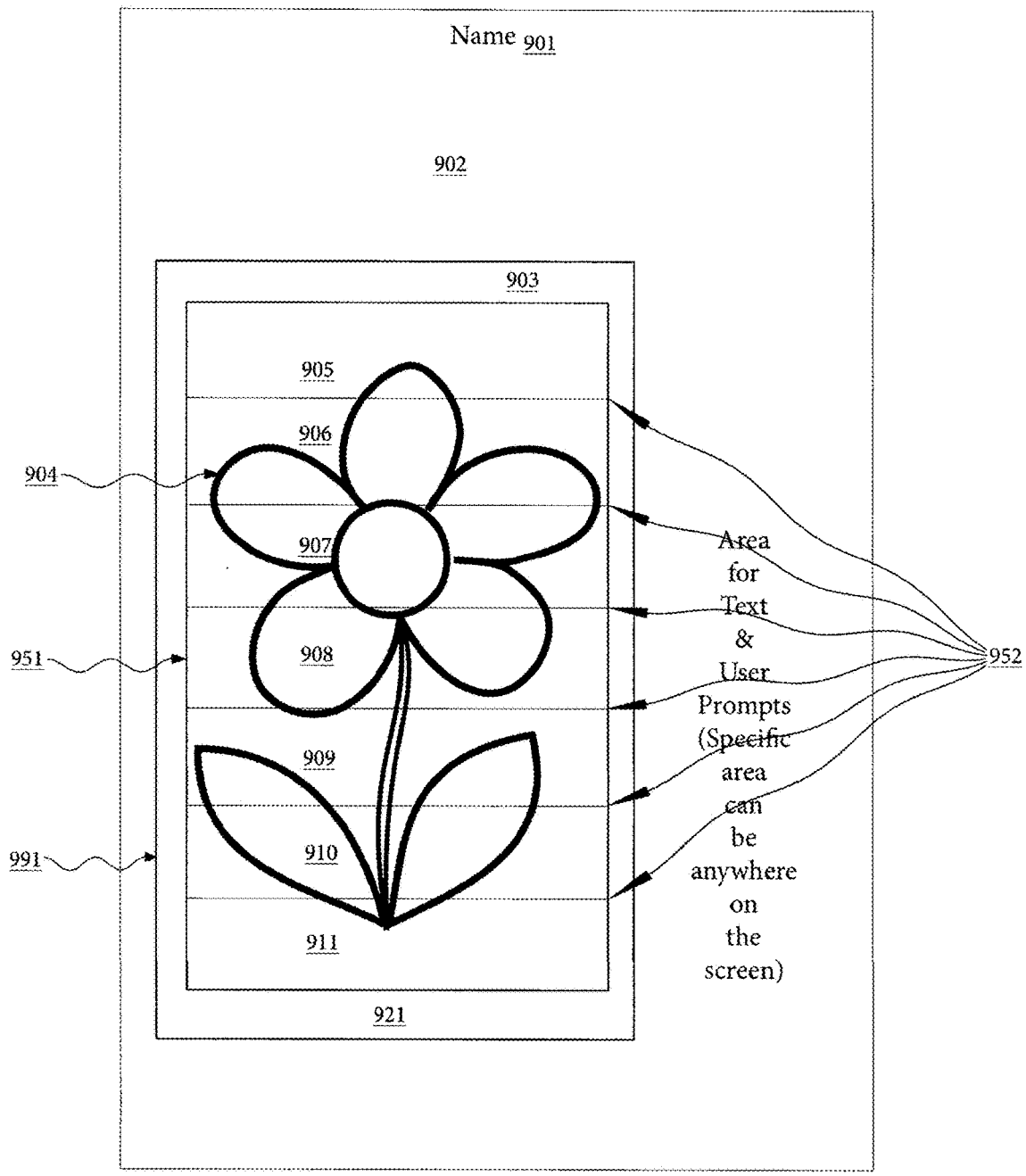
FIG. 9 shows a visual display for an electronic device, in accordance with one embodiment of the present patent application.
Figure 10:
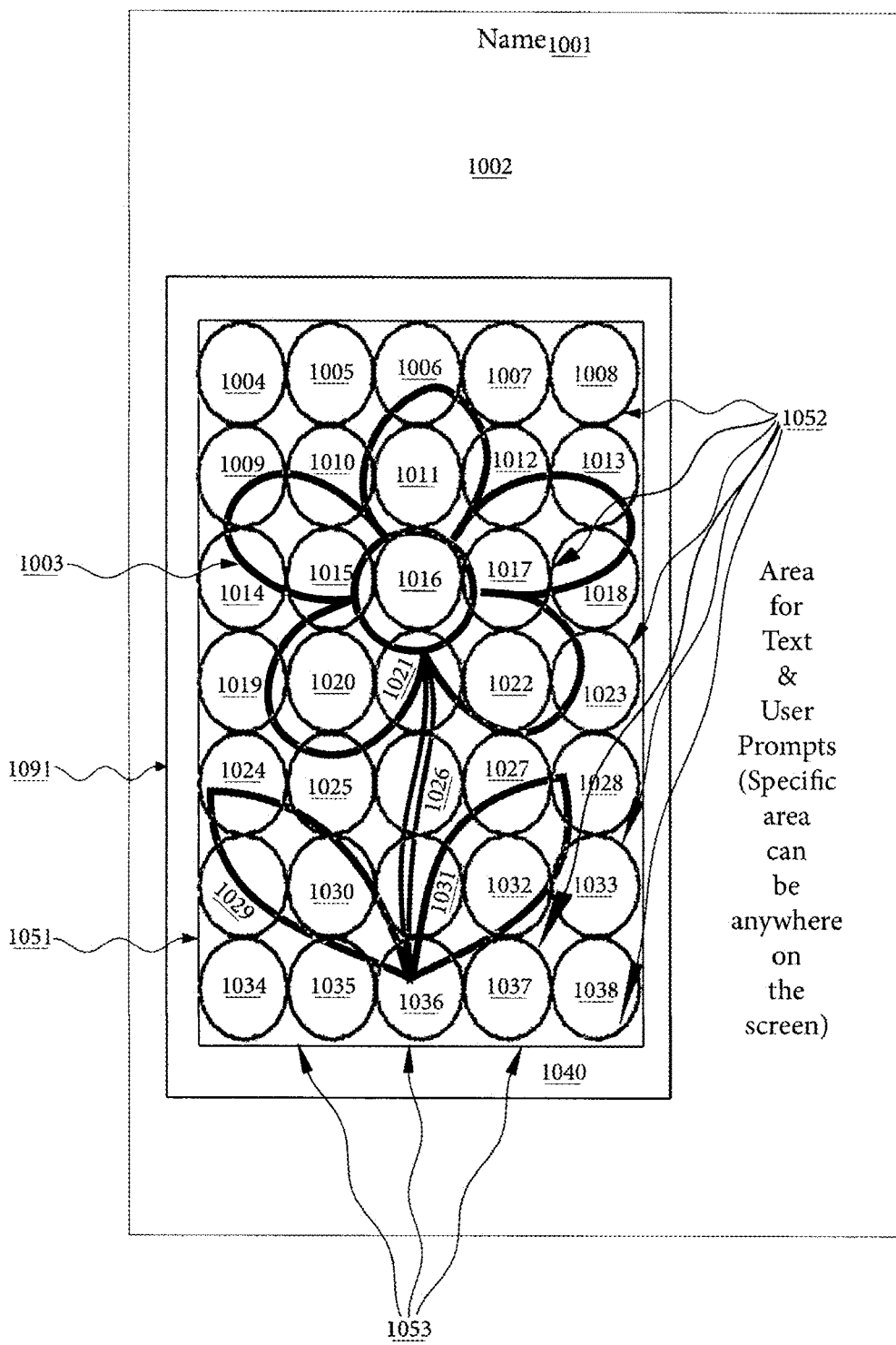
FIG. 10 shows a visual display for an electronic device, in accordance with one embodiment of the present patent application.
Figure 11:
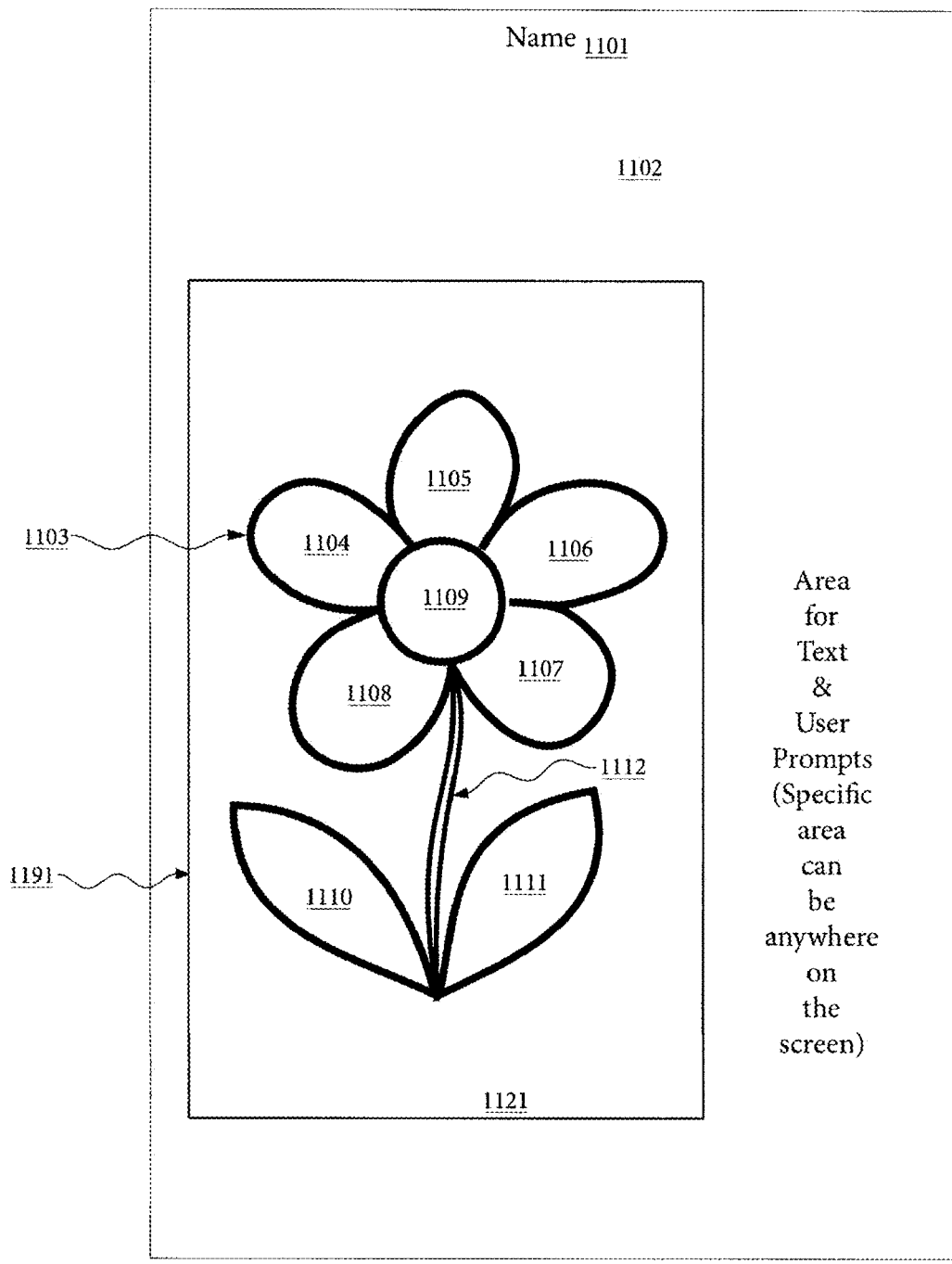
FIG. 11 shows a visual display for an electronic device, in accordance with one embodiment of the present patent application.
Figure 12:
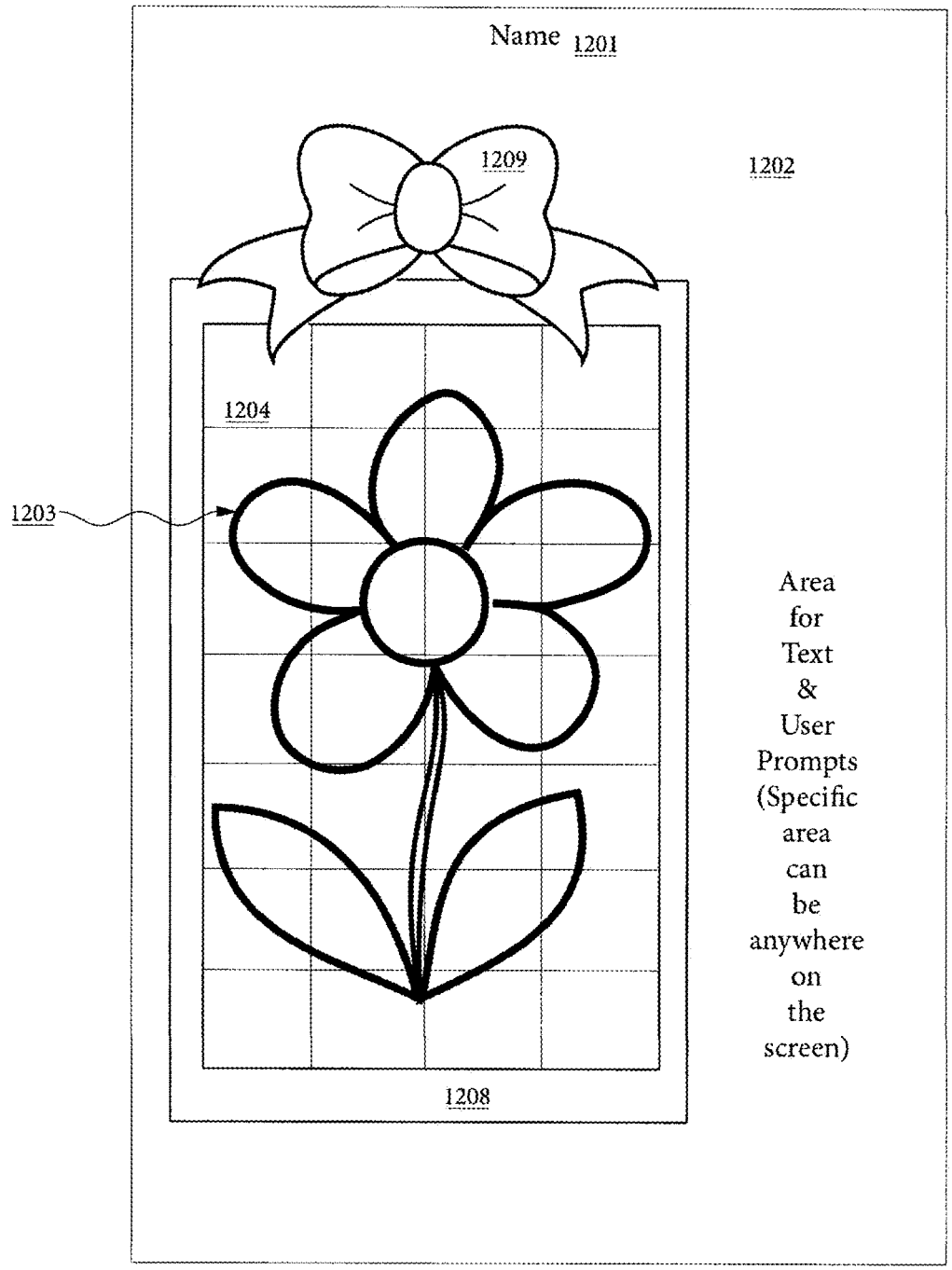
FIG. 12 shows a visual display for an electronic device, in accordance with one embodiment of the present patent application.
Figure 13:
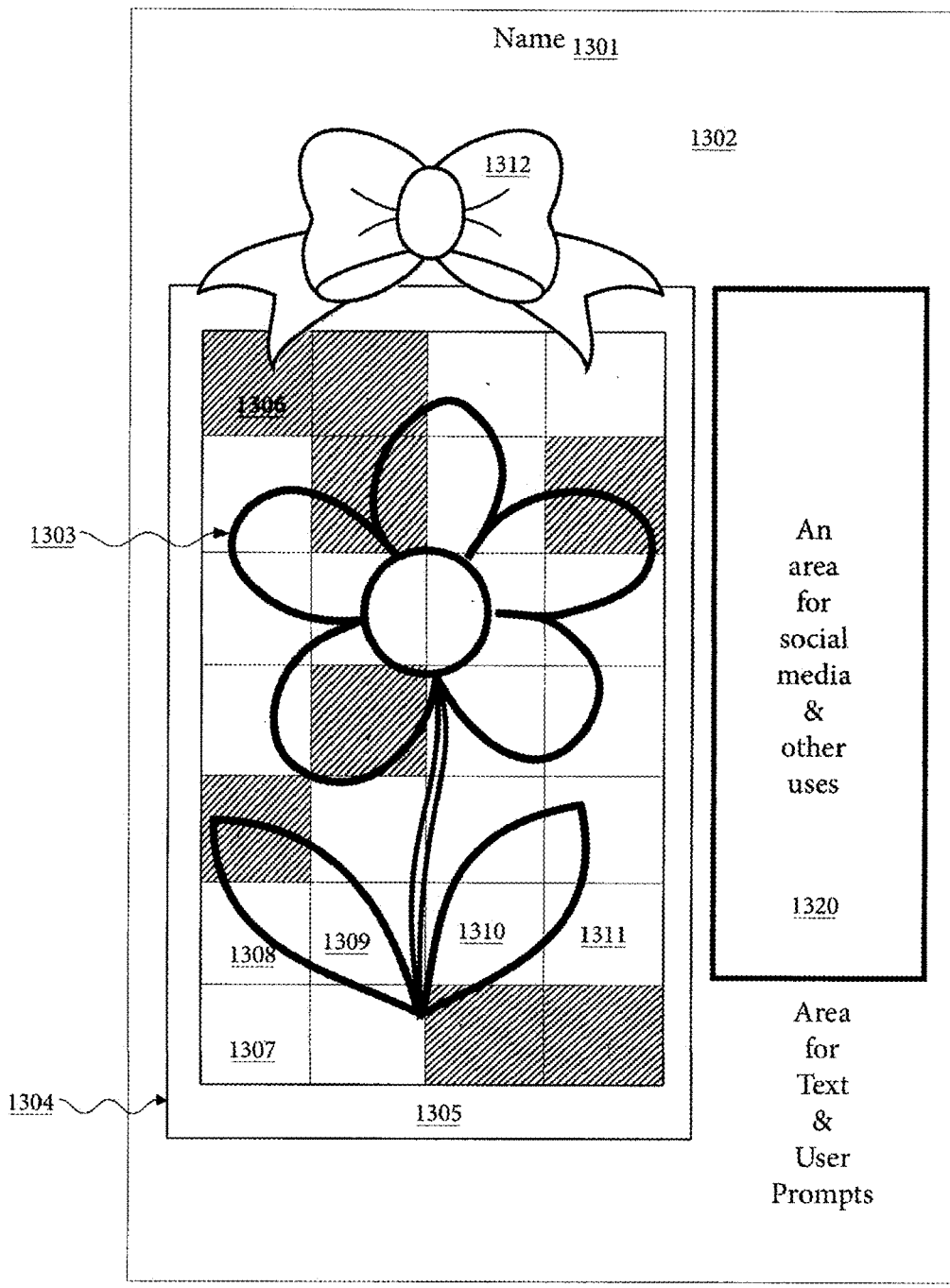
FIG. 13 shows a visual display for an electronic device, in accordance with one embodiment of the present patent application.
Figure 14:
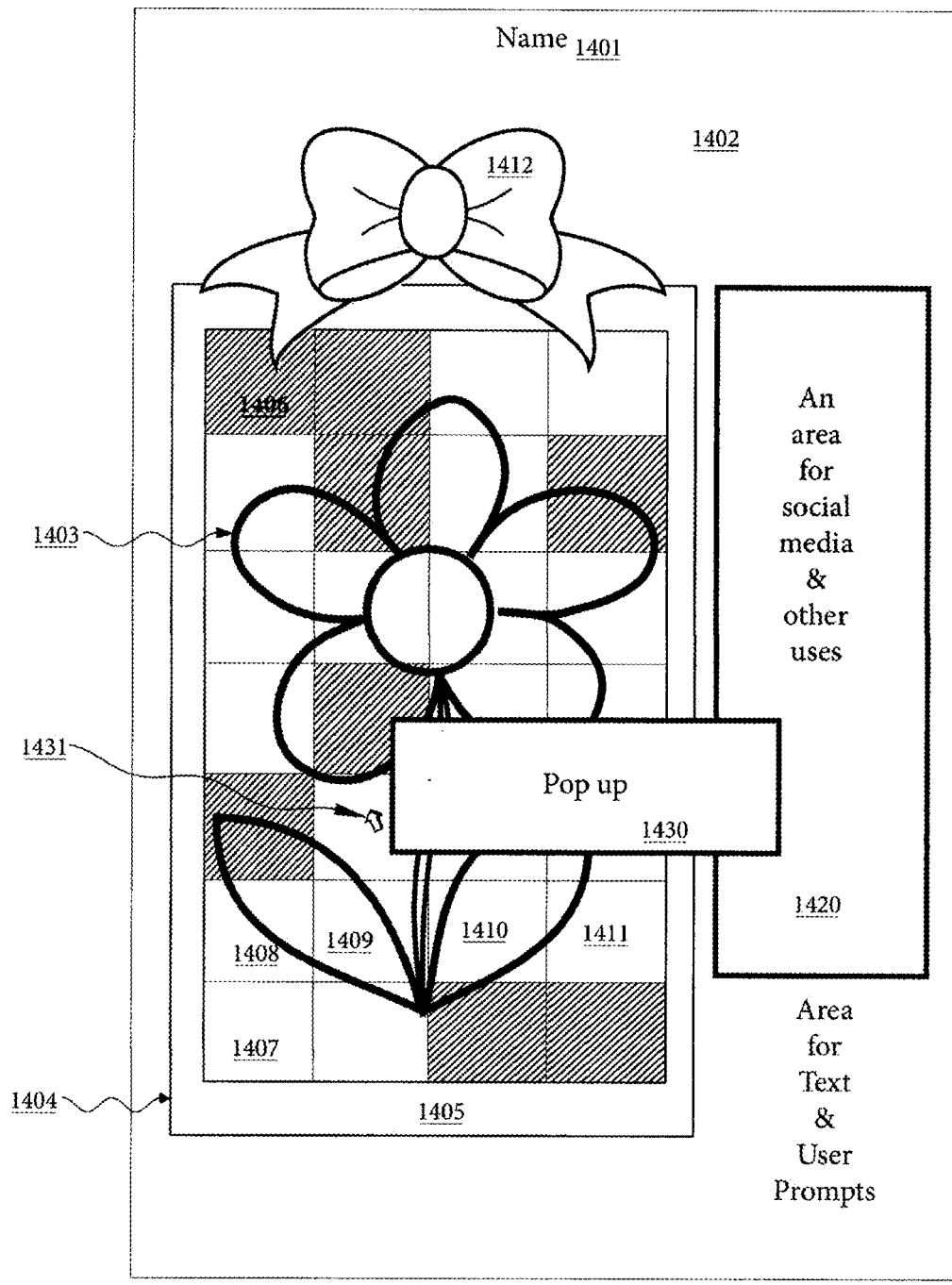
FIG. 14 shows a visual display for an electronic device, in accordance with one embodiment of the present patent application.
Figure 15:
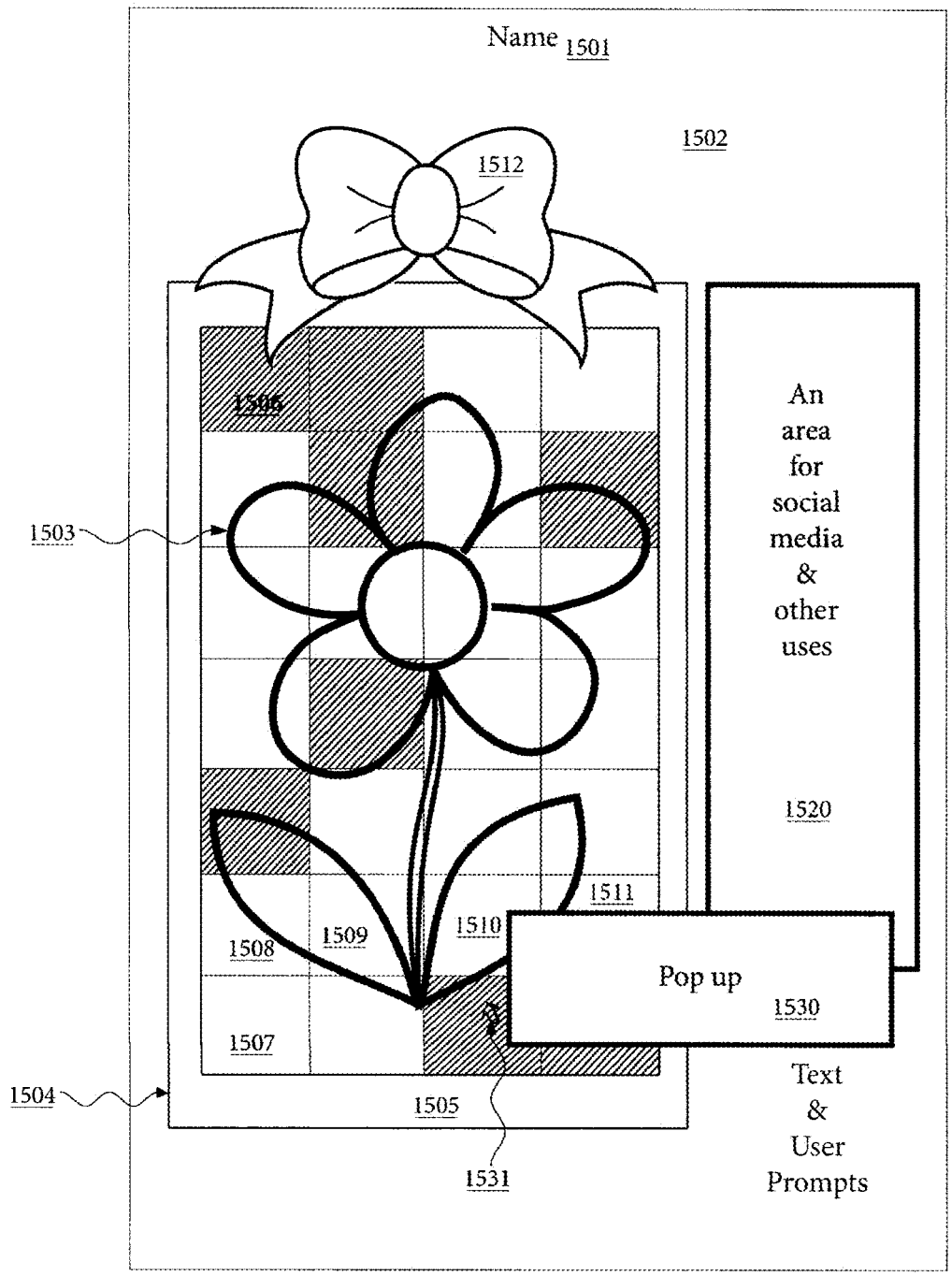
FIG. 15 shows a visual display for an electronic device, in accordance with one embodiment of the present patent application.
Figure 16:
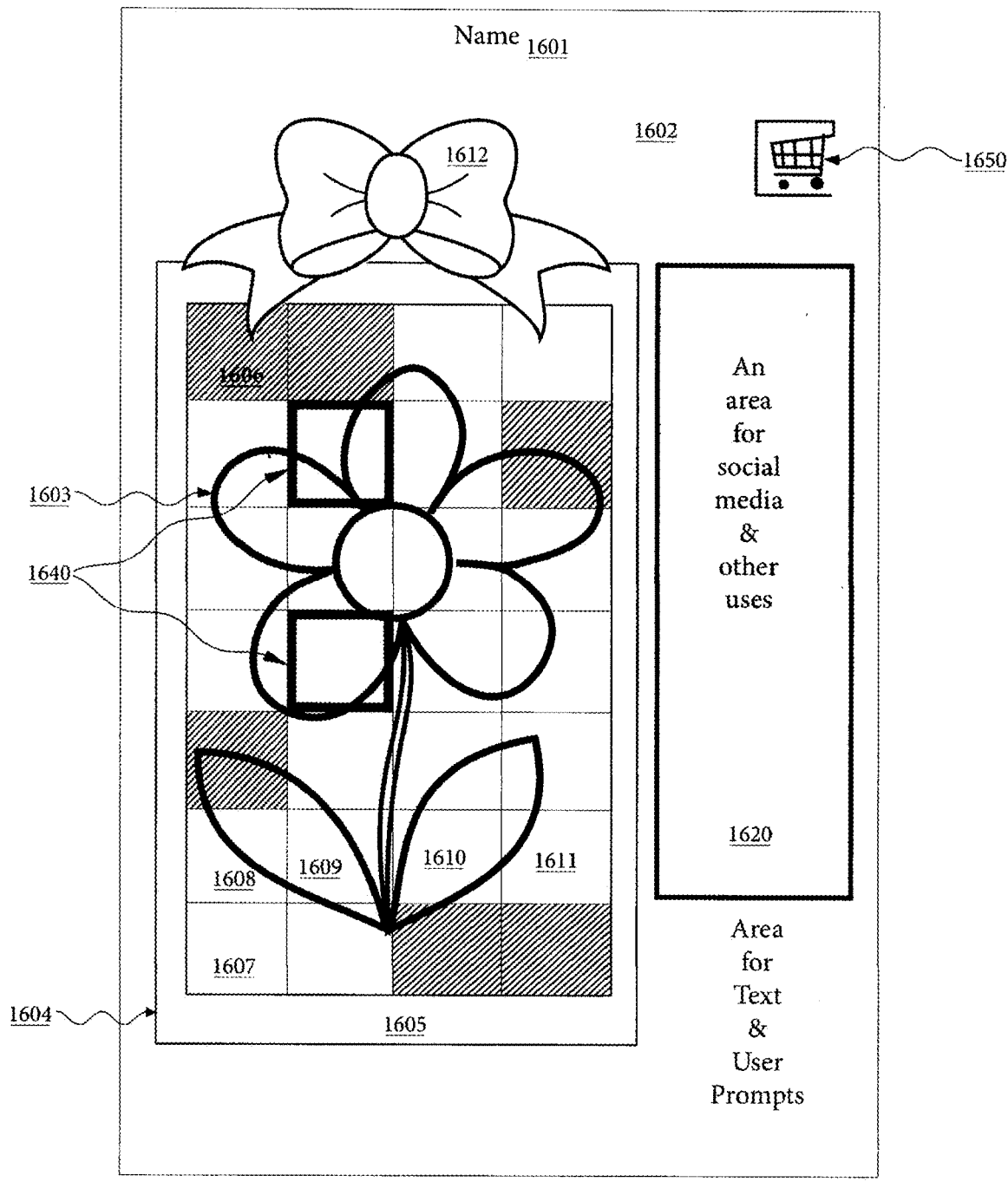
FIG. 16 shows a visual display for an electronic device, in accordance with one embodiment of the present patent application.

Part—A symbolic piece of the whole purchase, having a monetary value, that is a tool used in this method of crowdfunding that is invented by the systems and methods in this Application. An item that is posted by the recipient for purchase by the contributors is divided into parts. Each part may be purchased by the contributors. By way of example, these parts are identified in FIG. 7 by reference numbers 704-731; FIG. 8 by reference numbers 804-819; FIG. 9 by reference numbers 905-911; FIG. 10 by reference numbers 1004-1038; FIG. 11 by reference numbers 1104-1112; FIG. 12 by reference numbers 1104; FIG. 13 by reference numbers 1306-1311; FIG. 14 by reference numbers 1406-1411; FIG. 15 by reference numbers 1506-1511; FIG. 16 by reference numbers 1606-1611; and FIG. 18 by reference numbers 1806-1807 and 1861-1872.

Posted item—The item selected by the recipient to be sold using the systems and methods disclosed herein, by dividing the whole into individual parts so that each part may be purchased independently.

Recipient—The party which acquires, or attempts to acquire, ownership (in case of goods), or benefit or usage (in case of services), by using the services provided by the server 100 to post an item or items for others to pay by purchasing parts of the item so that collectively the payers fund the purchase of the item or items. The recipient is the party who selects and request the item, to receive the item, but have others pay for the item. The one who receives a gift. Also called gift receiver. The recipient is identified in FIG. 1 by reference numbers 130 and 133.

Retailer—A person, shop or business that sells goods; also includes wholesalers; vendors; service providers; resellers; outlets; travel agents or others in the sale of travel services and packages; person, shop or business that sells travel related items, services or packages; also includes entertainment sales; a person, shop, or business that engages in any and all sales. Gift card vendor is also a retailer, but is in the business of selling gift card or gift cards. Retailers are identified in FIG. 1 by reference numbers 120-122 and 123-124.

Figure 5:
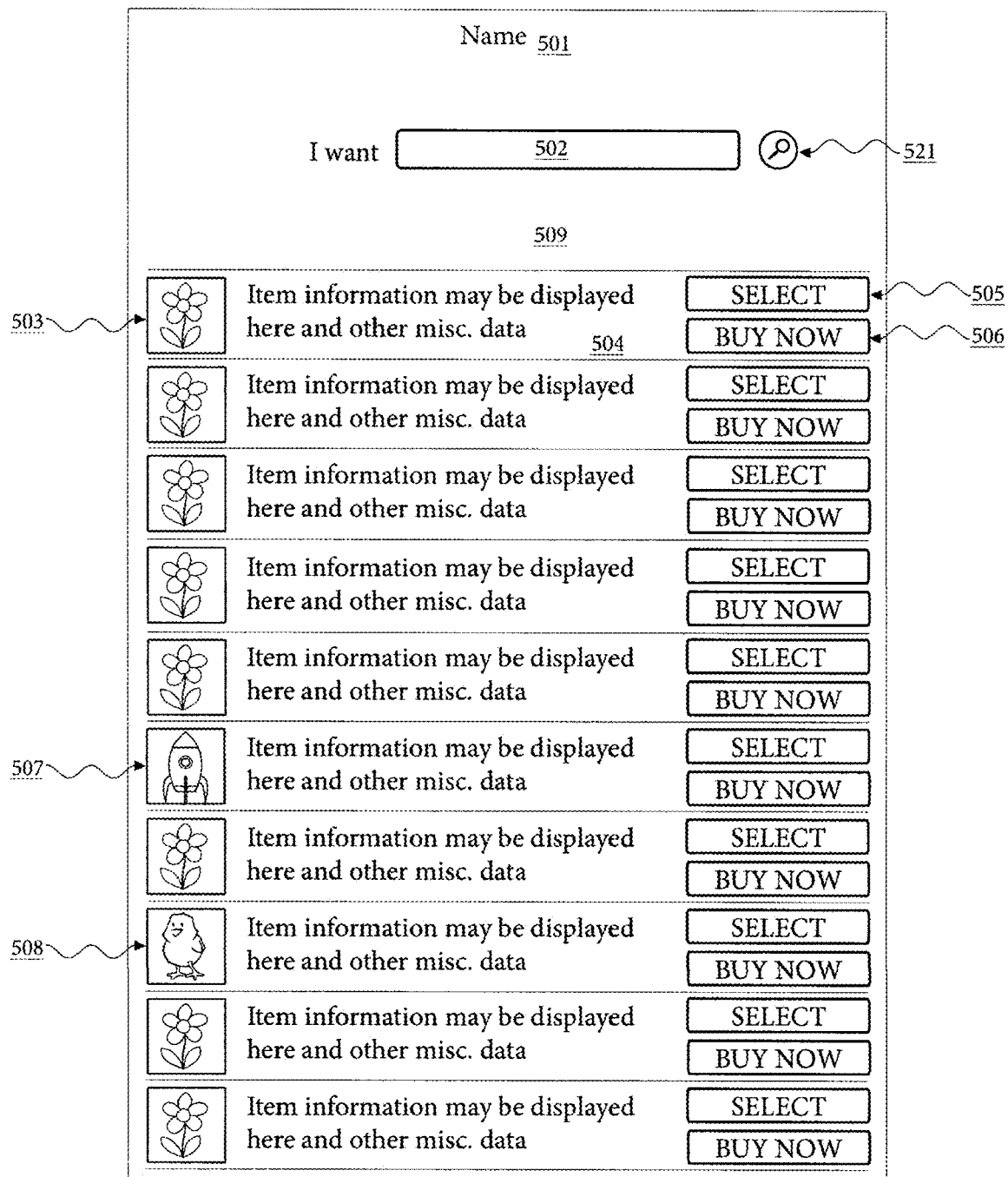
FIG. 5 shows a visual display for an electronic device, in accordance with one embodiment of the present patent application.

Search bar—A search box or search field; a graphical control element used in computer programs, such as file managers or web browsers, and on web sites. A single-line text box or search icon (which may transform into a search box on click activity) with the dedicated function of accepting user input to be searched for in a database. On a web page used to allow users to enter a query to be submitted to a search engine server-side script on server 100, where an index database 140 is queried for entries that contain one or more of the user's keyword research. The search bar is identified by way of example in FIG. 4 by reference number 402; FIG. 5 by reference number 502; and FIG. 6 by reference number 602. In one embodiment, the search bar is provided with an execution icon allowing the user to enter text in the search bar and either enter Return or select the icon to commence a search. In one embodiment, the execution icon is provided by way of example in FIG. 4 by reference number 403; FIG. 5 by reference number 521; and FIG. 6 by reference number 621. The search bar and its execution icon may be located on any image placed in display. Although the search bar and its execution icon are not shown in every diagram, this is not an indication that such search bar and its execution icon are not present.

Select—Action of the user moving a pointer to a certain location on a screen (pointing) and then pressing a button on a mouse. The select action may also be accomplished with a tablet or smart phone by using a finger and touching a screen on the particular spot that the user desires for some action to happen. Other methods may exist that accomplish this same task, such as using a stylus, a pointer device, a touchpad, or any other way, and such methods, now and in the future existing that perform the same task, shall be inclusive of this definition.

Figure 2A:
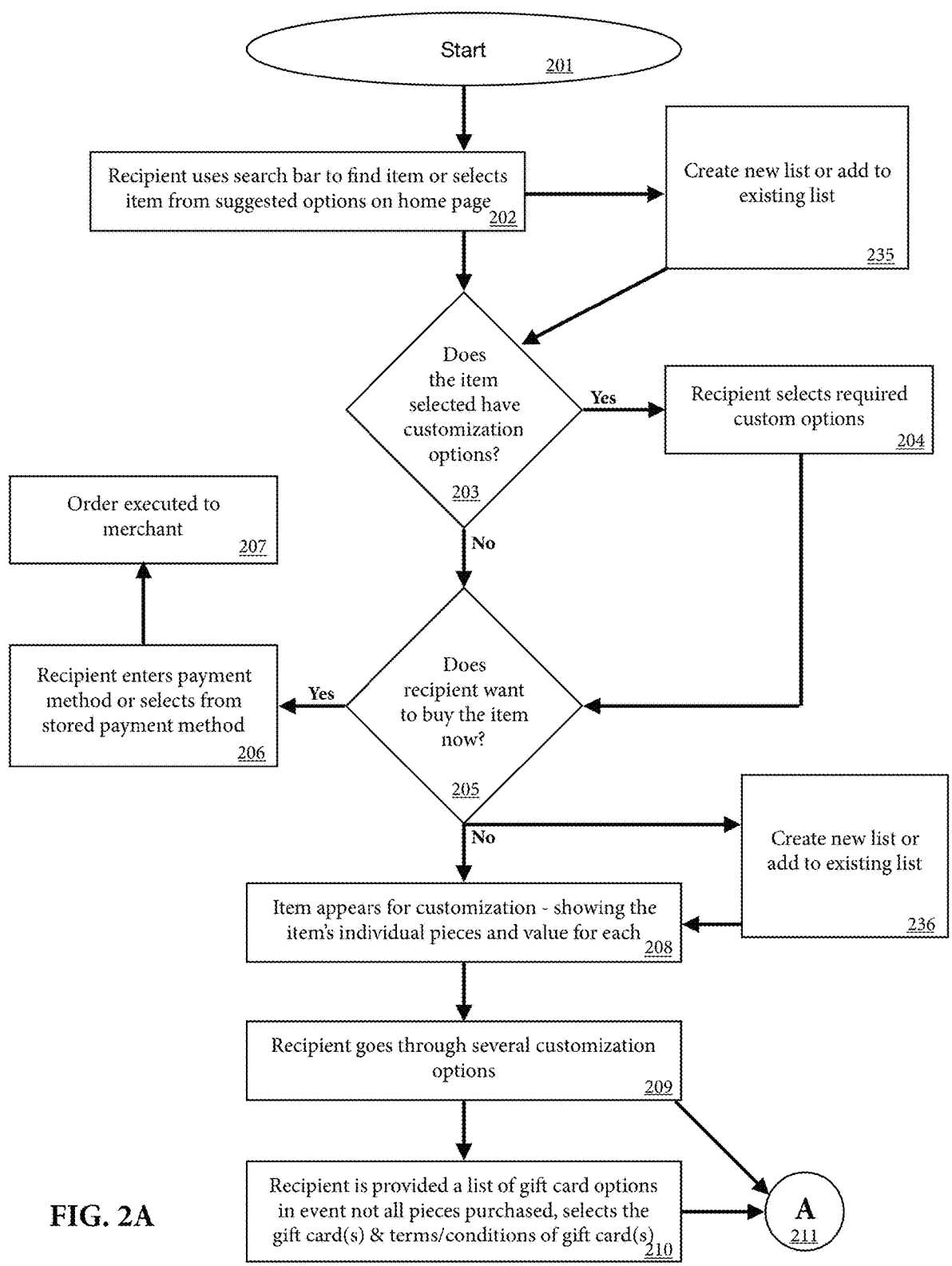
FIG. 2A is a flow chart associated with the ecommerce system of FIG. 1 showing a first series of steps performed by a recipient in order to select an item, prepare the item for purchase into parts, customize the item and its artwork, notify potential contributors, and advertise the item and its selection, in accordance with one embodiment of the present patent application.

Select-button—A command button or push button, may refer to any graphical control element that provides the user a simple way to trigger an event, in this case, to select an item to enter into step 201 (FIG. 2A).

Server—A computer program or software that provides functionality for other programs or devices; in the context of this material, the "server" when written by itself indicates the backend programming that runs the ecommerce systems and methods disclosed herein. The server is identified in FIG. 1 by reference number 100.

Shopping cart—A place where a temporary record of items selected for eventual purchase from an online vendor's website is stored, and is graphically displayed on a screen in any graphical manner possible. The way in which a shopping cart is graphically displayed on the screen is neither important nor relevant. By way of example, a shopping card may be displayed as is provided in FIG. 16 (reference #1650), but this graphical representation can be displayed in a method that doesn't look like a traditional store shopping cart. For example, the shopping cart may be simply a display of a numeric total amount for purchase. In one embodiment, the shopping cart may be identified in any matter, such as "Total contribution: $." It is contemplated that there are an infinite number of ways to represent a shopping cart. In one embodiment, clicking or hovering a mouse over a shopping cart may display the items that have been placed into the shopping cart and/or starts the checkout process for payment of the items in the shopping cart. Any reference to "shopping cart" in this document, whether specially referenced to FIG. 16 or FIG. 17 or otherwise, is meant to be defined as herein provided in this definition.

Social media platform—A computer-mediated technology that facilitate the creation and sharing of information, ideas, interests and other forms of expression via a virtual community and network. This platform is hosted by the server 100 (FIG. 1) and provides an interactive Internet-based application; User-generated content, such as text posts or comments, digital photos or videos, and data generated through all online interactions; Users may create service-specific profiles for the website or app that are designed and maintained by the administration 100; Social media facilitate the development of online social networks by connecting a user's profile with those of other individuals or groups. In one embodiment, the social media platform is shown by way of example in FIG. 13 by reference number 1320; FIG. 14 by reference numbers 1420 and 1430; FIG. 15 by reference numbers 1520 and 1530; FIG. 16 by reference number 1620; and FIG. 18 by reference number 1820. Although the social media platform in demonstrated in these diagrams and perhaps not in others, the fact that the social media platform is not demonstrated in other diagrams is not significant to whether or not such social medial platform is present. For example, there is no indication of a social media platform in FIGS. 4-12 and 17, however, a social media platform may be displayed and be an active part of the user experience in such sections and any other part of the user interface.

System-event—An system generated method of storing, organizing and displaying data pertaining to a specific event between the time that the user creates the system-event to the date and time that the event is concluded; system-events are created by the user by selecting a date, time and/or place for an event, and, optionally, inviting guests.

System-memory—A system-event after the date and time that the system-event has concluded. A system-event becomes a system-memory.

Time duration period—The time period that an item and/or list is available to contributor(s) to purchase a part or parts of an item or the items within a list. The time period starts when the recipient posts the item or list and concludes on a set date determined by the system and methods and/or the recipient. The deadline date of the time duration period concludes the time period for contributor(s) to purchase part(s).

Total execution price—The overall cost of the item, plus any applicable costs, fees, taxes, shipping and others, minus any applicable discounts and/or promotions. This is the amount needed to execute a successful transaction with a Retailer.

Touchscreen button—A spot on the electronic visual display of an information processing system that may be used by a user to give input or control with a simple or multi-touch gesture such as by touching the screen with a stylus or finger(s). Typically, but not always, a touch-screen button may have the visual appearance of a button so that when touched or pressed, it results in an action or activity to proceed thereafter, which may be similar to activities often associated with common physical buttons.

User—Any person or corporation who uses a computer, a mobile device, smart phone, tablet or any other device using a network service to connect with the server 100 (FIG. 1). A user may be a contributor, a receiver, and/or anyone else.

Various embodiments of the present patent application disclose a software platform that enables one or more individuals to post and request an item he or she wants, have the item split into parts so that each part has a monetary value for crowdfunding, then share the request for the item with others through various means, allow others to contribute towards the purchase of the item, provide a social media network to the item purchase experience, connect and link social media to each individual part, and allow the recipient to receive the item they wish to get. In one embodiment, the systems and methods provides to the contributor the information of what item the recipient wants to receive, allows the contributor to participate in the social aspect of giving an item to the recipient by engaging in an internal social media platform, contribute whatever number of parts the contributor feels is within his or her budgetary means, pay for the parts the contributor selected, and share and advertise the recipient's item with others to assist in the crowdfunding of the item.

In one embodiment, an ecommerce system includes a display with a homepage. Some embodiments may provide a search bar where a user may enter any item he or she wants to receive from the funding of the contributors. In one embodiment, the homepage may display advertising from third-party contributors. In one embodiment, the homepage may display ideas for items that the recipient may want. In one embodiment, the homepage may display retailers, and this may lead to links of items available from the retailer or other retailer information. In one embodiment, the homepage may include an account sign-in page and/or information about the ecommerce system and its workings and/or social media platforms.

Referring to FIG. 1, in one embodiment, the recipient 130 may operate the ecommerce system disclosed herein using any internet-based device having the ability to access the main server 100, such as by using a computer 150, a mobile device 151, a tablet 152, or any future means of communicating and displaying the information from the main server 100.

Referring to FIG. 1, in one embodiment, a recipient may communicate with the administration 180 by way of telephone or email or alternate ways of communication that may currently exist or may exist in the future. In one embodiment, the recipient may communicate directly with the administration 180 and the administration may connect to the server 100 and initiate the flow as provided in FIG. 2A at step 201, and go through all the steps in the flow chart as shown and described in FIGS. 2A-2D.

Referring to FIG. 1, in one embodiment, the recipient 130 may access and communicate with the server 100 through one of the devices 150, 151, and 152 previously described herein, or any other device that permits connection and communications with the server 100. In one embodiment, the recipient's internet-connected device communicates with the server 100. In one embodiment, the server 100 may provide a display to the recipient, typically with a homepage, FIG. 4, although the specifics of the display image in the homepage may vary.

Referring to FIG. 4, in one embodiment, the homepage may include, without limitation, a heading or other text 401 and 409, a search bar for user interface and text entry 402, an execution icon 403, various items of interest or possible interest to the user 404-408. Alternately or in conjunction, the homepage may display a header 401, retailer information, retailer names, links to other website, social medial platform, advertisements, or any other information, graphic, text, or a variation of all, in any component of the homepage, including but limited to the elements associated with reference numbers 401-409. In one embodiment, the homepage may include social media posts from other users, the current user, groups, and/or retailers.

In one embodiment, social media posts in their various formats are intermixed with the ecommerce marketplace. Users may post social media posts in various places within the platform's experience. In one embodiment, users may be able to post social media posts while viewing their own or others' social media homepage experience, a location for a feed for social media posts to be viewed. In one embodiment, users may be able to post social media posts while viewing a product. In one embodiment, users may be able to post social media while viewing retailer(s)' social media homepage(s) or retailer(s)' pages. In one embodiment, users may be able to post social media while viewing a user's wish list or gift list. In one embodiment, users may be able to post social media posts while viewing an event page. In one embodiment, social media is a significant part of the ecommerce system and ecommerce experience disclosed herein, and both social media and ecommerce are integrated with each other and part of a unified experience.

In one embodiment, a page may exist that has a combination of any of these components mixed together into a unified experience. In one embodiment, a page displaying any of the social media post experiences previously described herein are mixed with retailer products. Referring to FIG. 4, in one embodiment, any of the areas marked by reference numbers 404, 405, 406, 407 and/or 408 may include products, advertisements, social media posts, and/or any other graphic and/or text, mixed together through the visual experience.

Referring to FIG. 2A, in one embodiment, the system may start with step 201. The recipient at this point may click on any of the items displayed on the home page or enter an item that the recipient is searching for in the search bar 402 shown in FIG. 4. In one embodiment, the recipient may also find the product in the retailer page, or anywhere else where the product may be displayed.

The search bar 402 (FIG. 4), 502 (FIG. 5), and 602 (FIG. 6) and/or its execution icon 403 (FIG. 4), 521 (FIG. 5), and 621 (FIG. 6), may be displayed in any area of the display at any time during any user interface; the lack of a search bar and its execution icon in any diagram is not indicative of whether or not a search bar and/or its execution icon is displayed.

Referring to FIG. 1, in one embodiment, the server 100 may search its main database 140 for the item searched or the item clicked. Referring to FIG. 2A, in one embodiment, if the item is clicked 202, the system will preferably move to step 208. However, if a search 202 was requested using the search bar, the system may show a search result including as many items as reasonably match the search criteria, additional items of relevance or similarity, and any additional items as may be listed on the display; this search result display is demonstrated by way of example in FIG. 5. An alternate way of showing the search result is demonstrated by way of example in FIG. 6. There are many variants to the textual and graphical way of displaying a search result, and the diagrams are not limiting to the methods that may be used.

Figure 6:
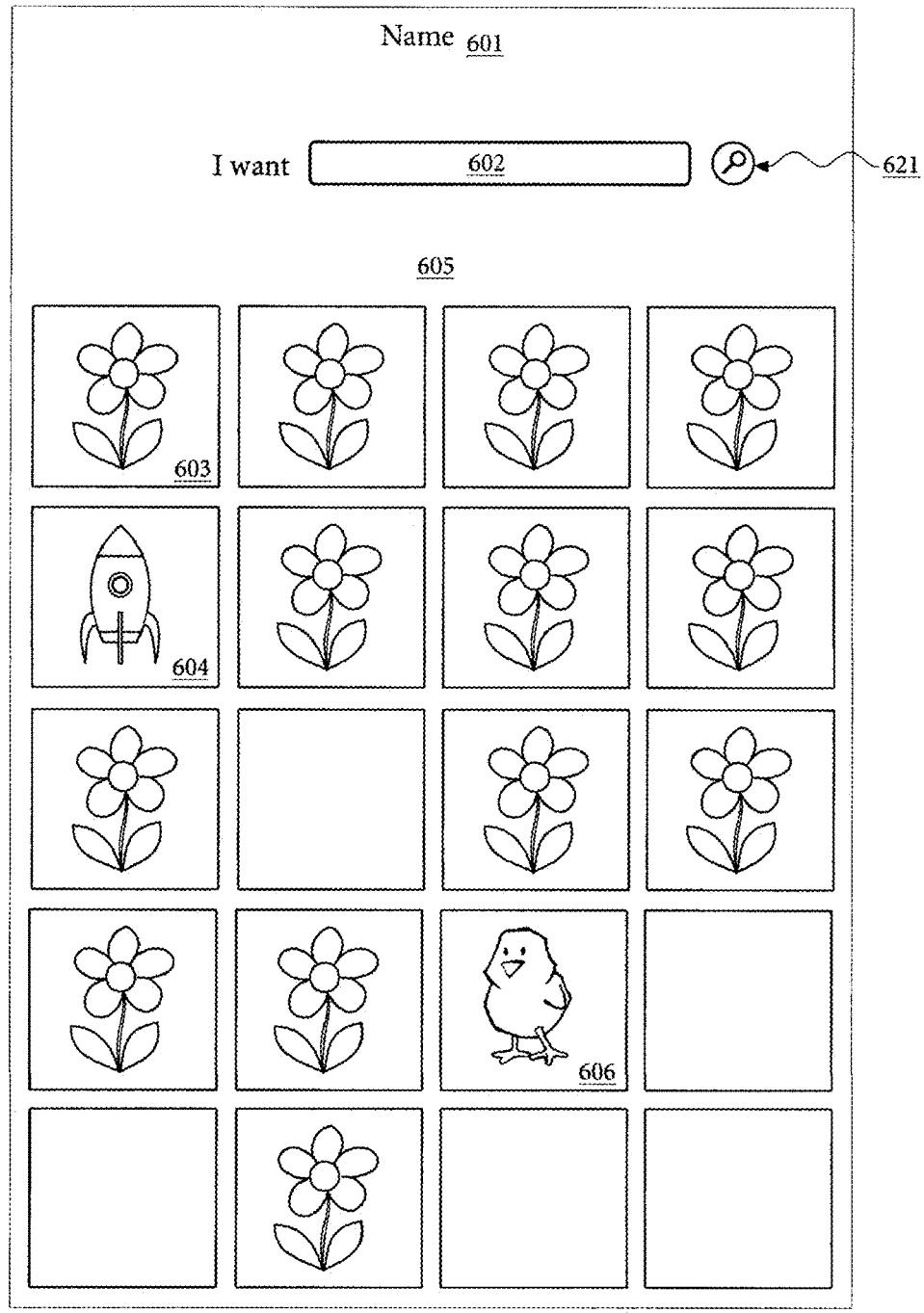
FIG. 6 shows a visual display for an electronic device, in accordance with one embodiment of the present patent application.

The search results revealed, as shown by way of example in FIG. 5 and FIG. 6, may include such things as a graphic or image of the item or its representation (503, 507, and 508 in FIG. 5; 603, 604, 605, and 606 in FIG. 6); information about each item, pricing information, social media platform data or information, customization options, user reviews, and any other data, information or graphic (504 in FIG. 5 and 606 in FIG. 6); a select-button and buy-button (505, and 506 in FIG. 5; 607 and 608 in FIG. 6); and any other information, text or graphic. Search results may be revealed on the display in any manner and order so that the particular methodology displayed in FIG. 5 and FIG. 6 for search results is not limiting.

Referring to FIGS. 5 and 6, in one embodiment, an ecommerce system may include a button or interface to buy now, add to cart, add to wish list and/or add to gifting experience that is the subject of this application.

Referring to FIG. 2A, in one embodiment, some items may require customization 203. In one embodiment, the user may be able to select the customization options 204. As used herein, customization mean when an item has multiple options such as color selection options, size options, style options, or any options associated with a product. Once selection of customizable options is complete, the item is preferably ready for either purchase or selection into further steps as shown in FIG. 2A.

Once customization is complete 204, or if the item did not require customization, the user may elect to purchase the item immediately 205. If an immediate purchase is selected, the user is instructed to enter payment information or may select from the user's stored payment method or any automated payment method 206. At this point, the order is executed to the retailer 207 by the server 100.

In one embodiment of the ecommerce system disclosed herein, once customization is complete, or if the item did not require customization, the user may add the item to the shopping cart and/or buy now and/or add to a wish list and/or add to the gifting experience.

Instead of buying the item immediately, after customization or if the item did not require customization, the user may select the item for crowdfunding using the systems and methods disclosed herein.

In one embodiment, the item may be displayed on the display. Referring to FIG. 7, in one embodiment, the item is automatically fragmented into parts. In one embodiment, each part is designated a monetary value. The monetary value may or may not be customized by the recipient within a range of allowable limits. The total of all parts equals the item's fully funded price, including shipping, taxes and fees. In an alternate embodiment, the total of all parts may only include the price of the item, other fees such as taxes, shipping and fees added separately. In one embodiment, the total of all the parts making up the fully funded item may be the price plus taxes. In an alternate embodiment, the total cost of all parts may be the price of the item plus any of other fees and costs that may be added, totaling the amount of a fully funded item. In one embodiment, the part prices may be determined using the maximum amount to fund the item plus shipping, taxes and/or other fees, in this method using the highest possible price for the item (e.g., Manufacturers Standard Retail Price) plus maximum shipping price plus tax plus any additional fees. The ecommerce systems and methods disclosed herein are not limited in the way that parts are calculated or which costs and fees are associated with each particular part. The ecommerce system preferably encompasses all ways that the parts may be assessed values that collectively with all funding methods, results in a fully funded item.

In one embodiment, the ecommerce system and methods disclosed herein enables an item to be divided into parts so that each part may be purchased individually and/or collectively at a later time by the contributor. There are several ways in which the item may be divided into parts so that each part has its own value. In one embodiment, the item is placed inside a boundary, such as a box, rectangle, oval, circle, or any shape or outline, and then parts are created by compartmentalizing and/or converting a whole area inside its boundaries into individual sections, such as illustrated by way of examples in FIG. 7, FIG. 8, FIG. 9 and FIG. 10. The method by which the item is divided into parts is not limiting, as it is possible to divide a whole piece into many parts in an almost infinite way.

Referring to FIG. 7, in one embodiment, the item may have the shape of a flower 703. In one embodiment, the flower has a rectangle boundary 751. In one embodiment, the rectangle may be divided into parts by horizontal lines 752 and vertical lines 753. These lines 752 and 753 create square-like shapes; these square-like shapes create the individual parts identified in FIG. 7 by reference numbers 704-731. The item, shown by way of example as a flower 703, has a total execution price—its fully funded price. In one embodiment, each individual part 704-731 has a value less than the fully funded price, so that when all the individual parts 704-731 are summed together, they equal the total funded price.

The "flower" referenced in the prior paragraph, and in other paragraphs that follow, is a graphic displayed as an example of a picture of an actual item. In case of an actual item, the flower would be replaced by a photograph or graphical representation of the actual item. In one embodiment, such as instances in which a photograph or graphical representation of an actual item may not be available, the flower may be replaced by text or another generic graphical representation.

The ecommerce system disclosed herein may be used to divide one or more items into parts for crowdfunding such as those shown FIGS. 8, 9, and FIG. 10. In FIG. 8, the parts 804-819 are synonymous with the parts 704-731 in FIG. 7. In the embodiment of FIG. 8, the boundary of the item is marked by the border of the parts that look like puzzle pieces 851, which is similar to 751 in FIG. 7. Likewise, the horizontal 752 and vertical 753 lines creating separation for the parts in FIG. 7 are demonstrated by the horizontal puzzle lineage 852 flowing generally in a horizontal direction, although not linear, and the vertical puzzle lineage 853 flowing generally in a vertical direction, although not linear (FIG. 8). These boundary lines identify and create parts 804-819. The item, shown by way of example as a flower 803, has a total execution price—its fully funded price. In this example, each individual part 804-819 has a value less than the fully funded price, so that when all the individual parts 804-819 are summed together, they equal the fully funded price.

Referring to FIG. 9, in one embodiment, the parts 905-911 are synonymous with the parts 704-731 in FIG. 7. In the embodiment of FIG. 9, the boundary of the item is marked by the rectangle 951, which is similar to 751 in FIG. 7. Likewise, the horizontal 752 lines creating separation for parts in FIG. 7 are demonstrated by the horizontal lines 952 in FIG. 9. These boundary lines identify and create parts 905-911. It is relevant that in this example FIG. 9 the item was not separated and divided with vertical lines as in FIG. 7 and FIG. 8. That is because the ecommerce systems disclosed herein are not bound by the means by which the parts are made, or by which the parts are separated, but any way in which an item may be separated into parts and demonstrated in a display. The item, shown by way of example as a flower 904, has a total execution price. In this example, each individual part 905-911 has a value less than the fully funded price, so that when all the individual parts 905-911 are summed together, they equal the fully funded price.

Referring to FIG. 10, in one embodiment, the parts 1004-1038 are synonymous with the parts 704-731 in FIG. 7. In this example the boundary of the item is marked by the rectangle 1051, which is similar to 751 in FIG. 7. However, there are no horizontal lines 752 or vertical lines 753 creating the separation for parts as in FIG. 7. In FIG. 10, the boundary lines that create parts 1004-1038 are circles. In FIG. 10, the item is not separated and divided with lines as in FIGS. 7, 8, and 9. In the FIG. 10 embodiment, the item is not bound by the means of which the parts are made, or by which the parts are separated, but any way in which an item may be separated into parts and demonstrated in a display. The item, shown by way of example as a flower 1003, has a total execution price—its fully funded price. In this example, each individual part 1004-1038 has a value less than the fully funded price, so that when all the individual parts 1004-1038 are summed together, they equal the fully funded price.

Referring to FIG. 11, in one embodiment, the item itself may be divided into parts 1104-1112 so that each part is equivalent to the example in FIG. 7, parts 704-731. That is because the ecommerce systems disclosed herein are not bound by the means of which the parts are made, or by which the parts are separated, but any way in which an item may be separated into parts and demonstrated in a display. The item, shown by way of example as a flower 1103, has a total execution price—its fully funded price. In this example, each individual part 1104-1112 has a value less than the fully funded price, so that when all the individual parts 1104-1112 are summed together, they equal the total funded price.

In one embodiment, in step 208 (FIG. 2A), the server 100 (FIG. 1) may automatically calculate the value for each part, each part having been demonstrated by way of example in reference numbers 704-731 (FIG. 7), 804-819 (FIG. 8), 905-911 (FIG. 9), 1004-1038 (FIG. 10), and 1104-1112 (FIG. 11). In one embodiment, the server 100 (FIG. 1) may permit the recipient to customize or modify the automatically calculated value for each part, each part having been demonstrated by way of example in reference numbers 704-731 (FIG. 7), 804-819 (FIG. 8), 905-911 (FIG. 9), 1004-1038 (FIG. 10), and 1104-1112 (FIG. 11). In one embodiment, the automatically calculated value for each part and/or the customizable value may be displayed on the screen adjacent to, or layered on top of the item and its parts, or anywhere on the display.

Referring to FIG. 2A, in one embodiment, at step 209, the ecommerce system enables the recipient to customize the item's appearance and its surroundings. The recipient's item, the item container, and/or the area adjacent and traversing the container may be custom decorated with patterns, colors, shapes, graphics, and any visual graphic. In one embodiment, the server 100 (FIG. 1) may enable the recipient to customize the color and appearance of the surroundings of the item. For example, in one embodiment, the recipient may add a gift wrap decoration or color(s) to the area where the item is located, in any area, in sections or in whole, within the area of the container, or sections therein, or attachments to the area adjacent or traversing the container. This is demonstrated in FIG. 19, which shows a decoration gift wrap 1991 within the container. In one embodiment, the gift wrap or decoration may be in the area between the outer edge of the container and the outer area of the parts, as shown by reference number 2091 in FIG. 20. In one embodiment, any color, pattern, graphic, or other means may be used to decorate the item and its parts, as shown by reference number 2191 in FIG. 21. In another embodiment, the entire item and/or its container may be fully covered with the gift wrap, decoration, color, patter, or graphic as shown by reference number 2291 in FIG. 22. The ecommerce system disclosed herein does not limit the colors, patterns or graphics, or how such are used and where on the item or within or outside its container, that may be used to accomplish this purpose of decorating the item, the surroundings, and its container.

Figure 24:
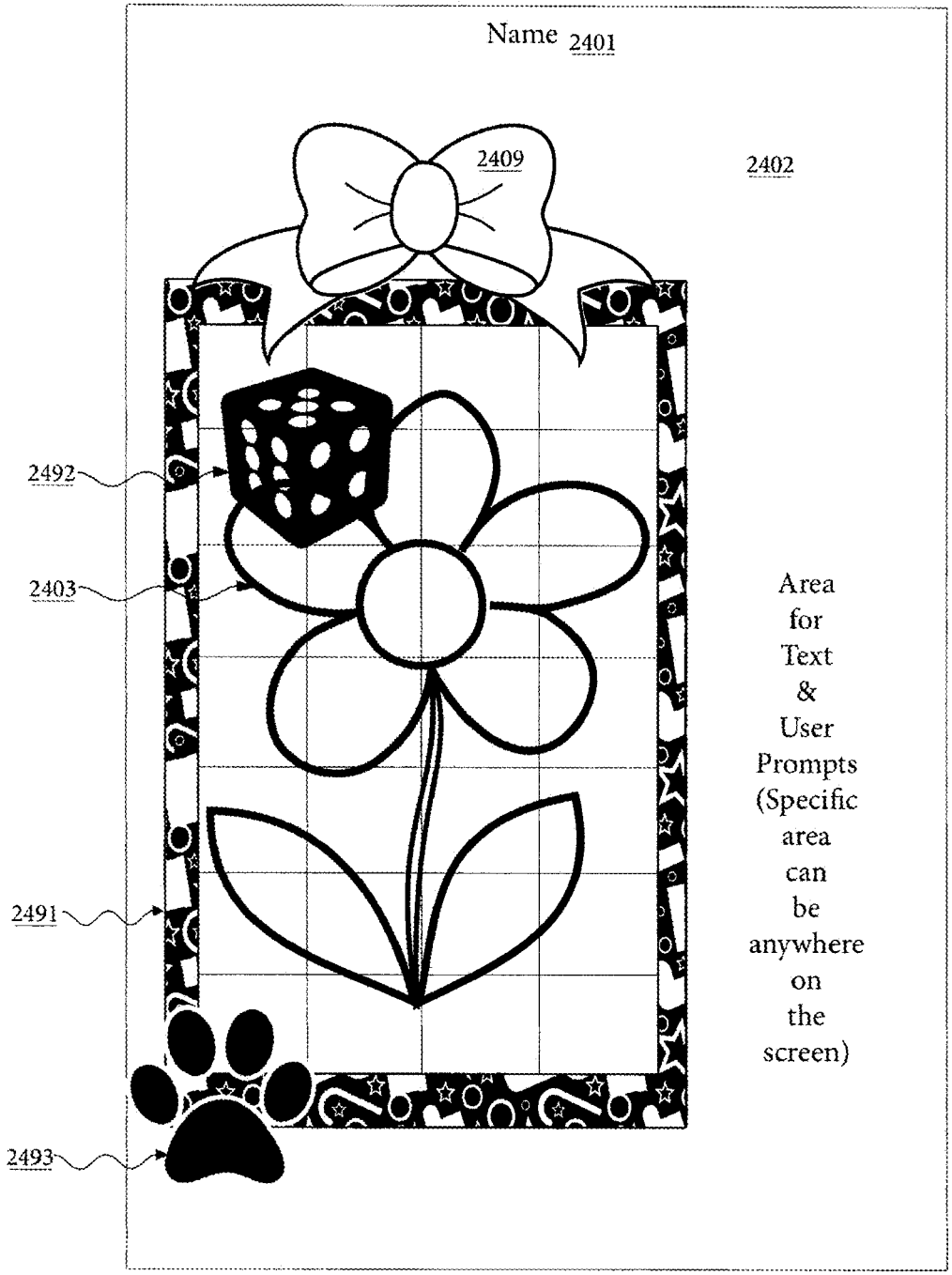
FIG. 24 shows a visual display for an electronic device, in accordance with one embodiment of the present patent application.

Referring to FIG. 12, in one embodiment, the recipient may add decorative items such as a bow 1209. The bow, or any other graphic, may be selected by the system, the user, or a combination therewith, and so may be changed to another graphic or different appearance, as shown by reference number 2309 in FIG. 23. In comparison to the bow 1209 in FIG. 12, a different decoration 2391 (FIG. 23) may be provided on top of the container. In one embodiment, the server 100 (FIG. 1) may enable the recipient to add decorative pieces to the item and the item container. For example, the recipient may select a bow to place on top of the item. This is demonstrated by way of example by bow 1209 in FIG. 12 and bow 1909 in FIG. 19. In another embodiment, the recipient may be able to attach graphical stickers, pictures, or other graphics to the item and/or the item container. Referring to FIG. 24, in one embodiment, a paw print 2493 and a die 2492 may be used as graphical stickers or add-ons that the user may add to customize his or her item and container. In one embodiment, any graphical and/or textual add-on may be incorporated. These options allow the recipient to customize and personalize his or her own gift with graphical colors, patterns, images, text, or any other textual and/or graphical medium.

The "paw print" and "die" referenced in the prior paragraph are used as an example of graphical stickers or add-ons, and these may be replaced by any picture, graphical image, or anything that may be visually viewed on the display.

In one embodiment, the system has a method of calculating the number of parts and the part prices for each part. In another embodiment, the system provides options for the user to select the part price and number of associated parts. In another embodiment, the system has a method of proposing only the part prices and its related number of parts that results in a total of all parts that will not exceed a certain percent of the overall total execution price, thereby preventing excess funds from being required to fund the gift.

In one embodiment, the system calculates the total execution price. In order to calculate the value of each part and how many parts are needed, the system engages in the following calculations: (1) The total execution price is rounded up to the nearest whole dollar. (2) The "minimum part price" is determined by using this method: (a) if the total execution price rounded up to the nearest whole dollar equals or is less than $100, then the value is 1; (b) if the total execution price rounded up to the nearest whole dollar is greater than $100 but less than or equal to $1,500, then the value is 5; (c) if the total execution price rounded up to the nearest whole dollar is greater than $1,500 but less than or equal to $4,500, then the value is 10; (d) if the total execution price rounded up to the nearest whole dollar is greater than $4,500 but less than or equal to $8,000, then the value is 15; and (d) if the total execution price rounded up to the nearest whole dollar is greater than $8,000, then the value is 20. (3) Set the "number of parts" equal to minimum part price. (4) For every number from number of parts to the total execution price rounded up to the nearest whole dollar divided by 0.55, up to a maximum of $100 per part price, the system will calculate every option and insert into a hash map the part price and number of parts: part price equals total execution price rounded up to the nearest whole dollar divided by number of parts, then rounded up to nearest whole number, but (a) part price times number of parts must be less than 10% deviation from the total execution price, and (b) part price cannot be repeated with different number of parts.

In another embodiment, the amounts of $100, $1,500, $4,500, $8,000, and 1, 5, 10, 15 and 20, can be varied to any other monetary values or numbers. In another embodiment, there is no maximum per part price or various maximum per part prices for different categories. In another embodiment, the part prices are calculated in any way in which a price can be set for a particular part and the parts of the gift collectively, equaling or exceeding the total execution price.

In one embodiment, the number of parts of the gift may exceed that which may be reasonable viewable on any one display size. In another embodiment, the number of parts of the gifts may be divided into multiple pages or display areas. For example, a typical box has four sides. If each side of the box has 30 individual gift parts, then the four sides together would have four times thirty, or 120 parts. If a box has five sides, then using the same logic, this box could have five times thirty, or 150 parts. If a box has six sides, then using the same logic, this box could have six times thirty, or 180 parts. And so on. In this method, a gift can be divided into many parts, and be segmented into gift sides, viewable to the user at one side at a time, so that collectively all the sides make up all the parts needed to fund a gift at its total executed price. In another embodiment, the box may have any number of sides. In another embodiment, the box may have any number of parts. In another embodiment, the box may have any combination of sides and parts.

In one embodiment, the system has a method of calculating the number of sides a gift may have for crowdfunding. For example, the default maximum of parts a gift may have in one side is thirty. The gift parts are created by setting up a grid system, with horizontal and vertical identifiers creating isolated areas for parts. A typical example in this method could result in a gift that is a maximum of 6 rows by 5 columns. This creates 30 individual areas, the parts. Since gifts can have any total execution price, the system can calculate the number of sides for any gift irrespective of the total execution price by using this method and calculations: (1) Run the method for determining the value of each part and how many parts are needed as previously explained. (2) Divide the number of parts by the grid size rounded up to the nearest whole number (in this example the grid size is set at 30; this is the number of parts per side), resulting in the "number of sides". (3) Divide the number of parts by the number of sides rounded up to the nearest whole number, to get the number of parts on each side.

In one embodiment, the display the gift parts to the user, the number of rows and columns per side will vary based upon the number of parts on each side. Using the same example, where 30 individual parts is the maximum per side, irrespective of the total execution price, the number of rows and columns displayed per side will depend on the number of parts per side, as follows:

| Part each side | Dimensions (Rows × Columns) |
| --- | --- |
| 2 | 2 × 1 |
| 3 | 3 × 1 |
| 4 | 2 × 2 |
| 5 | 5 × 1 |
| 6 | 3 × 2 |
| 7 | 4 × 2 |
| 8 | 4 × 2 |
| 9 | 3 × 3 |
| 10 | 5 × 2 |
| 11 | 4 × 3 |
| 12 | 4 × 3 |
| 13 | 5 × 3 |
| 14 | 5 × 3 |
| 15 | 5 × 3 |
| 16 | 4 × 4 |
| 17 | 6 × 3 |
| 18 | 6 × 3 |
| 19 | 5 × 4 |
| 20 | 5 × 4 |
| 21 | 6 × 4 |
| 22 | 6 × 4 |
| 23 | 6 × 4 |
| 24 | 6 × 4 |
| 25 | 5 × 5 |
| 26 | 6 × 5 |
| 27 | 6 × 5 |
| 28 | 6 × 5 |
| 29 | 6 × 5 |
| 30 | 6 × 5 |

In one embodiment, once the parts on each page is calculated, and the parts are displayed, if all the parts have the same dimensional size, it is possible that certain parts are displayed but are not available to purchase as these are extra parts displayed due to difficulty created in dividing mathematical prime numbers, and the unpreferable visual experience these situations may create. In this case, "phantom parts" are created and displayed. These "phantom" parts make up the overall side of the gift visual area, but they are not available to purchase nor necessary to make up the total execution price. For example, if the maximum number of rows determined to be suitable for visual display is 6, and if the total number of parts needed to reach the total execution price is 14, then the gift would be divided into 5 rows and 3 columns, or 15 parts. This results in one phantom part. This phantom part can be displayed in any way possible, for example, by identifying it as a phantom part, shading differently from the other available parts, marking it a particular way, not marking it any way.

In another embodiment, the amounts of 30, 6, 5, and the mathematical results that follow, can be varied to any other number or value. In another embodiment, there is no maximum number of parts per side. In another embodiment, the number of sides are calculated in any way in which side(s) can be set or determined so that when the total parts are added it results in a value equaling or exceeding the total execution price.

In another embodiment, the number of parts on each side may vary, and may have different number of parts on each side so that the total number of parts added together equals or exceeds the total execution price.

In another embodiment, gifts may not require sides because all the parts are continuously displayed in order from top to bottom.

Referring to FIG. 2A, in one embodiment, at step 210, the server 100 (FIG. 1) of the ecommerce system may provide a list of gift cards available from gift card vendor(s) designated 123-124 that are stored on the main database 140 (FIG. 1). Referring to FIG. 1, information of active gift card vendor(s) and the availability of gift cards is gathered from the gift card vendor 124 or the gift card database 112, and stored in the main database 140. In one embodiment, in the event that the item is not fully funded by contributors using the steps shown in FIGS. 3A-3C, the recipient may be issued one or more gift cards for the balance of the money in the account. In one embodiment, the server 100 (FIG. 1) may discount any applicable fees from the value of the gift card issued to the recipient.

Referring to FIG. 2A, in one embodiment, at step 210, the recipient may select what gift card(s) he or she will want to receive in the event that the item is not fully funded. Then, after making the gift card selection(s), the recipient is preferably shown the terms and conditions for each gift card selected, and the recipient may accept the terms and conditions of the gift card(s) selected. In one embodiment, the gift card(s) are only paid for and delivered to the recipient if the item(s) is/are not fully funded.

In one embodiment, the recipient may not need to select the gift card at this stage. In one embodiment, in the event that the item is not fully funded by contributors using the steps shown in FIGS. 3A-3C, the recipient may be issued a store credit to the item's retailer or a store credit to the company operating the ecommerce system herein described.

Figure 2B:
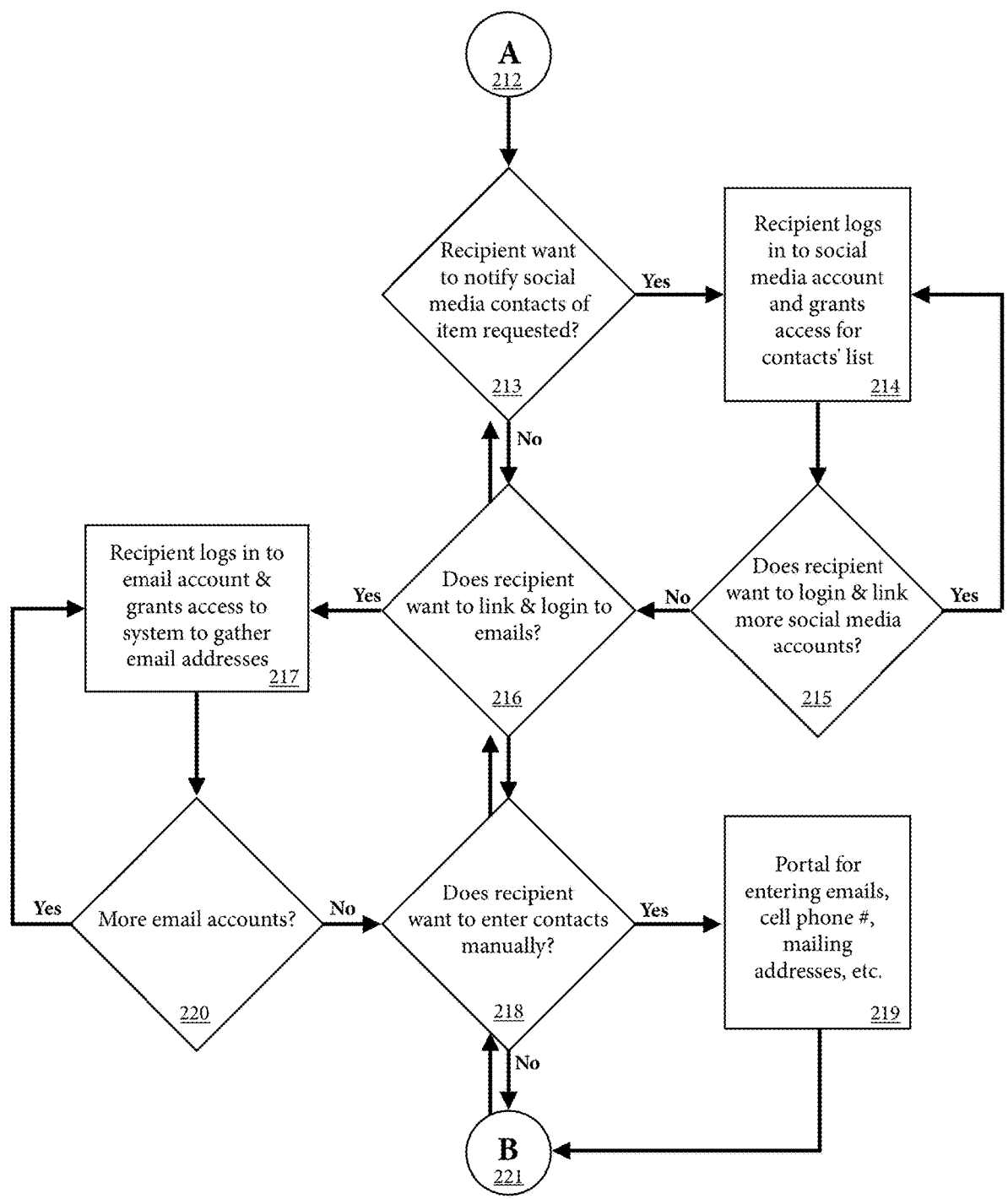
FIG. 2B is a flow chart associated with the ecommerce system of FIG. 1 showing a second series of steps performed by the recipient, in accordance with one embodiment of the present patent application.

Referring to FIG. 2B, in one embodiment, at step 213, the recipient may share, post and/or otherwise communicate the recipient's request for funding of the item with others through various means (e.g., social media platforms).

In one embodiment, the recipient is provided with a list of social media sources. Referring to FIG. 2B, in one embodiment, at step 214, the recipient may login to those third-party applications or programs or servers to provide the server 100 (FIG. 1) with access to the recipient's third-party social media contacts and other access 214. The server 100 (FIG. 1) may gain access to the recipient's third-party social media(s) contact information to reach recipient's contacts through those various sources and more, and the server 100 may execute a notification to those contacts in that social media source of the recipient's request of the item(s) that recipient requests and is seeking contributor's to pay for a part or the whole of the item. In one embodiment, at step 215, the recipient may be allowed to repeat and sign-in to as many of these third-party account(s) as recipient wants and repeats this process.

In one embodiment, the recipient may share, post and/or otherwise communicate the recipient's request for funding of the item in various sections of the platform. In one embodiment, the sharing described here may occur anywhere that the gift item or gift list is viewable or accessible.

In one embodiment, the ecommerce system provides the recipient with a link to access one or more email accounts. Referring to FIG. 2A, in one embodiment, at step 216, the recipient may login to those third-party applications or programs or servers to provide the server 100 (FIG. 1) with access to the recipient's email contacts (for example, stored email addresses). The server 100 (FIG. 1) may gain access to the recipient's third-party email accounts 217 uploading and/or gaining access to recipient's contacts and/or email addresses information to reach recipient's contacts through those various sources and more. In one embodiment, the server 100 (FIG. 1) executes a notification to those contacts and various sources of the recipient's request of the item(s) that recipient wants and is seeking from contributor's to pay for a part or the whole of the item. In one embodiment, at step 220, the recipient may be allowed to repeat and sign-in to as many of these third-party account(s) as recipient wants.

The embodiments provide the recipient with the option of entering various contact information for other sources manually or by using other means as may be applicable with advancing technologies. Referring to FIG. 2A, in one embodiment, at step 218, the recipient may request to login 219 to those third-party applications or programs or servers to provide the server 100 (FIG. 1) with access to the recipient's account(s). The recipient may enter email address(es) manually, physical addresses, and/or phone numbers of possible contributors 219. The server 100 (FIG. 1) may gain access to the recipient's third-party account(s) gaining access and/or uploading contact information to reach recipient's contacts through those various sources and more, and the server 100 (FIG. 1) may execute a notification to those contacts, the contacts entered manually and various sources of the recipient's request of the item(s) that recipient wants and is seeking from contributor's to pay for a part or the whole of the item. In one embodiment, the recipient may be allowed to repeat and sign-in to as many of these third-party account(s) as recipient wants.

In one embodiment, the systems and methods described herein may take place in various sections of the platform where sharing of information is provided.

Figure 2C:
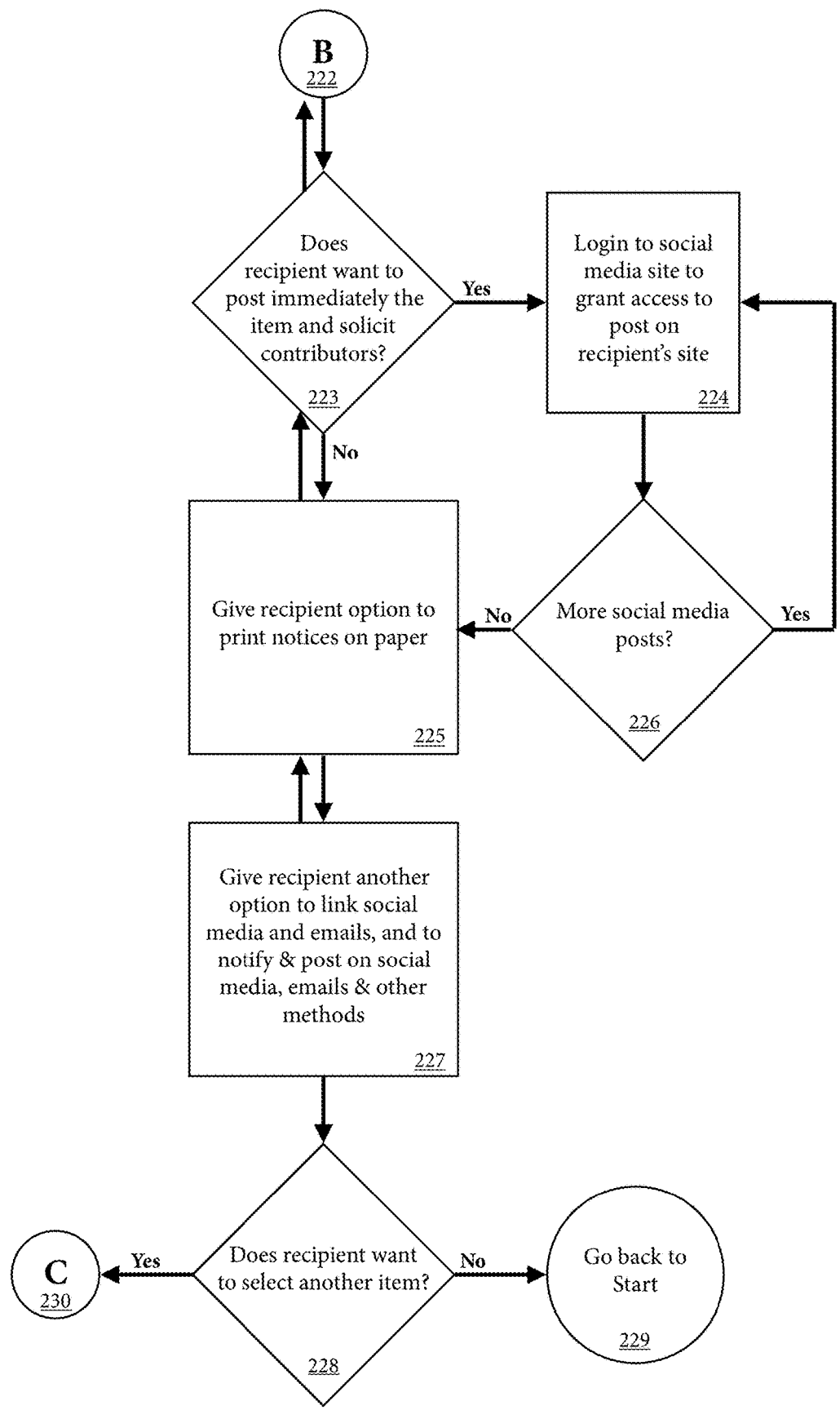
FIG. 2C is a flow chart associated with the ecommerce system of FIG. 1 showing a third series of steps performed by the recipient, in accordance with one embodiment of the present patent application.

Referring to FIG. 2C, in one embodiment, at step 223, the ecommerce system provides the recipient with a list of available third-party social media sources so that recipient may make a post or otherwise immediately notify the recipient's social network that recipient is seeking the item from contributors. At step 224, the recipient may login to those third-party social media applications or programs or servers to provide the server 100 (FIG. 1) with access to the recipient's social media posting and/or notification features. The server may gain access to the recipient's third-party social media(s) application and/or software to execute a notification and/or posting to those social media source(s) so that the recipient's social media network contacts are notified of recipient's request for the item and seeking contributor's to pay for a part or the whole of the item. At step 226, the recipient may be allowed to repeat and sign-in to as many of these social media account(s) as recipient wants to repeat this function.

In one embodiment, the server may gain access to the recipient's third-party social media(s) application and/or software to execute a notification and/or posting to those social media source(s) so that the recipient's contacts in various sources, such as email, messenger services, text, and any other ways of communicating, are notified of the recipient's request for the item and that the recipient seeks contributors who will pay for one or more parts or the whole of the item.

Referring to FIG. 2C, in one embodiment, at step 225, the recipient may print paper notifications of the recipient's request for the item and for crowdfunding of the item through parts and/or in whole. The recipient may print these notices directly on a printing device. In one embodiment, the notices provide information to potential contributor(s), including but not limited to, recipient identifying information, the item, and how to reach the administration 180 (FIG. 1) and/or the server 100 (FIG. 1) to make a contribution.

Referring to FIGS. 2B and 2C, in one embodiment, at steps 213, 216, 218, 223 and 225, the recipient may engage and enter those steps in any order and as many times as recipient decides.

Referring to FIG. 2C, in one embodiment, at step 227, the ecommerce system may remind and/or permit the recipient to again enter the information and link third-party sources as provided in steps 213-225 (FIGS. 2A and 2B). Referring to FIGS. 2B and 2C, in one embodiment, at steps 213, 216, 218, 223 and 225, the recipient may engage and enter those steps in any order and as many times as recipient chooses.

Figure 2D:
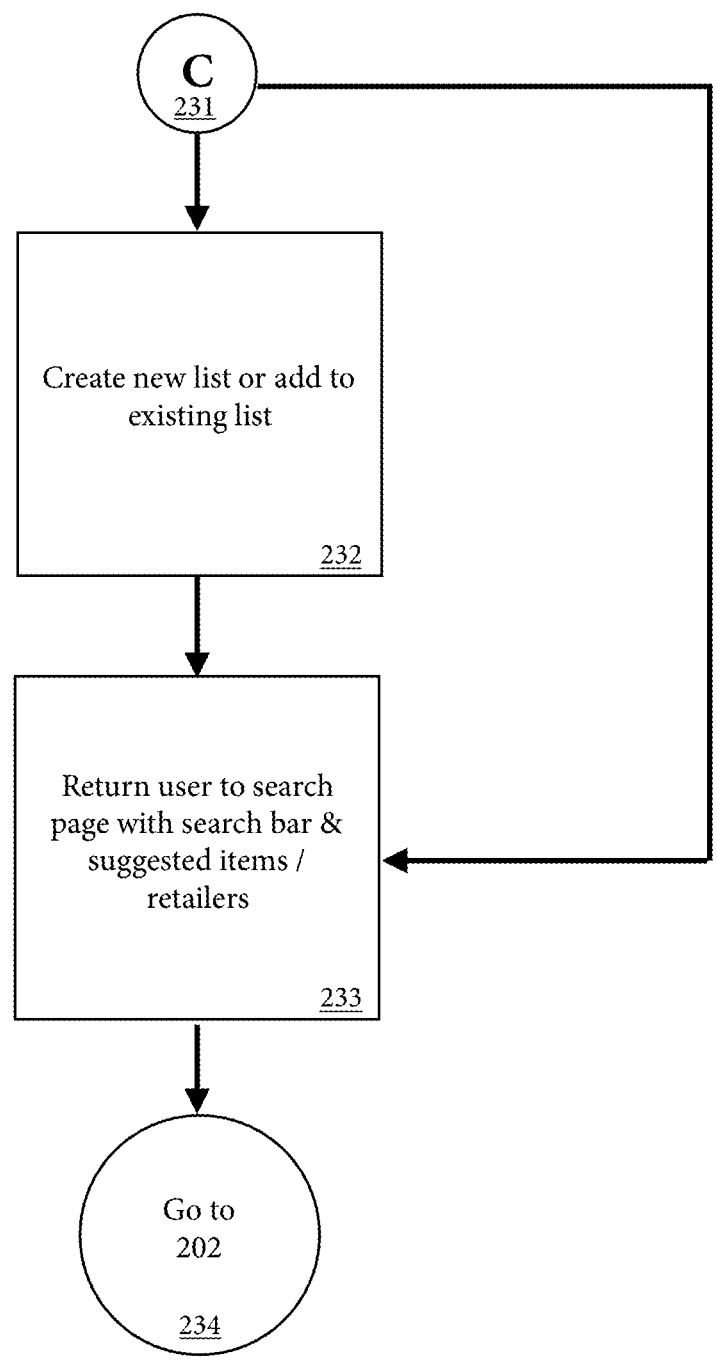
FIG. 2D is a flow chart associated with the ecommerce system of FIG. 1 showing a fourth series of steps performed by the recipient, in accordance with one embodiment of the present patent application.

Referring to FIG. 2C, in one embodiment, at step 228, the recipient may select another item. Referring to FIG. 2D, in one embodiment, at step 232, if the recipient selects to create another item, then the recipient may select whether to add the item to a new list or add to an existing list. If creating a new list, the recipient may create a new list's name. If adding to an existing list, the recipient may select from the lists previously created. In one embodiment, the recipient is able to add items to the list, delete items from the list, modify items in the list, and edit items in the list.

Referring to FIG. 2D, in one embodiment, at step 234, the ecommerce system preferably returns to a display similar to the homepage with the list's name created or selected name identified.

Referring to FIG. 2D, in one embodiment, at step 234, the ecommerce system goes to any other user interface experience as may be decided by the administrators.

In one embodiment, the ecommerce system enables contributors make purchases and contribute to the parts of the item that recipient wants to receive.

Figure 3A:
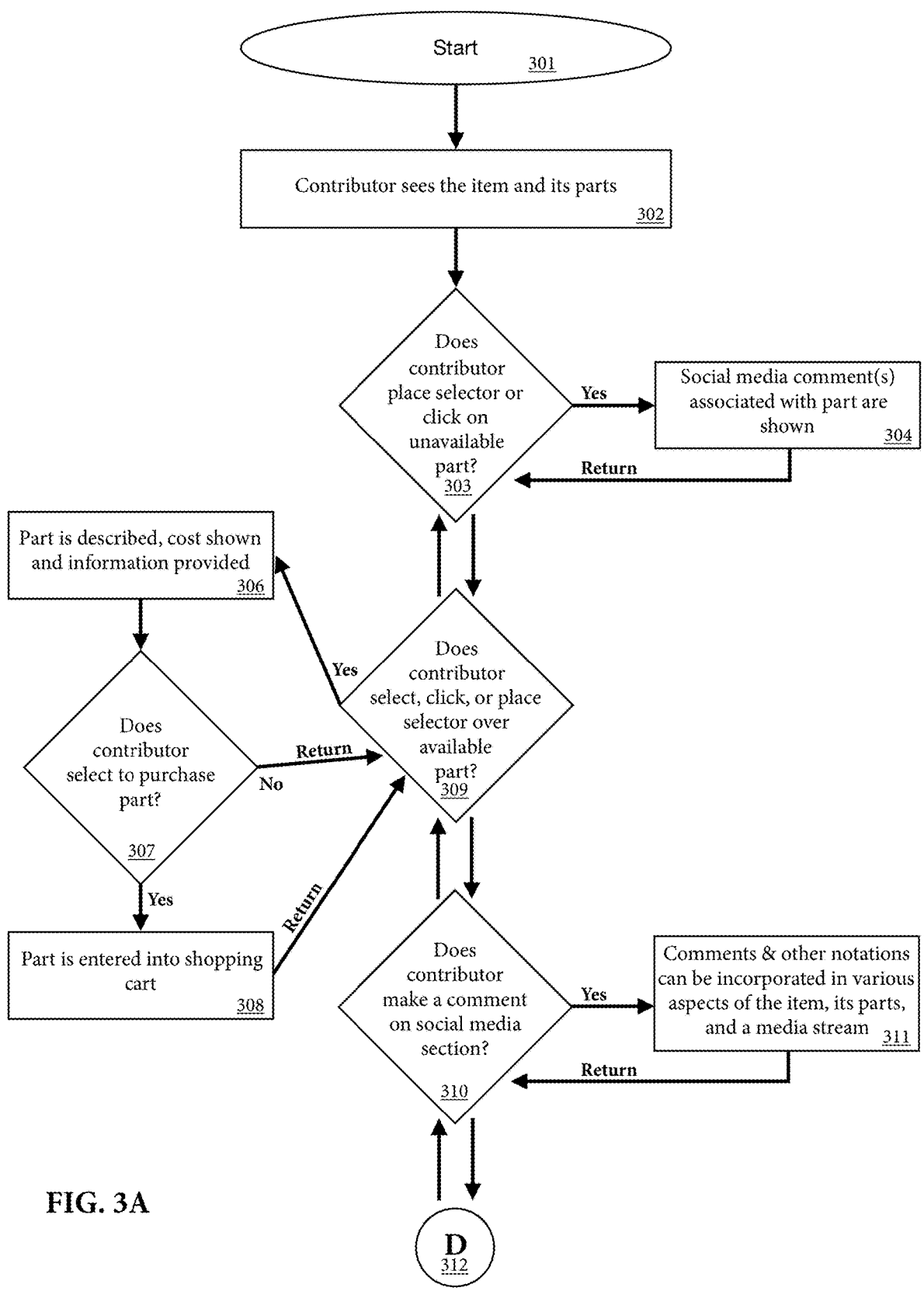
FIG. 3A is a flow chart associated with the ecommerce system of FIG. 1 showing a first series of steps performed by a contributor in order to look at the item selected by the recipient, consider one or more parts to purchase, select one or more parts to purchase, look at one or more other parts already purchased by others and its associated social media comments, engage in social media, and engage with an ecommerce system, in accordance with one embodiment of the present patent application.
Figure 3B:
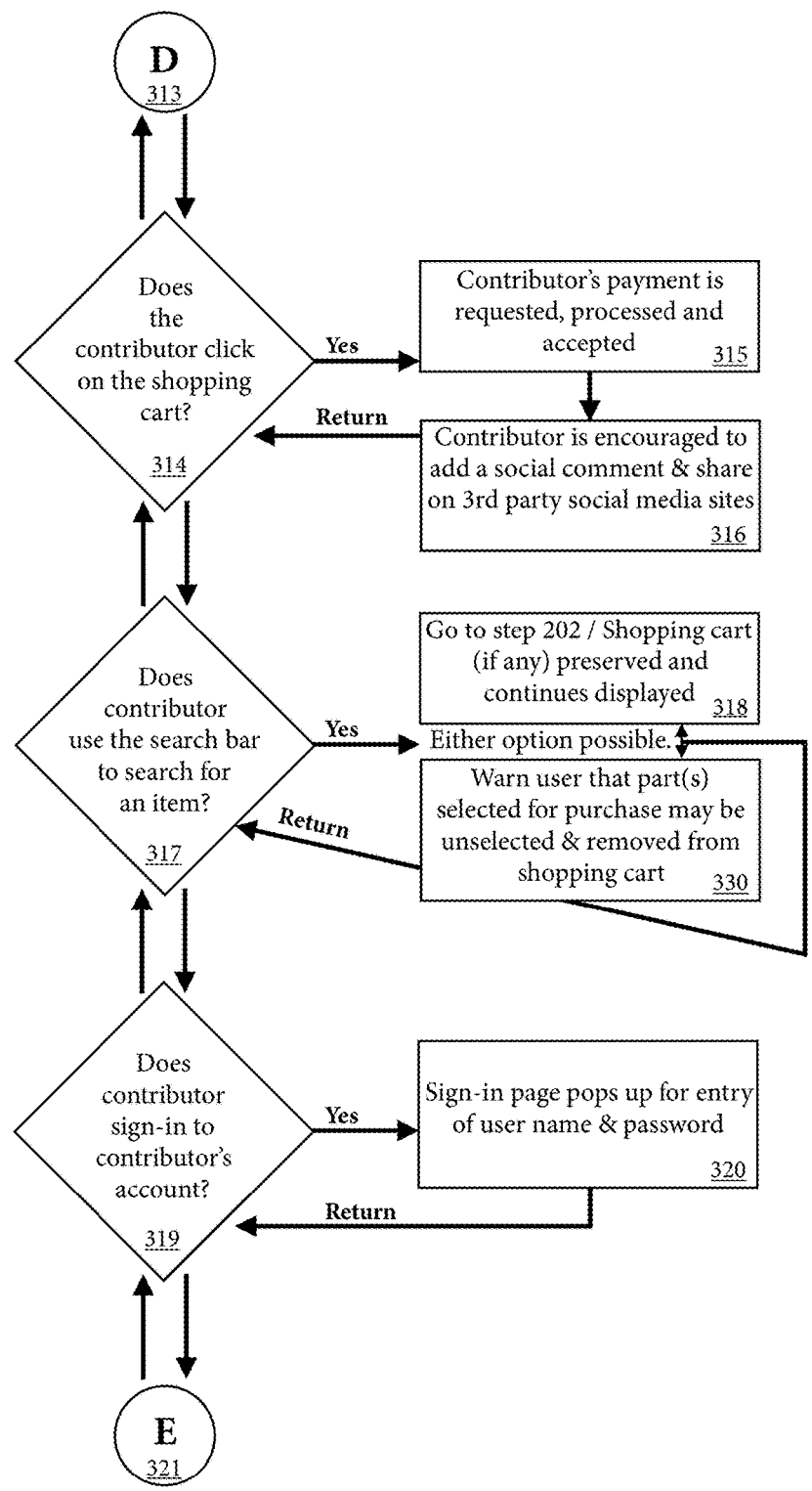
FIG. 3B is a flow chart associated with the ecommerce system of FIG. 1 showing a second series of steps performed by the contributor, in accordance with one embodiment of the present patent application.
Figure 3C:
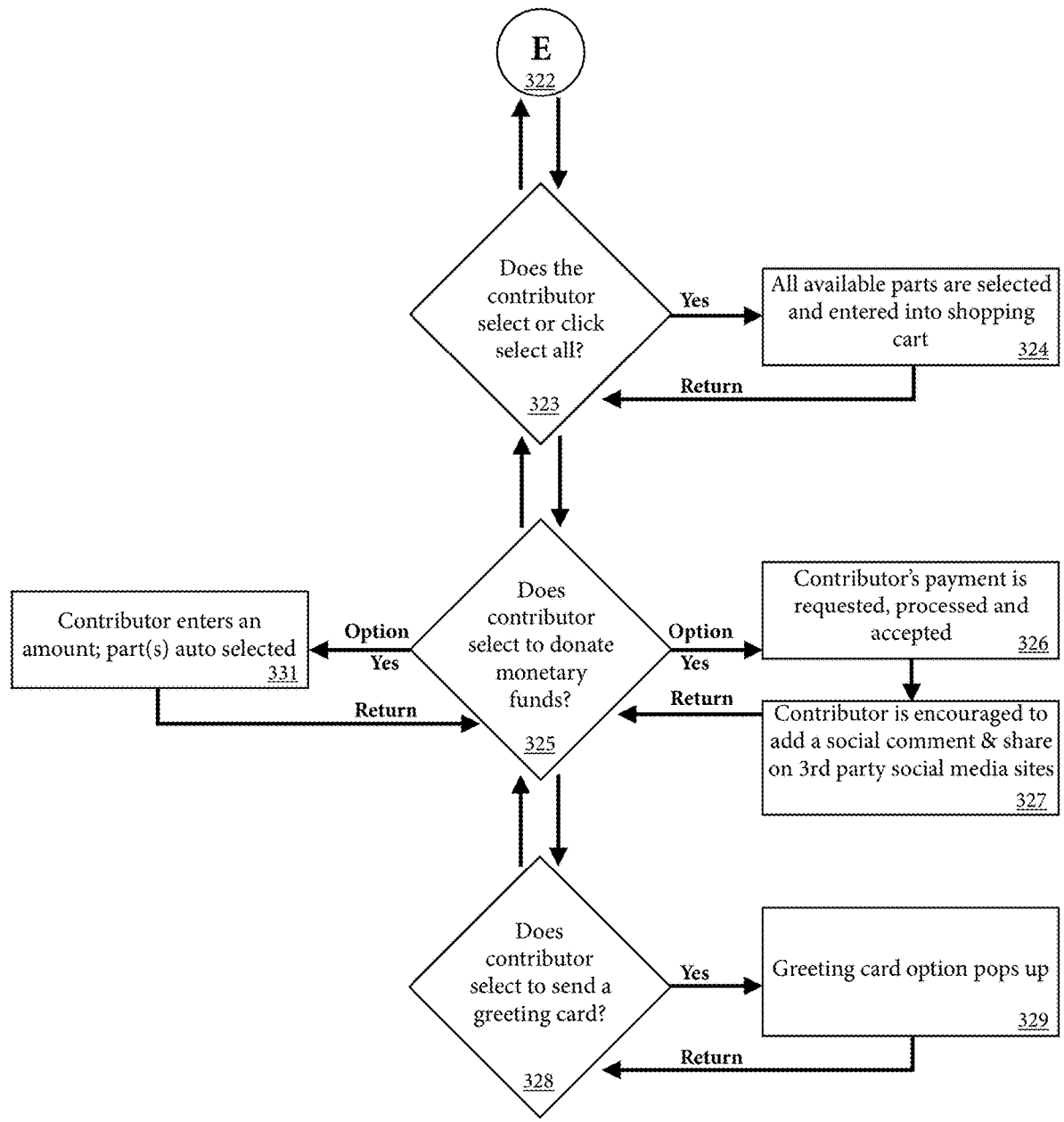
FIG. 3C is a flow chart associated with the ecommerce system of FIG. 1 showing a third series of steps performed by the contributor, in accordance with one embodiment of the present patent application.

FIGS. 3A-3C illustrate the ecommerce system and methods whereby the contributor pays for the part(s) of the item and engages in the social media platform.

In one embodiment, a contributor may be made aware that the recipient wants to receive the item in any of the numerous methods that are provided to the recipient in the recipient's system and methods shown and described above in FIGS. 2A-2D. In one embodiment, the contributor may be made aware by various methods including, but not limited to, verbal notification by the recipient, word-of-mouth from other people, using the system and finding the recipient's item(s) request, server 100 (FIG. 1) automated linking and notifying the recipient and the possible contributors, advertisements, or any of the many means that information may be exchanged or provided.

Referring to FIG. 1, in one embodiment, the server 100 communicates through specific APIs 101-104 to the contributors by mail 163, email 162, text 161, social medial 160, or other methods, contain a link to the recipient's posted item on the main database 140. Selecting this link takes the contributor to step 302 (FIG. 3A).

Referring to FIG. 1, in one embodiment, the server 100 preferably communicates through any method possible to the contributors with a link or any other method directing the potential contributor to the recipient's posted item on the main database 140.

FIG. 1 shows the optional API setup 101-104. The APIs may be inside the overall system, outside the overall system or a mixed-use API between the system and the each particular third-party company handling the contributor's mail 163, email 162, text 161, social medial 160, or other methods.

After the contributor receives communication of the recipient's posted item or if the contributor's is otherwise notified of the posted item, the contributor may use the systems and methods disclosed in FIGS. 3A-3C.

The embodiments include a main display page that shows the posted item. In step 302 (FIG. 3A), the contributor sees the posted item. FIG. 13 is an example of a display of step 302. In this display, the contributor sees the posted item 1303. In one embodiment, the posted item and its item container 1304, if any, are displayed, with indicators for the available parts for purchase 1306 and the unavailable, already paid, parts 1307. In another embodiment, the available parts 1306 shade or hide the posted item, the item in this FIG. 13 exemplified by a flower 1303, while the unavailable parts for purchase 1307 are fully see-thru without obstruction of the posted item 1303. In this embodiment, by way of example, when the posted item has all available parts, in other words no one has contributed to this posted item yet, then every part is shaded dark so that the posted item's 1303 visibility is limited, is hard to see or not visible, or modified in some way covered by the shading or graphical indication; if then one contributor purchases one part, by way of example the part identified as 1308 in FIG. 13, then the shading disappears and the posted item 1303 is fully visible only in this part 1308 and other parts already funded (for example, 1307). Then, continuing this example, if another contributor purchases parts 1309-1311, then the sections representing these parts would change from shaded to transparent, so that the posted item 1303 is now completely visible in parts 1308-1311. Continuing this example, these parts 1308-1311 have been paid and the item is now partially funded, ⅐th of total, if 4 out of 28 parts have been paid, and are identified in the display by being fully transparent, fully showing the posted item's graphic in this section only within the bounds of 1308, 1309, 1310 and 1311; all other parts, not within the bounds of 1308-1311 would be identified as shaded or covered, in part or in whole. In this way, the contributor has an immediate image of what parts have been paid by other contributors and what parts remain available for the contributor's payment. This concept and embodiment is demonstrated in FIG. 13 by the parts covered with black diagonal lines versus those parts not covered by black diagonal lines. The parts with the black diagonal lines, such as 1306, demonstrate by way of example the parts that are available for purchase by the contributor; while the parts that do not have black diagonal lines, such as 1307-1311, demonstrate by way of example the parts that have already been purchased by prior contributors and are no longer available for purchase. Therefore, in FIG. 13, there are a total of 8 shaded parts with diagonal lines and 20 parts without diagonal lines; this is equivalent to 8 available parts that are available for contribution and payment, while 20 parts are already funded. If the 8 remaining parts are paid, then the item would be fully funded. However, this method of marking and identifying the available and unavailable parts for purchase to the contributors may be accomplished in many different ways, including but not limited to, gray (available) to color (unavailable); black (available) to transparent (unavailable); invisible part (available) to visible part (unavailable); blurry (available) to clear (unavailable); marking of available (available) to marking of unavailable (unavailable). Any means by which a part can be identified as being available and unavailable for purchase is within the scope of the present disclosure.

In step 302 (FIG. 3A), the contributor is displayed the main contribution display area. In this display area, as shown by way of examples in FIG. 13-17, the contributor has many options.

FIGS. 3A-3C identify, without limitation, the options in this section. However, the contributor is not required to go in order of steps 303, 309, 310, 314, 317, 319, 323, 325 and 328. Any of steps 303, 309, 310, 314, 317, 319, 323, 325 and 328 may be engaged at any time in this process. Any of steps 303, 309, 310, 314, 317, 319, 323, 325 and 328 may be repeated in this process. In other words, by way of example, the user may do step 309 first, go through 306-308, then go straight to step 314, go through 315-316, then return but go 303, go through 304, and then go to 310, go through 311, and so forth.

FIGS. 3A-3C show one preferred method of operating the ecommerce systems disclosed herein, however, the steps are not required to be used in the exact order shown.

In one embodiment, at step 303, the contributor may select or click or place selector on the posted item's unavailable parts. Unavailable parts are those parts which have already been paid for by other contributors or the recipient; these unavailable parts are unavailable for purchase again. If the contributor selects or clicks or places the selector over an unavailable part, then, step 304, the contributor is displayed, as a pop-up window or other method, the social media comment, if any, left by the person who paid for that part, and other information. This is demonstrated by way of example in FIG. 14, wherein a cursor or pointer or click or selector is shown as an arrow 1431, and the pop-up window described herein is shown as a rectangle labeled "Pop up" 1430. The size of the rectangle box 1430 may vary by size, and in some platforms the pop-up may be replaced by opening a new display screen or internet browser screen. Also, by way of example, if the user moves the selector to another unavailable part, then the current pop-up window preferably closes, and a new pop-up window preferably opens with the information and social media comments associated with that unavailable part.

In one embodiment, if the contributor selects or clicks or places the selector over an unavailable part, then, at step 304, information regarding the purchased part may be displayed in any way possible to display information. The displayed information may include the user name of the contributor, the name or part of the name of the contributor, the social media comment that was prepared by the contributor when purchasing the part(s), any social media comment linked to the part(s), part price, contribution amount, photo of contributor, social media related to the part experience, and/or any other information.

The embodiment includes an option in step 309 for the contributor to select or click or place a selector on the posted item's available parts. Available parts are those parts which the contributor may select to add to the shopping cart and then purchase; these available parts, once selected for purchase are marked or identified on the display as selected for purchase with a graphical or textual marking 1640. If the contributor selects or clicks or places the selector over an available part, then, step 306, the contributor is displayed, as a pop-up window or other method, the cost to purchase this part, other information, and a selector button to add to shopping cart. This is demonstrated by way of example in FIG. 15, wherein a cursor or pointer or click or selector is shown as an arrow 1531 over an available part, and the pop-up window described herein is shown as a rectangle labeled "Pop up" 1530. The size of the rectangle box 1530 may vary by size, and in some platforms the pop-up may be replaced by opening a new display screen or internet browser screen. Also, by way of example, if the user moves the selector to another available part, then the current pop-up window preferably closes, and a new pop-up window preferably opens with the information and price associated with that available part.

In one embodiment, the contributor preferably selects available part(s), one or more available, by clicking or selecting the available part(s). In one embodiment, the part(s) selected for purchase are marked or identified on the display as selected parts. The value of each part is preferably added to and shown on the screen in any user interface design. In one embodiment, the contributor sees the total value of all the part(s) he or she selected. This information may be displayed in any method possible, and does not require a specific shopping cart.

In one embodiment, the contributor may select and unselect available part(s), one or more at a time, by clicking or selecting the available part(s), which are then identified as selected, but clicking or selecting again removes the part(s) from the parts selected for purchase. Using this method, a contributor may select and unselect any available part(s), and only purchases the part(s) so selected at the moment of checkout.

In one embodiment, the contributor selects the part(s), one or more available, in any method possible, and each part selected is added to the total value of all selected part(s) for payment by the contributor. In one embodiment, the contributor preferably finalizes the purchase of all of the selected part(s). In one embodiment, the contributor may make a social media comment that will be linked to all of the part(s) purchased together. In one embodiment, a social media comment may include all of the tools available in the social media, including but not limited to picture, GIF, graphical, video, and/or any other possible way to add textual and graphical additions to the social media comment. In one embodiment, the contributor may add the social media comment and its related content as previously described before making the payment, and this social media and its related content may be linked to the purchased part(s).

Referring to FIG. 3A, as step 307, the contributor may add the part to the shopping cart. If the contributor continues to move the selector, cursor, or selects anywhere else on the screen, this pop-up window 1530 closes, and another part may be selected at step 303 or step 309, or the contributor may move onto any of the other steps shown in FIGS. 3A-3C.

Referring to FIG. 3A, in one embodiment, at step 307, the contributor may select and add the part to the part(s) marked for purchase, and the value of the part is added to the other part(s) selected, if any, and shown to the contributor as a total amount to be paid at purchase. In one embodiment, the contributor may continue to move the selector, cursor, or select anywhere else on the screen, and continue selecting more parts, or the contributor may move onto any of the other steps shown and described herein in FIGS. 3A-3C.

If the contributor selects to add this part to the shopping cart, in one embodiment, at step 308, the part may be added to the shopping cart. FIG. 16 demonstrates, by way of example, a display page with two parts selected 1640 into the shopping cart 1650. The parts in the shopping cart are marked or identified on the display as selected for purchase with a graphical or textual marking 1640. Each part that is selected in the shopping cart may be unselected, removed from the shopping cart, by clicking or selecting the part again, thereby changing the marking from the cart selected marking 1640 back to the available part marking, see FIG. 16, 1606.

In one embodiment, the shopping cart previously described may include any method of displaying the total amount of the anticipated purchase. In one embodiment, a diagram of a shopping cart is not necessary as any user interface design that shows the user the total amount is within the scope of this description.

Referring to FIG. 3A, in one embodiment, at steps 310 and 311, the user may engage in the social media platform. FIGS. 13-16, 1320, 1420, 1520 and 1620. In one embodiment, the social media platform enables the contributors, users, recipients, and others, to engage in social media including but not limited to communications, mark particular comments, engage in comments within comments, upload graphics and/or pictures, and use multi-methods of communication to engage in exchange of dialogue, emotions and graphic documents, while remaining on the system 100 (FIG. 1), display page and/or platform. In one embodiment, the social media platform may be incorporated and made a part of step 304, by linking and showing social media associated with a particular part. By way of example, but without limitation, if a part is purchased, the contributor may make comments to the social media platform and such comments may be linked to this or these specific parts purchased by the contributor. In one embodiment, other comments may be added by others in the social media network to this comment feed, and other may engage the social network and this feed by providing marking and/or graphical comments.

Referring to FIG. 3A, in one embodiment, at step 311, the system provides the user with a place to enter comments, provide comments to comments already entered, upload graphics and/or pictures, share emotions and dialogue, and use multi-methods of communication to engage in the social media. The user may also be able to share the recipient's posted item with others using third-party social media platforms, email and/or any and all other means of sharing the posted item to solicit other's to participate in purchasing a part or the whole item.

Figure 17:
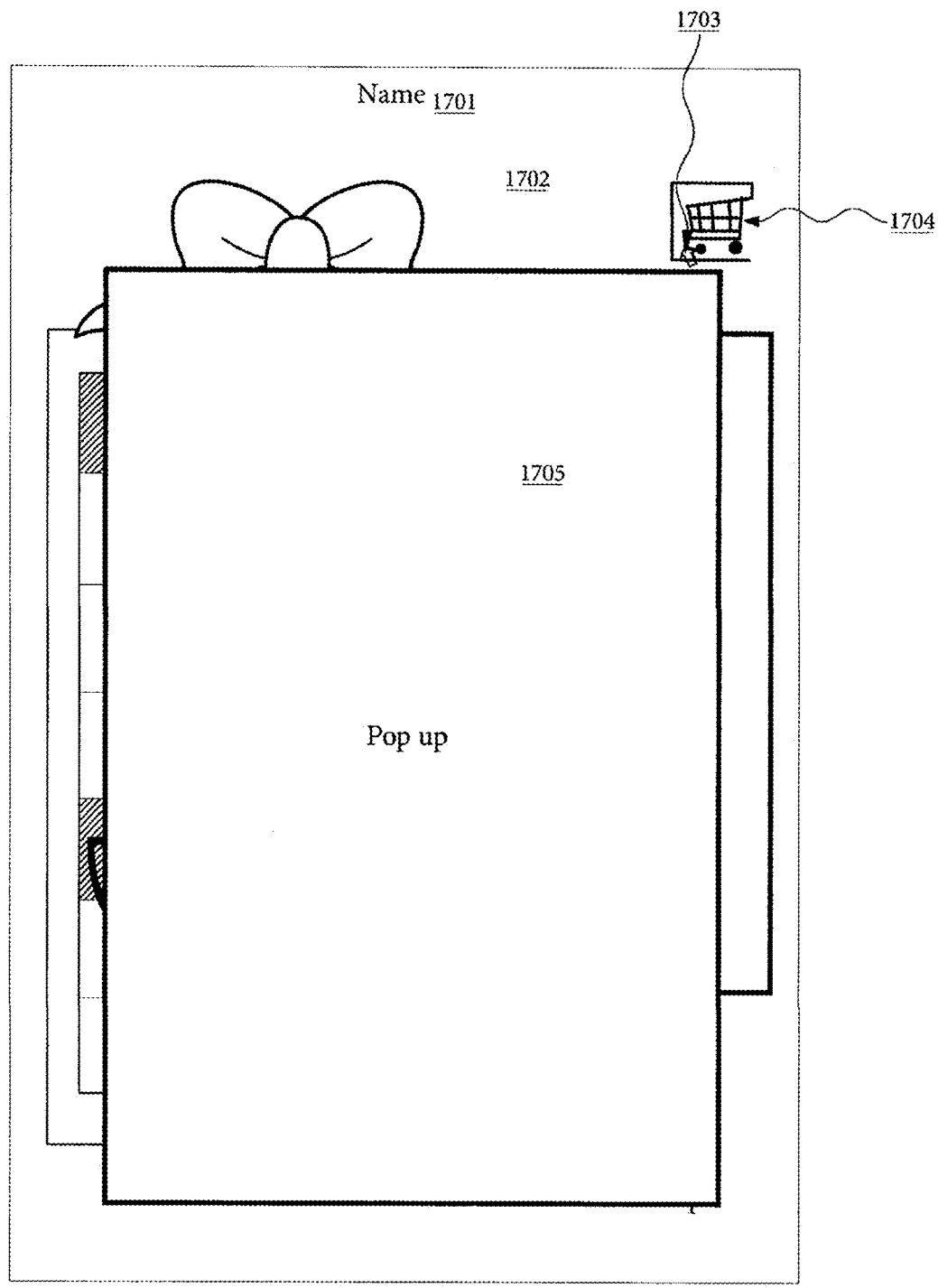
FIG. 17 shows a visual display for an electronic device, in accordance with one embodiment of the present patent application.

The embodiment includes an option in step 314 (FIG. 3B) for the contributor to select or click 1703 the shopping cart 1704 (FIG. 17), if an available part was entered in step 308 (FIG. 3A), to make the payment for the parts that the contributor has entered in the shopping cart. Referring to FIG. 17, in one embodiment, if the shopping cart 1704 is clicked, the contributor is directed to a pop-up payment window or a different display screen for payment processing

1705. Step 315 (FIG. 3B) shows this process. Contributor's payment method is requested and information necessary to accept payment entered. In an alternate embodiment, the contributor is encouraged to create a user name and password. After payment is processed, in step 316 (FIG. 3B), the contributor may be encouraged to add a social comment in the built-in social media platform and also to share the posted item with others using the contributor's access to his or her own third-party social media companies by posting it to their social media feed, emailing the contributor's friends, sending text message and/or other communication means available at the time.

In one embodiment, instead of a traditional shopping cart 1704 (FIG. 17), the price for the part(s) selected may be added and/or displayed to the user in any user interface design method possible. In one embodiment, the contributor may select final checkout, and a payment screen is presented to accept any allowable payment method. In one embodiment, it does not matter how this payment interface appears in design or function. In one embodiment, during, before or after this payment process, the contributor may be encouraged or allowed to make a social media comment and its related content.

In one embodiment, the system periodically (e.g., once a day) compares the total execution price, as determined when the gift was setup initially by the system and user, to the current funding price. If the amount collected and deposited in the system from contributors, for the specific gift item(s), has reached an amount that equals or exceeds the current funding price, then the system executes an order to the retailer. It is the custom of many retailers to vary the prices on items on a routine basis at or below the MSRP (Manufacturers Standard Retail Price). This method takes price variations into account and permits execution of items upon enough funds being collected to pay for the item, shipping, taxes, and any other applicable fees, irrespective of the item's initial total execution price.

Referring to FIG. 3B, in one embodiment, at step 317, the contributor may use a search bar, located somewhere on the display area in area 1602 (FIG. 16) or anywhere on the screen, to search for an item that the contributor may want or to give the opportunity for the contributor to also become a recipient. In one embodiment, if the contributor enters any text into the search bar and executes the search, the system preferably proceeds to step 202 (FIG. 2A), and the shopping cart 1650 (FIG. 16), if any, was created, may remain on the display for clicking or selecting at any time. In one embodiment, if the shopping cart is selected, the system desirably proceeds to step 315 (FIG. 3B). Once the search results are revealed, the contributor also becomes a possible recipient and goes through the flow chart previously explained and diagramed in FIGS. 2A-2D. The contributor may simultaneously be both a contributor and a recipient during the same user experience. In one embodiment, if the shopping cart 1650 (FIG. 16) is not empty, and the contributor initiates a search 202 (FIG. 2A), the shopping cart preferably remains in display and available at any time for checkout. The contributor at that point may go through the system of selecting, customizing, posting, and sharing an item, thereby becoming a recipient, and the contributor may also execute the purchase of the shopping cart at any time or when the contributor concludes the flow route in FIGS. 2A-2D.

In one embodiment, instead of a traditional shopping cart, the price for the part(s) selected is added and displayed to the user in any user interface design method possible. In one embodiment, if the contributor attempts to leave this screen by selecting any option that would possibly take the user to a different page, the user may receive a warning that continuing will remove the data. In one embodiment, if the contributor attempts to leave a screen by selecting any option that would possible take the user to a different page, then the information of the part(s) selected and/or social media entered would be stored for later purchase completion.

Referring to FIG. 3B, in one embodiment, at step 319, the contributor may sign into the contributor's site account that is stored in the main database 140 (FIG. 1). In one embodiment, at any time, any user of the ecommerce system disclosed herein may create an account by selecting the sign-in option. If the sign-in option is selected, a pop-up window appears or alternately a separate browser/application window is opened, whereby signing in with a user name and/or a password is permissible. In one embodiment, a user may create an account at that time. In one embodiment, user accounts are processed by the server 100 and stored in the main database 140 (FIG. 1).

Referring to FIG. 3C, in one embodiment, at step 323, the contributor may select all, in other words, the contributor may highlight or select one function entry that selects all the available parts and places them all in the shopping cart 1650 (FIG. 16). In one embodiment, when all is selected, all of the available parts are marked with the selected indication as previously described, as shown in FIG. 16. Referring to FIG. 16, two parts are marked as selected 1640 and in the shopping cart 1650, however, if select all was entered in this FIG. 16, all the boxes with the diagonal lines (i.e. 1606) would change to the selected marking as exemplified by 1640.

Referring to FIG. 3C, in one embodiment, at step 325, the user may select a contribute-money funds selector or button or icon, and a pop-up window appears or alternately a separate browser/application window is opened 326 inquiring as to the amount of money to provide to the recipient, the credit card/ATM/other transactional method input section, and the user name, address and other information needed to process the transaction. In one embodiment, if the user has signed in, information in the main database 140 (FIG. 1) as pertains to the user may be accessed and auto-filled. The user may select to execute, and the money is processed in accordance and in the same system and method as the gift card execution. In one embodiment, the contributor is encouraged to share the recipient's posted item with the contributor's social media sites, emails and other methods in a similar way as previously described.

Referring to FIG. 3C, in one embodiment, at step 325, a user may enter the fund value to contribute, and when the user is ready to execute the transaction, the user may enter a credit card/ATM/other transactional method input section, as well as the user name, address and other information needed to process the transaction. In one embodiment, the contributor may also enter social media and related content to be associated with the contribution or the gift/gift list.

Referring to FIG. 3C, in one embodiment, at step 328, the user may select a contribute-gift card selector or button or icon, and a pop-up window appears or alternately a separate browser/application window is opened inquiring as to the amount of money to fund the gift card for the recipient, a gift card section option window may be available, the credit card/ATM/other transactional method input section, and the user name, address and other information needed to process the transaction. In one embodiment, if the user has signed in, information in the main database 140 (FIG. 1) as pertains to the user may be accessed and auto-filled. In one embodiment, the user may select to execute, and the money transaction is processed and the gift card is processed in accordance and in the same system and method as the gift card execution. In one embodiment, the contributor may be encouraged to share the recipient's posted item with the contributor's social media sites, emails and other methods in a similar way as previously described.

In one embodiment, items posted by the recipient may be available for contributors' contributions for a set time period until which time, if the item is not fully funded, the total balance that was paid for by contributors for the parts of the item, minus any fees, may be executed into one or more gift cards. In one embodiment, once the recipient posts an item, the systems and methods may allow for contributors to purchase parts of the item for seven days. If all the item parts are purchased before the seven day deadline, then the item is fully funded and an order executed with the retailer. In one embodiment, if the item is not fully funded at the end of the seven day deadline and the contributor has purchased one or more parts, the systems and methods will desirably execute the gift card purchase(s). The seven day deadline period is an example only, as this time duration period may be longer or shorter and still fall within the scope of the ecommerce system disclosed herein. In one embodiment, the systems and methods may set the time duration period automatically. In another embodiment, the systems and methods may provide a recommended time duration period and the recipient may modify this time deadline period. In another embodiment, the systems and methods may ask the recipient to enter or specify the time deadline period. The various ways for establishing the time duration period is not limited by the present disclosure.

In one embodiment, items posted by the recipient may be available for contributors' contributions for a set time period until which time, if the item is not fully funded, the total balance that was paid for by contributors for the parts of the item, minus any fees, may be credited towards store credit or any other type of credit. In one embodiment, the credit established may be used to make purchases, contribute to other people's gifts, get a gift card, donate towards a charity or otherwise, cash out, be deposited into a financial depository account, be deposited towards a credit card, and/or be provided to the user for any and all uses possible.

In one embodiment, the ecommerce system disclosed herein provides a way for an item to be crowdfunded so that the contributors purchase an actual part of the overall whole. However, recipients may also want to place several items into a single list to crowdfund and permit contributors to purchase an actual part of the overall whole. Therefore, in one embodiment, the ecommerce system disclosed herein allows the recipient to post an item or multiple items for contributors to consider purchasing parts of the overall posted item(s). In one embodiment, the ecommerce system and methods enable the recipient to post more than one item into a list to be crowdfunded collectively as a singular list whereby the entire list is divided into parts.

In one embodiment, the ecommerce system and methods enable a recipient to establish a list, name the list, and then add items to this list. The recipient may create one list or as many lists as the recipient wants. In one embodiment, a list may be created for a birthday, another list for a graduation, and/or another list "just because." In other words, lists may be created and custom labeled by the recipient. Items may be added and removed from the list(s) at any time. In one embodiment, the recipient may create a list, name the list, and then add items to this list. In another embodiment, the recipient may select the item using any of the system and methods previously described, and then after the item goes through the system and process of dividing and organizing its parts, the recipient may create a list or add the item to a list. In another embodiment, the recipient may be able to manage the lists in an account page by creating new lists, editing current lists, and deleting lists, in any order or fashion as the recipient desires.

In one embodiment, the recipient may add graphical and/or picture and/or graphics to the list(s) and/or a personal message to be seen by potential contributors. In one embodiment, the lists may be either public or private. In one embodiment, users may make list(s) for other users. In one embodiment, the lists for other users allow a person to setup a gift list for someone else so that others may contribute to the purchase of one or more gift items.

In one embodiment, the recipient's list is organized in list format similar to that shown in FIG. 5. In one embodiment, the examples of text or icons shown in FIG. 5 may vary. In one embodiment, the list may be organized with one item above the next and so on, in chronological order, where the first item on the list is the item that will be available for funding first, the second item will be available for funding second, and so forth.

In one embodiment, the recipient's list may be organized in list format as shown in FIG. 6. In one embodiment, the examples of text or icons shown in FIG. 6 may vary. In one embodiment, the list may be organized with one item on the upper left, another to the right and below, or even above in the following rows, and so on. In one embodiment, the items may be organized in chronological order, where the first item on the list is the item that will be available for funding first, the second item to the right will be available for funding second, and so forth. In another embodiment, the recipient's list may be organized in any method where items may be identified and organized in order of preference, from highest (i.e., #1 choice) to lowest priority.

In one embodiment, when the recipient creates a list and adds the first item to the list, the item may be organized into the parts in the systems and methods as described above herein. In one embodiment, the item may be added to an existing list, or to a new list that is created. A selected item may stay alone on a list, and be publicized and available for contributors using the systems and methods disclosed herein. If the recipient adds another item to the list, the recipient may select whether the new item should be priority #1 or priority #2 on the funding priority list. If the recipient adds a third item to the list, the recipient may select whether the new item should be priority #1, #2,or #3,and the other previously added items may be moved into any order of priority, and so forth for all other items added to the list. In one embodiment, the ecommerce system and methods allow the recipient to drag items from one priority spot to another, for example from priority #1 to priority #3, whereupon the item that was priority #3 will automatically move up to priority #2, and the item that was priority #2 will move up to priority #1. In one embodiment, the ecommerce system and methods disclosed herein enable the recipient to enter a priority number of an item, whereby adjustments to the order of items in the priority list are automatically made. In one embodiment, the list may be organized and sorted alphabetically. In one embodiment, the list may be organized and sorted in order of entry to the list. In one embodiment, the list may be organized and sorted by categories. In one embodiment, the list may be organized and sorted by price. There are many ways in which the lists may be organized and sorted, and these examples do not limit the system and methods by which the lists may be organized and sorted.

In one embodiment, the recipient may select to have the system automate grouping items by retailer. In one embodiment, the recipient can select which items to lock together from the same retailer so that items are shipped together, thereby increasing efficiency and potentially reducing shipping costs. In one embodiment, if items are locked together from the same retailer, then when the recipient requests to change the order of priority for item(s) contribution, the locked items are dragged together.

Figure 18:
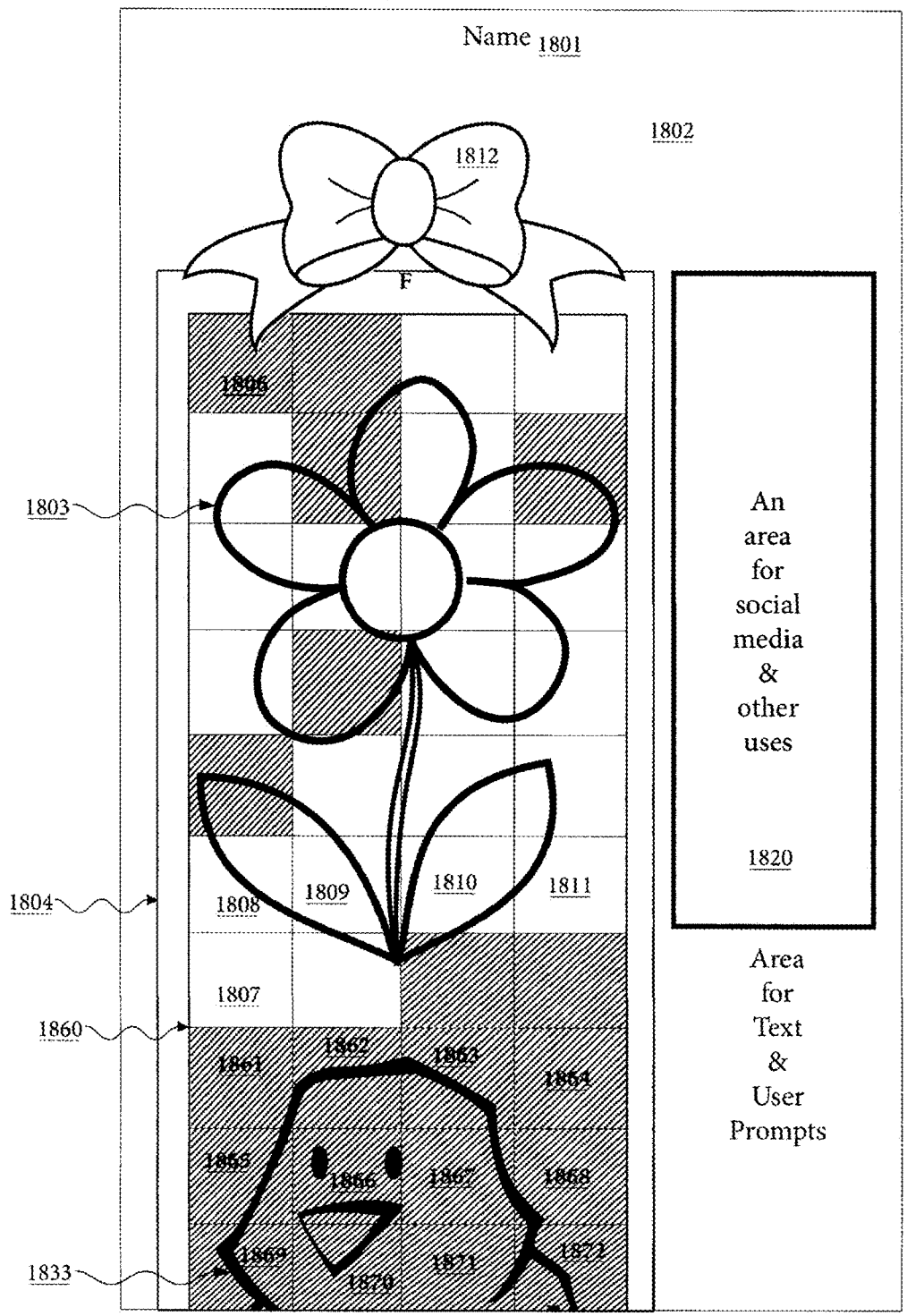
FIG. 18 shows a visual display for an electronic device, in accordance with one embodiment of the present patent application.
Figure 19:
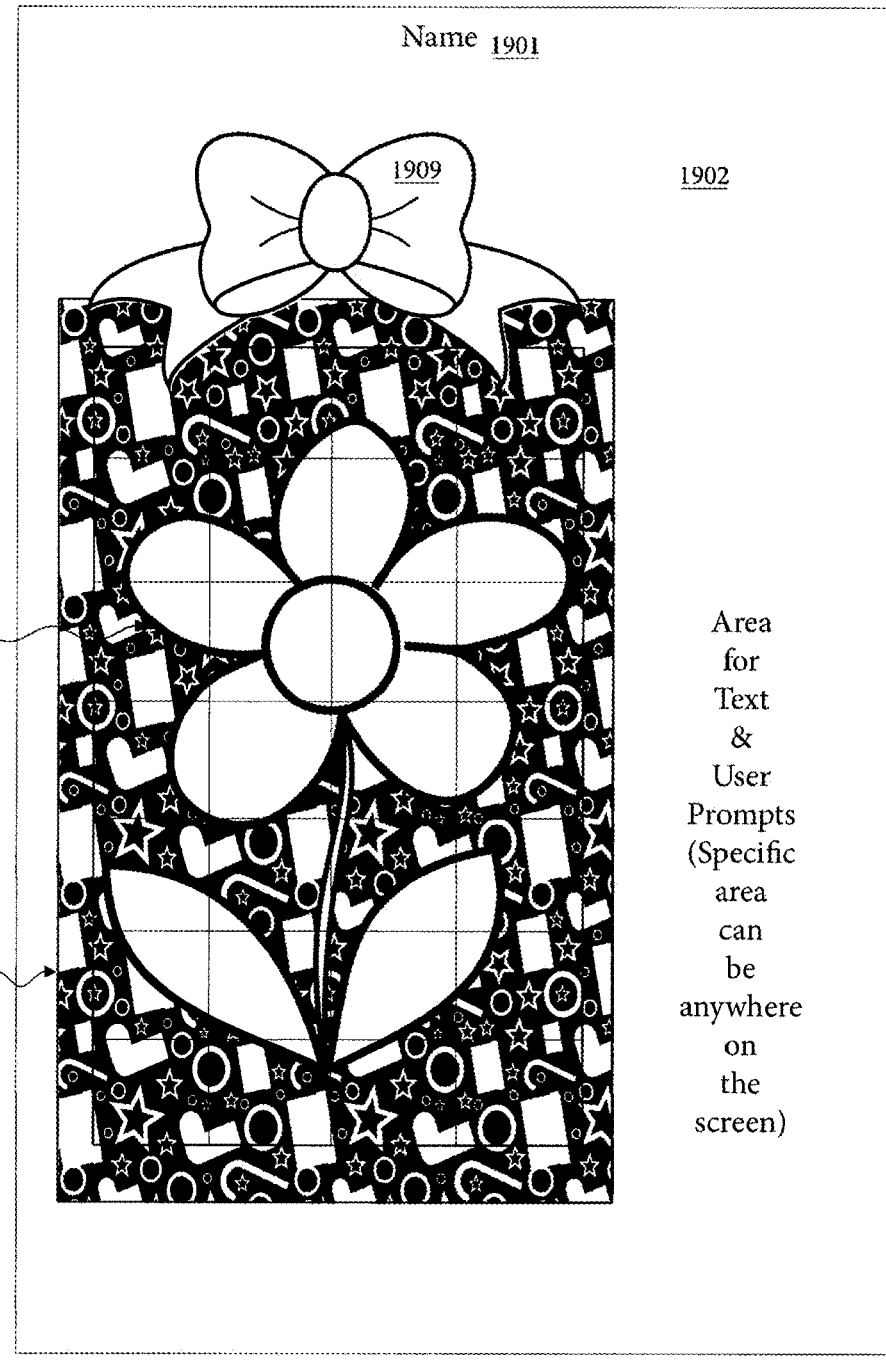
FIG. 19 shows a visual display for an electronic device, in accordance with one embodiment of the present patent application.
Figure 20:
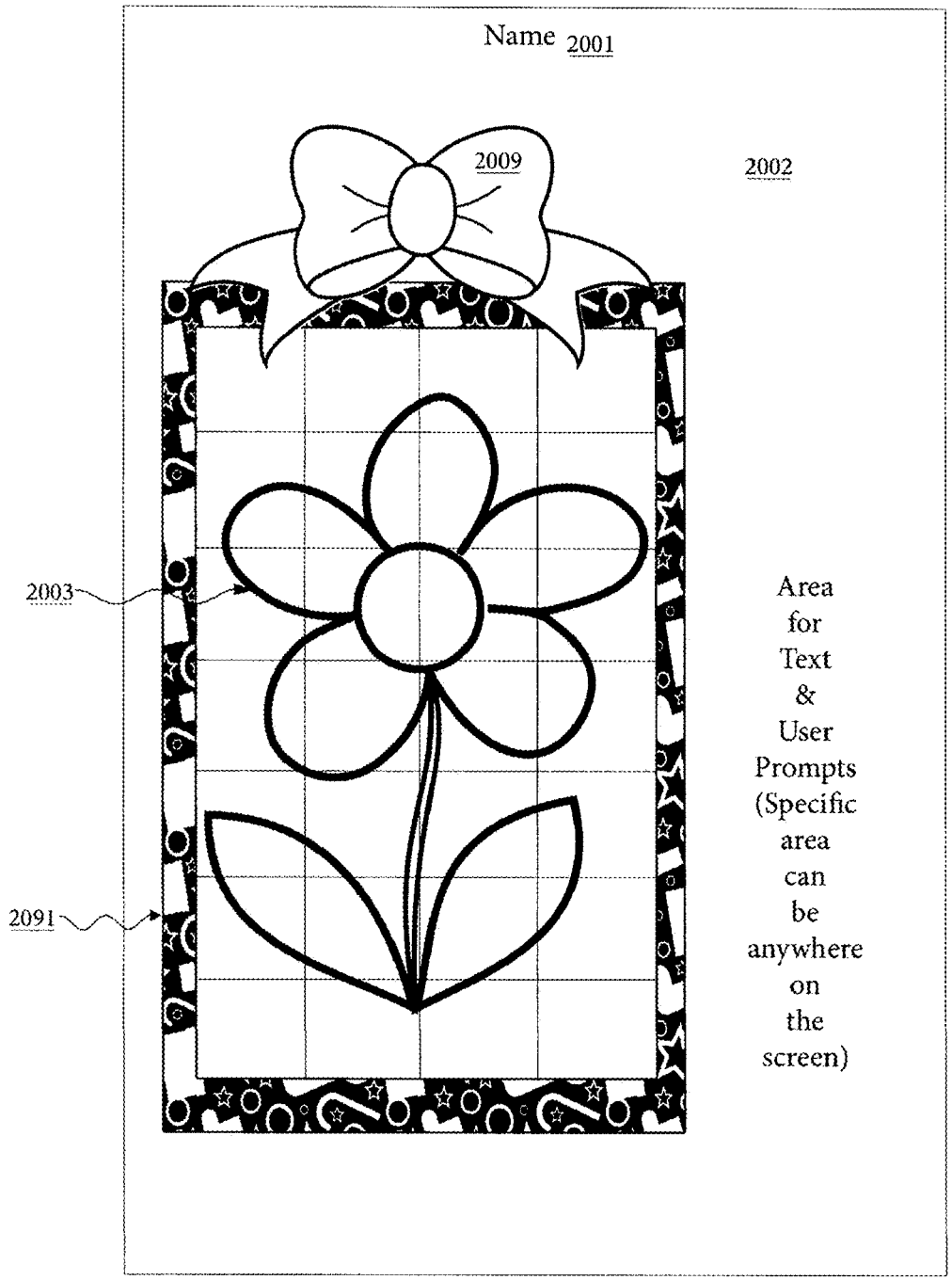
FIG. 20 shows a visual display for an electronic device, in accordance with one embodiment of the present patent application.
Figure 21:
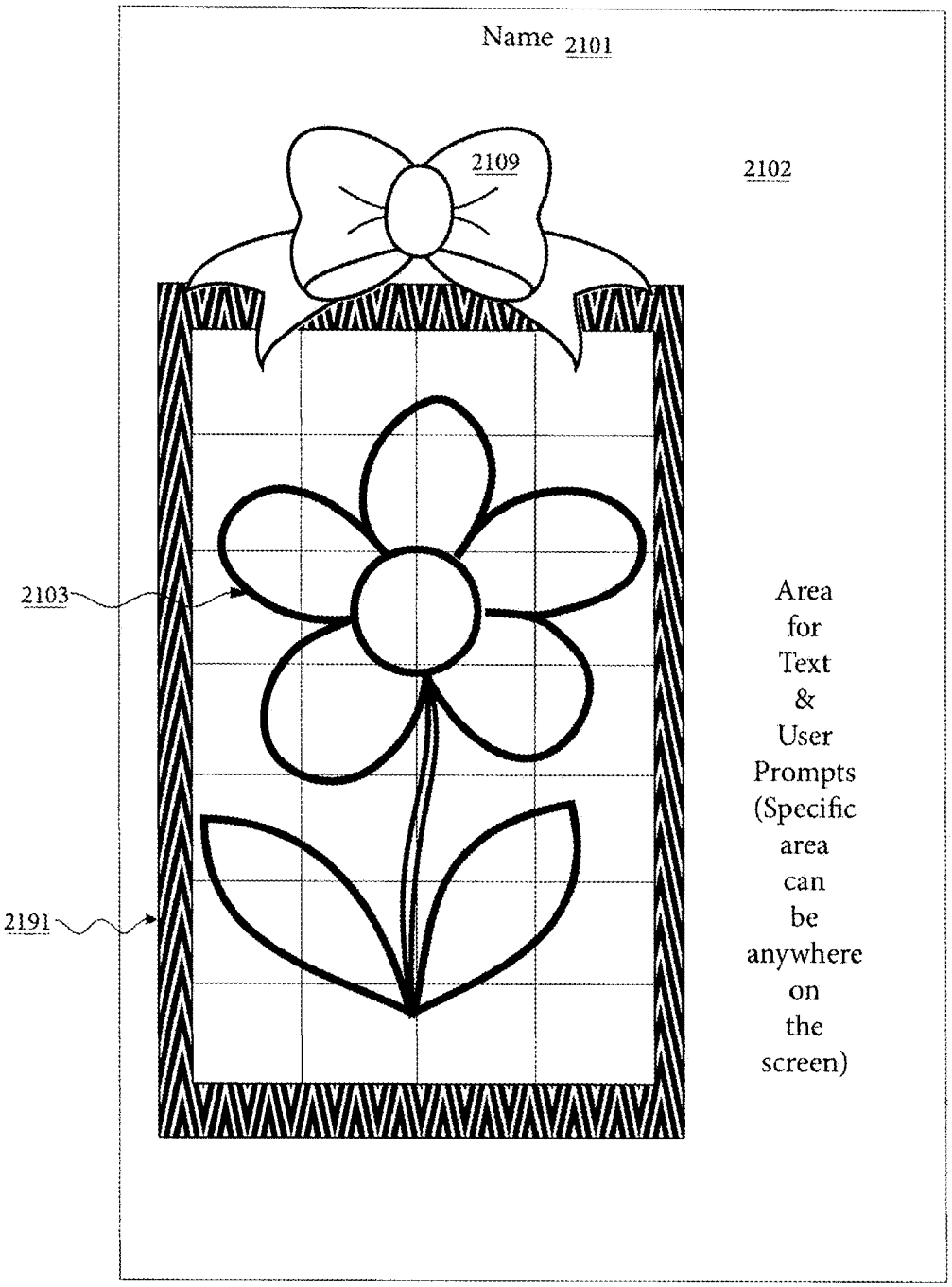
FIG. 21 shows a visual display for an electronic device, in accordance with one embodiment of the present patent application.

In one embodiment, as items are added to the list, the server 100 (FIG. 1) may recalculate the value of each part so that the values of the parts individually remain consistent with the first item on the list or in a manner selected by recipient. In one embodiment, the recipient may customize and modify the value of the parts. However, for contributors, the items on the list are bunched into what would be analogous to one item. Since the list may be long, the display may only show an option to purchase the top priority parts first, and then progress down the list and show other items as purchases are made for the top parts. Referring to FIG. 18, in one embodiment, only the flower 1803 is currently listed for funding by offering its individual parts for sale and contribution, and the next item on the list, the chick 1833, underneath the flower and its related parts are already visible. As such, the contributor has to finish the flower parts first, and once the flower is fully funded, then the chick 1833 parts are next to be offered for contribution from the contributors. Another item may follow the chick, although not visible, but it would move up the chain as the chick enters active availability for crowdfunding. In one embodiment, the recipient may be able to scroll down the list of items and see all the items that the recipient has listed and its parts. In another embodiment, the recipient may not be limited to purchase only from the top item, as shown by example in FIG. 18 as the flower 1803, but would be able to purchase parts for the other items, as shown by example in FIG. 18 as the chick 1833. For example, in one embodiment, the recipient may be able to purchase two parts of the flower and three parts of the chick, or any other of the many combinations of parts. In another embodiment, the recipient may be able to select an execution button or command that places all the parts of a particular item into the shopping cart for easy and quick selection of many parts.

In one embodiment, as items are added to the list, the server 100 (FIG. 1) will preferably allow the user to set a part value for each part on the gift being added so that part(s) have an individual cost, have a collective uniform cost for each item, or have a mixture of part price zones in each item. In one embodiment, each gift may have its part prices that are different from other gifts. In one embodiment, for contributors, each part price of each gift is independent and may be different from the part price(s) of the following gift(s), if any. In one embodiment, if there are multiple items on a list, then the display may show the first item available for funding, as determined by the recipient, and the contributors are asked to purchase part(s) from this item first. In one embodiment, once these parts are purchased from the current item, then the next item moves up the list and is then displayed to the users and potential contributors.

Figure 25:
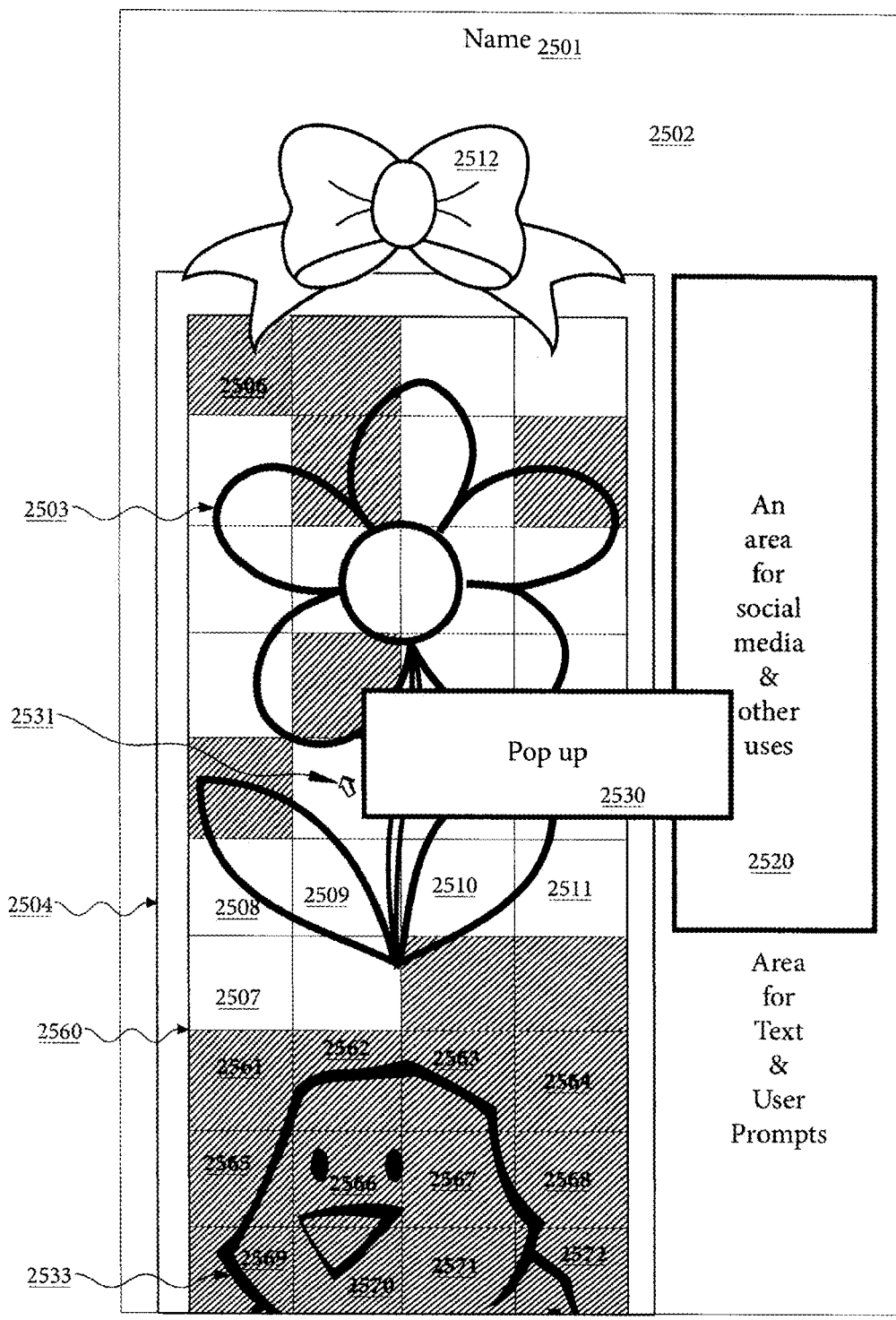
FIG. 25 shows a visual display for an electronic device, in accordance with one embodiment of the present patent application.

In one embodiment, pertaining to lists of items, the recipient may be able to engage in the social media platform, for example but without limitation, the social media platform provides and encourages the contributors, users, recipients, and others, to engage in social media including but not limited to communications, mark particular comments, engage in comments within comments, upload graphics and/or pictures, and use multi-methods of communication to engage in exchange of dialogue, emotions and graphic documents, while remaining on the system 100 (FIG. 1), display page and/or platform. The same social media platform, systems and methods disclosed in FIGS. 3A-3C may apply for a user who is viewing the item in a list. In one embodiment, the item in a list may also be linked and shown the social media associated with a particular part. By way of example, but without limitation, if a part of a list is purchased, the contributor may make comments to the social media platform and such comments 2530 (FIG. 25) may be linked to this or these specific parts purchased by the contributor. Referring to FIG. 25, in one embodiment, other comments may be added by others in the social media network to this comment feed 2520 and/or 2530, and other users may engage the social network and this feed by providing marking and/or graphical comments 2520 and/or 2530.

FIG. 25 shows one embodiment whereby a social media platform comment associated with a particular part is shown when this particular part that was already purchased is selected, clicked or pointed at with an input device 1531 (FIG. 15).

Referring to FIG. 15, in one embodiment, the popup 1530 does not necessarily need to be a popup. The information may be displayed to the user in any manner, including but not limited to as a popup, adjacent to the gift item display (e.g., next to 1504 in FIG. 15), on the part(s) itself, anywhere on the display area, or on any other individual display page.

In one embodiment, the social media platform linkage to a part may function and be provided whether it pertains to one item (as in FIG. 14) or multiple items (as in FIG. 25).

In one embodiment, the recipient may organize the list, setting priority of items, from the most preferred down to the least preferred item. This way, items get funded in the same priority as the recipient wants to receive the items. For example, if the recipient posts three items, a flower for $200, a rocket for $500, and a chick for $300, the total amount is $1,000. In one exemplary embodiment, a hypothetical scenario of no taxes, no shipping and no fees is used. The recipient may organize the list, setting the rocket as priority #1 on the list, the flower as priority #2, and the chick as priority #3. In other embodiments, the recipient may use any other order that is desired. In one embodiment, if the recipient selects the flower as the first item, at $200 cost to fully fund, and the server 100 (FIG. 1) and recipient had set the parts' value at $20 each, then there would be 10 parts each valued $20. In one embodiment, the parts may have different values from each other, but for the purposes of this example, the parts are all of equal value. When the priority #2 item, the rocket for $500, is added, the total list cost to fund increases to $700. The server 100 (FIG. 1) automatically sets 35 parts each valued at $20, so collectively the whole price to fully fund is $700. If no other item was added to this list, and the list remained with the flower as priority #1 and the rocket as priority #2, then the contributors would initially be able to purchase parts of the flower. When all the parts of the flower are purchased, fully funded with $200 (10 parts at $20 each), then the order for the flower purchase and delivery would be sent to the retailer 120-122 (FIG. 1) for execution. If this execution is successful, then the rocket is next on the list to be purchased. Alternately, had someone contributed several parts when the flower was already $160 purchased, say the contributor now contributed $80 (4 parts), $40 would be applied to the flower, and this order would be executed, and the remainder $40 would be credited towards the rocket. In one embodiment, if the flower order execution failed—due to lack of inventory, price not match, or other events—then the funds from the flower may be applied to the next item on the list, the rocket, and now the rocket's parts would receive a credit at $200 value, leaving a balance of $260 ($500 rocket cost minus $40 parts already purchased minus $200 money credited from flower's order execution failure). In one embodiment, the recipient may have the option to add an item to the list during the selection and customization provided in FIGS. 2A-2D. In one embodiment, the ecommerce system and methods disclosed herein may be used for the payment and execution of a list having any number of items (e.g., 15 or 25 items).

In one embodiment, if the recipient selects the flower as the first item, at $200 cost to fully fund, and the server 100 (FIG. 1) and recipient had set the parts' value at $20 each, then there would be 10 parts each valued $20. In one embodiment, the parts may have different values from each other, but for the purposes of this example, the parts are all of equal value. In one embodiment, when the priority #2 item, the rocket for $500, is added, the server 100 (FIG. 1) automatically and/or the user sets the part prices (if, as an example, the rocket's part prices were set to $10 per part, then there would be 50 parts to purchase the rocket). If no other item was added to this list, and the list remained with the flower as priority #1 and the rocket as priority #2, then the contributors would initially be able to purchase parts of the flower. When all the parts of the flower are purchased, fully funded with $200 (10 parts at $20 each), then the order for the flower purchase and delivery would be sent to the retailer 120-122 (FIG. 1) for execution, presuming that the gift receiver had not locked these two items by retailer as previously explained. If this execution is successful, then the rocket is next on the list to be purchased.

In one embodiment, if a contributor contributed a general amount that exceeded the amount to fund the flower, when the flower was already $160 purchased, say the contributor now contributed $80, $40 would be applied to the flower (two parts at $20 each), and this order would be executed, and the remainder $40 would be credited towards the rocket (4 parts at $10 each). In one embodiment, if the flower order execution failed—due to lack of inventory, price not match, or other events—then the funds from the flower may be applied to the next item on the list, the rocket, and now the rocket's parts would receive a credit of the amount contributed towards the flower.

In one embodiment, the contributor may select from various items and purchase parts without restriction as to which item he or she wants to purchase. Items may be processed for purchase from the retailer once each particular item is funded. In one embodiment, the contributor may purchase parts from different items, but only the items shown on the display.

In one embodiment, the list(s) posted by the recipient may be available for contributors' contributions for a set time period until which time, if the list is not fully funded, the total balance that was paid for by contributors for the parts of the item(s), minus any fees, that is remaining after all executable orders to the retailers is then executed into gift card(s) and/or store credit and/or any other method for applying a credit. In one embodiment, once the recipient posts a list, the systems and methods may allow for contributors to purchase parts of the item(s) on that list for four months. If all of the items' parts on the list are purchased before the four month deadline, then the list and its parts were fully funded and order(s) executed with the retailer(s). In one embodiment, if the list is not fully funded at the end of the seven day deadline, and the contributor has purchased one or more parts, and there is a monetary balance on the account from incomplete fully funded items or non-executable orders, then the systems and methods may execute the gift card purchase(s) and/or store credit and/or any other method for applying a credit. The four month and seven day deadline period is an example only, as this time duration period may be any time amount. In one embodiment, the systems and methods may set the time duration period automatically. In another embodiment, the systems and methods may provide a recommended time duration period and the recipient may modify this time deadline period. In another embodiment, the systems and methods may ask the recipient to enter or specify the time deadline period. The way that the systems, methods, and recipient set the time duration period is not limiting, as any way that this may be determined and set is included in the present patent application.

Figure 26:
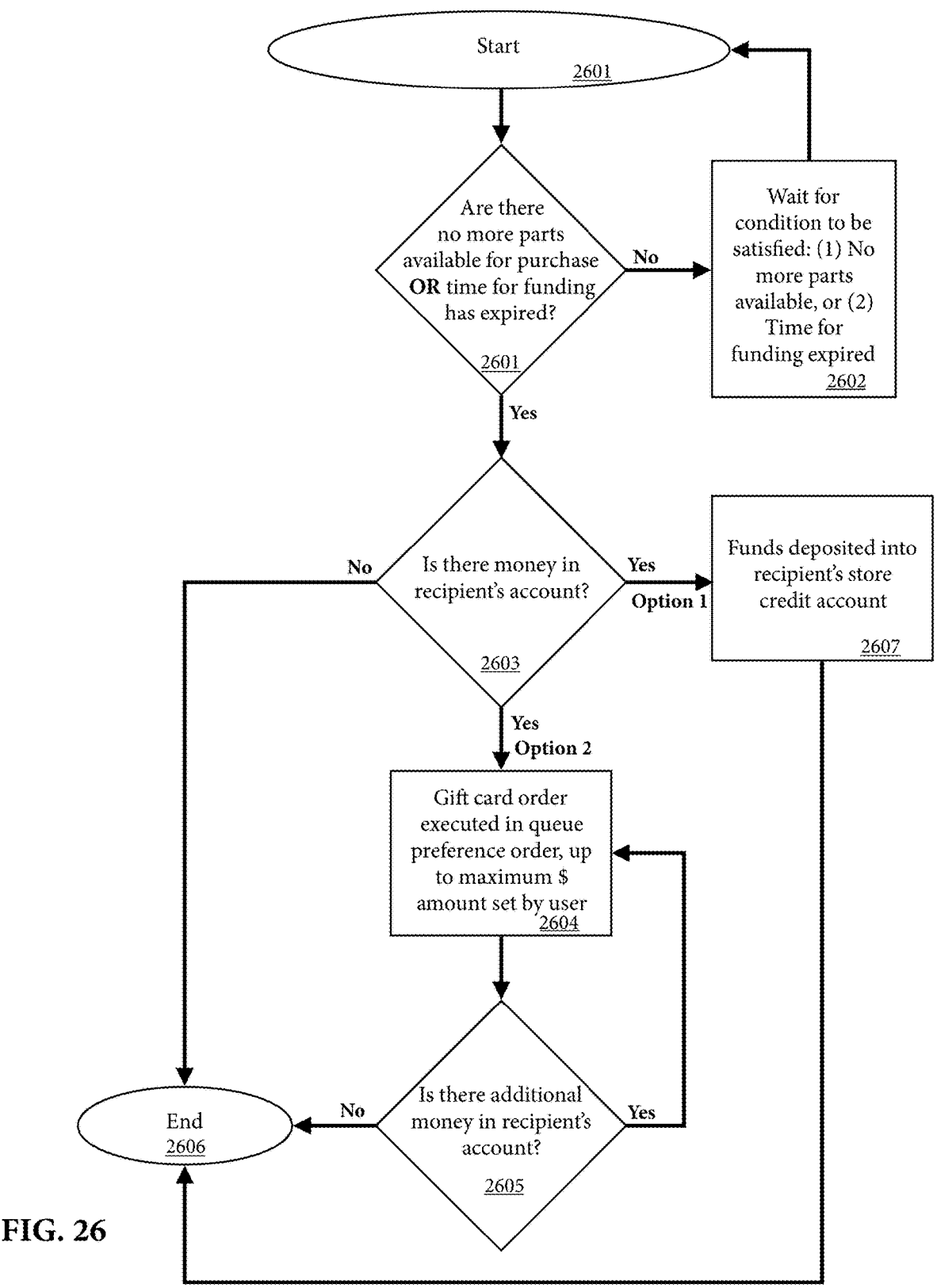
FIG. 26 is a flow chart showing steps utilized by an ecommerce system to determine whether one or more orders for one or more gift cards are to be executed, in accordance with one embodiment of the present patent application.

In one embodiment, the ecommerce systems and methods disclosed herein may allow for the purchase of a gift card, or several gift cards, for funds that have been contributed by the contributors that exceed the amount of money to complete executable orders or excess funds of items not fully funded. Referring to FIG. 26, in one embodiment, regardless of whether the recipient listed one item or many items, the possibility exists that orders as initially anticipated when the item is posted may not be executed for any reason, such as, but not limited to, lack of inventory, discontinued item, retailer unavailable, retailer technical issues, retailer out-of-business, price change, item change, or any other reason. In one embodiment, the funds deposited by contributors for the purchase of the item(s), minus any fees, at the conclusion of a set time period, may be converted to one or more gift cards, as selected by the recipient in step 210 (FIG. 2A), and/or store credit and/or any other method for applying a credit. The one or more gift cards may be automatically generated and delivered in order of their priority as set by the recipient when the gift card(s) were selected.

In one embodiment, the recipient may set up a list of gift cards, in order of priority and amount that each should require to be fully funded. In one embodiment, the recipient may edit this list by adding gift card brands, removing gift cards brands, or changing the priority list. When contributor funding does not result in an executable order, then the ecommerce system and methods disclosed herein may place the funds into the gift card account. When the funding period has concluded for the item or list, then the gift cards are ordered with the gift card vendor/retailer and sent directly to the recipient. In another embodiment, the gift cards may be generated electronically and delivered to the recipient electronically or in any other digital format.

In one embodiment, the recipient may receive a monetary credit for any funds paid in excess of the amount needed to fund item(s) on list(s). In one embodiment, the recipient may use the credit to purchase other items, apply funds towards others' gift parts, get store credit, get store gift card(s), apply the funds towards a donation, get cash, get a refund, get a deposit into a bank account or credit card, and/or any other way of applying credit and using funds.

In one embodiment, the system may establish a time period for funding each list, or, if no list was made, for each item. In one embodiment, the time period may be set by the administration 180 (FIG. 1) and programming into the server 100 (FIG. 1). In one embodiment, the recipient may be provided with options of recommended time periods to select. In another embodiment, the recipient may custom select a time period for the amount of time allowed to fund the item or list created. In another embodiment, a combination of different options provided may be available to the recipient.

For example, in one embodiment, if the recipient selects and posts a flower for contribution, the recipient may select that contributors have up to seven days, or fourteen days, or six months, or no time restrictions, or any custom time period selected by the recipient.

In one embodiment, when a recipient creates a list, the recipient may select a start date/time and/or end date/time for the list to be available for contribution. In one embodiment, the recipient may change the start date/time and/or end date/time at any time.

In one embodiment, if an item is not fully funded within the time period selected by the recipient 2601 (FIG. 26), then whatever amount was provided by the contributors is automatically, at the end of the time period, processed 2604 (FIG. 26) to purchase the gift card(s) selected by the recipient when the item was purchased, or the gift card(s) later on added to the gift card list.

For example, in one embodiment, if the recipient has selected the flower, and the flower fully funded price is $100, but at the conclusion of the funding period only $80 has been received from the contributors, the ecommerce system and methods generates a gift card that is purchased for the $80, minus any fees and costs, and this gift card is delivered to the recipient.

In one embodiment, the recipient may make a list of gift card(s) that he or she wants to receive in case the item or items on a list is/are not fully funded. For example, in one embodiment, the recipient may select three gift card vendors: vendor 1, vendor 2 and vendor 3. In one embodiment, the recipient selects a maximum of how much for each vendor the gift card may reach and a catch-all gift card option for any additional amounts (the last gift card on the list). In one embodiment, the recipient may select a vendor 1 gift card maximum of $10, a vendor 2 gift card maximum of $20, and a vendor 3 gift card as the catch-all for any remaining balances. For example, in one embodiment, if the flower that was only funded $80, the recipient would receive, presuming no fees discounted, a $10 gift card from vendor 1, a $20 gift card from vendor 2, and a $50 gift card from vendor 3. In one embodiment, if $5 was funded, the recipient would receive a $5 gift card from vendor 1 only. In another embodiment, if the item was funded $20, then the recipient would receive a $10 gift card from vendor 1 and a $10 gift card from vendor 2. The execution of this loop is illustrated at steps 2603-2606 in FIG. 26.

In one embodiment, the ecommerce system and methods disclosed herein provides for issuing gift card(s) automatically for items that are partially funded but not fully funded, and applies whether the recipient is seeking one item or a list of items. Referring to FIG. 26, in the list scenario described herein, the gift card funding may be executed once all the items on the list have been attempted for execution or been executed for order processing 2601, there are no more parts available for purchase 2601, the time available for contributors has expired 2601, and there remains money from contributors in the account 2603.

In one embodiment, if an item or list is not fully funded within the time period selected by the recipient, the recipient may receive a monetary credit for any funds paid in excess of the amount needed to fund item(s) on list(s). The recipient may use the credit to purchase other items, apply funds towards others' gift parts, get store credit, get store gift card(s), apply the funds towards a donation, get cash, get a refund, get a deposit into a bank account or credit card, and/or any other way of applying credit and using funds.

Referring to FIG. 1, in one embodiment, contributors 132 may use an alternate method of purchasing parts, in part or whole, by using venues such as mail 153, email 154, telephone 155 and facsimile 156 by communicating with the administration 180 and providing funding information, payment information and identification information to process the order. In one embodiment, the administration's agent or employee may take down a social media platform comment on behalf of the recipient. In one embodiment, the recipient may provide the above-listed information in a standard written communication by, without limitation, filling out a form or placing the necessary information in writing, and submitting to the administration in the methods specified herein or any other reasonable way to communicate as may be developed in the future. In one embodiment, the administration may execute on the contributor's behalf the order and payment through the server 100 for the recipient's parts that the contributor wants to purchase. Alternately, the administration 180 may process a monetary contribution to the recipient and generate and send one or more gift cards, minus fees, to the recipient. Alternately, the administration 180 may process a monetary contribution to the recipient and generate store credit and/or any other method for applying a credit.

In one embodiment, the system and methods disclosed herein may be accessed through a plug-in or other method for linking other platforms. For example, in one embodiment, a retailer may be allowed, with permission granted, to use a plug-in, link, or any other method to connect to the System 100 (FIG. 1) to use the systems and methods so that users of a retailer may gain access to the platform 100 (FIG. 1).

In one embodiment, the ecommerce system and methods disclosed herein provide a simplified method for a person to communicate what he or she wants to receive, and allows the contributor to purchase parts of the item in an amount that is within the contributor's budget without spending time thinking about what to get the person, spending time getting out to purchase the item, and simultaneously feel satisfied that the contributor is contributing towards an item that the recipient truly wants to receive. In one embodiment, the ecommerce system and methods disclosed herein engage and connect recipients and contributors in a social experience by providing a built-in social network platform that is incorporated into the overall user experience, and may incorporate and blend the purchase of the item's part with a social and emotional connection by providing a system and method for associating social media with specific parts of the gift.

In one embodiment, the ecommerce systems and methods disclosed herein provide a fun, easy and practical way to engage in gift giving and receiving. In one embodiment, the system and methods divide a gift into parts, actual physical parts, which may be seen and purchased. The totally of the parts make up the entire gift. Gift givers are provided an easy way to select and contribute towards the gift. Gift recipients get exactly the item they want, irrespective of the total cost. The gift recipient may desire to receive an item that would typically be outside the budget of the gift recipient's contributors, but by using the system and methods disclosed herein, the gift recipient may post the item, have the system separate the gift into parts of specific values, in any of the manners previously discussed, and then the gift contributors may buy whatever they can afford and want. By providing a system and methods that divides a gift, perhaps a more expensive gift than one may expect from their friends, family and acquaintances if a person was buying such gift by themselves, into several parts less expensive than the original total cost of the item, the systems and method disclosed herein make the gift affordable to contributors buying separate, distinct parts of the overall gift, but in totality all the gift contributors together, by purchasing all the parts, thereby enabling the gift recipient to receive the gift that he or she truly desired.

In one embodiment, the ecommerce system and methods disclosed herein provides a fun and interactive way for a gift giver (i.e., a contributor) to participate in the experience of purchasing a gift for someone. The gift contributor no longer has to think about what specific gift to give, nor have to take a trip to a store, nor have to feel the disconnect when buying a gift card, nor feel compelled to purchase a gift beyond one's financial means, but instead the gift giver may easily, from anywhere, see the precise gift that the other person wants and then make a purchase with the satisfaction of knowing that the gift giver is contribution towards the exact gift that the receiver wishes to receive, and throughout it all having the freedom to buy as many parts of the gift as the gift contributor wishes to buy. This flexibility of buying parts of a gift provides a fun and intuitive way for gift givers to contribute to exactly what someone wants to get, without the dissatisfaction one typically feels by buying a gift card, and providing enormous flexibility to the gift contributor to pay for the parts in an amount that the gift contributor feels is within his or her budget and desires.

In one embodiment, the ecommerce system and methods disclosed herein allows an emotional and psychological connection to be formed between gift givers, gift receivers, and even others who are not participating in the gift exchange but still want to be involved in the festivities. The incorporation of social media platforms provides advantages over prior art systems because the activity of gift giving and receiving is one mixed with social interaction and participation. The social media platforms permits all users to exchange in a dialogue about the gift and the underlying festivities about the gift, permitting a social connection around the gift so that all parties have a more satisfying experience, participate in a deeper way with the gifting, and share the overall experience and moment in a way that is very special and meaningful to all the participants.

In one embodiment, the ecommerce system and methods disclosed herein allows a purchaser of a gift part, or several parts, to personalize his or her gift to the gift receiver, by providing a social media platform that may distinguish the parts, their contributors, and the comments associated with that part. This enhanced social connection between gift giver and gift receiver provides a special communication portal so that a gift giver may feel more connected by associating his or her part purchased with special comments or graphics. Therefore, the gift giver's experience is personalized and emotional to a specific part of the item, and the gift receiver may share in that dialogue, emotional connection and exchange.

In one embodiment, the ecommerce systems and methods disclosed herein greatly enhance the sociological and psychological bonds, connections and experiences that are shared in gift exchanging.

In one embodiment, the ecommerce systems and methods disclosed herein enables an individual to post item(s), individually or in a list (e.g., by using the internet) and to communicate what he or she wants to receive, and then allows the contributors to purchase specific parts of the item(s) in an amount that is within the contributor's budget, while also providing systems and methods to engage and connect the recipient, contributor and users in a social experience by providing a built-in social network platform that is incorporated into the overall user experience, and which may incorporate and blend the purchase of the item's part with a social and emotional connection by providing a means to associate social media with specific parts of the gift.

The present disclosure is in the technical field of retail, and more particularly the technical field of ecommerce. The present disclosure is in the technical field of computer software, and more particularly in the technical field of ecommerce. In one embodiment, the systems and methods disclosed herein provides ways for users to engage in social media sharing and dialogue with regard to a particular item for sale in ecommerce.

The present disclosure is in the technical field of computer software. More particularly, the present disclosure is in the technical field of social media. More particularly, the present disclosure is in the technical field of providing a portal for individuals engaged in ecommerce to also engage in social media in the same portal.

In one embodiment, the systems and methods disclosed herein provide portals for individuals engaged in ecommerce to also participate in social media in the same portal by associating a particular product to their unique social media interactions.

In one embodiment, the present patent application discloses a method of combining social media with an individual product for sale through ecommerce. In one embodiment, the present application discloses providing a social media feed linked to individual products. The users may then read, engage, comment and upload content to the social media feed. In this regard, and by way of example, this creates a uniquely linked social media dialogue associated with a particular product so that a conversation can take place between many users and that particular product, or anything else.

There is currently no system in existence that provides a method for a user to engage in a social media dialogue associated with a particular item for sale in an ecommerce setting.

There is currently no system in existence that provides a method for an ecommerce store, other internet site or application to provide a unique social media dialogue based on a particular product.

The systems and methods disclosed herein provide an improved system, individually and collectively, to engage in the exchange of comments, ideas, digital media, and a general dialogue as it pertains to each individual product.

In one embodiment, the systems and methods disclosed herein enhance the ecommerce and internet browsing experience, providing a method for an open dialogue associated to a product.

In one embodiment, the systems and methods disclosed herein permit users to enter any comment they chose, to discuss anything relevant or not to the product, to upload media, to identify and engage with comments in any manner of showing satisfaction or dissatisfaction to any social media part, and to have an overall conversation through the platform. Thus, the systems and methods disclosed herein provide an easier and faster way to engage in dialogue with any number of individuals on the internet as to a product or anything else.

In one embodiment, the systems and methods disclosed herein provide a novel method of discussing the good and bad about a particular product in a more conversational method. Traditionally, ecommerce platforms have used the system of reviews to allow users to rate a product and provide a comment. However, the prior art systems are one sided, and provide for no or limited dialogue with others. In the systems and methods disclosed in the present patent application, users can openly discuss the product and others can engage in a dialogue with any other user, which allows a more back and forth, traditional dialogue between people.

In one embodiment, a user may comment on the product, and then other users may comment on the comment, so that a dialogue flows as is common in social media.

In one embodiment, users may upload pictures or video or any other digital media format so that others may see it as well, and this digital media will be associated with the particular product. Other users may engage in comments with regards to the digital media, as is typical of social media, but the media and its dialogue is associated and linked to the product.

This method of engaging in social media, providing a method of engaging in social media as to a product, has substantial benefits to the retail marketplace. The systems and methods disclosed herein allow users to engage in social media conversations about a unique product, to learn from each other, permits retailer(s) participation in the dialogue, and overall enhances the communications between everyone about a product, thereby increasing the knowledge about a product prior to purchase, its functionality after purchase, sharing feedback among customers, answering questions quickly, and having an overall social exchange with users and retailers.

Figure 27:
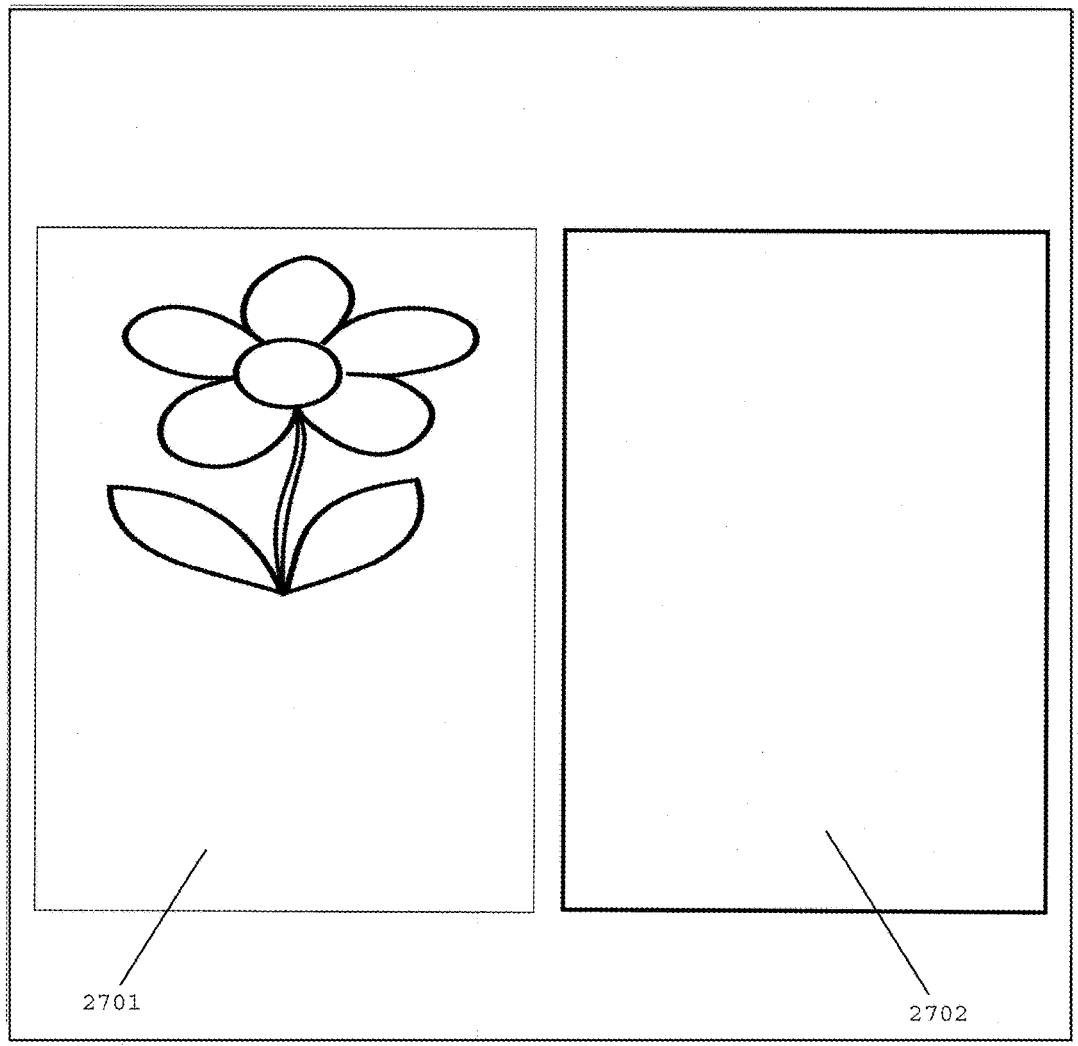
FIG. 27 is a plan view of a display interface showing a retail item and its social media counterpart, in accordance with one embodiment of the present patent application.

FIG. 27 is a plan view of a partially-diagrammatic typical display of a webpage, mobile screen view, tablet screen view, and/or application, or any exemplary display interface, produced by the methods disclosed herein, showing a particular retail item 2701 and its social media counterpart 2702.

In ecommerce it has been the norm for items being sold by a retailer to provide for reviews of various types. These reviews can range from the traditional 5-star system, where purchasers can give a product or item a ranking based on how they feel about particular attributes, where 0 or 1 star is the least, and 5 star rating the best. Other retailers provide simply for a numerical system, where the reviewer can judge the item in a numerical scale, where a certain number represents the worst and another number the highest, or best, review, and anything in between being ranked in numerical order accordingly. Other retailers have a written review system, where purchasers can write opinions. Other retailers have a media upload option, where purchasers can upload digital media associated with the product or item. Other retailers have developed other ranking systems for purchasers to provide feedback and review. And other retailers use a combination of any of these options.

However, ecommerce retailers have not traditionally and do not provide a more general conversation about an item. The systems and methods disclosed herein enables users to review and discuss a product or an item, by merging traditional social media methods, reviews, and product information into a unified experience. Traditional social media allows a user to comment, engage in conversation with other site users, upload digital media, share feelings about particular comments and/or media, and otherwise engage in social dialogue in its various forms of communication and sharing of data (irrespective of the medium).

In one embodiment, the systems and methods disclosed herein provide a software method for allowing users to engage in social media associated to a specific product or item.

In one embodiment, a product or item will have a dedicated social media feed whereby users, irrespective of whether a user is a consumer, a retailer, or a general guest of the site, can share and engage in a general dialogue about the product or item. In another embodiment, the social media feed will appear or display in the same display screen as the product or item. In another embodiment, the social media feed will appear or display in another display screen as the product or item. In another embodiment, the social media feed will be identified as pertaining to a particular product or item.

People or corporations can then engage in social media dialogue about the item or product. In one embodiment, a user who has registered with the site will be able to provide social media conversation or digital media upload. In another embodiment, a corporation (such as a retailer or other business) that has registered with the site will be able to provide social media conversation or digital media upload. In another embodiment, a confirmed purchaser will be able to provide social media conversation or digital media upload. In another embodiment, a confirmed purchaser may be identified in some way to identify to others that the such individual has actually purchased this item. In another embodiment, a guest person or corporation will be able to provide social media conversation or digital media upload. In another embodiment, any one, various combinations, or all of the previously listed persons and/or corporations will be able to provide social media conversation or digital media upload.

In one embodiment, the systems and methods disclosed herein allow for a free flow of discussion about the item or product, without limitation to the number of times a person or corporation comments or engages the social media conversation. Unlike a traditional rating system where users typically provide a singular comment without much back and forth dialogue, the systems and methods disclosed herein create a medium for a free flow of ideas and conversation focused on a particular item or product.

Uploading digital media and engaging in discussion about the digital media is also provided in another embodiment. Users can upload pictures, videos or any other available digital media, to one or more social media feeds. Other users may then comment and engage in social media discussion about the uploaded digital media, provide written words or other uploads of their own digital media.

Another embodiment provides for a method for the user to click an icon or word to share a particular feeling about a post or digital upload. For example, by clicking a certain word or icon, the user may express that he or she likes or dislikes a particular social media comment, or express any other feeling, emotion, or expression.

In another embodiment, users will be able to link their posted social media comments or digital media to another user by name. In another embodiment, the linked user will receive a notification that they were linked in a comment or social media post. In another embodiment, the linked user can then provide a response to the comment in the social media post. Thereby, conversation is engaging and potentially active.

In one embodiment, the social media comments posted with products may also be viewable in other areas of the user experience, including but without limitation a section where all social media, from all sources, is displayed to the user, a homepage where other data such as products information, various social media posts, digital media, advertisements, and other information and data may, and any other user display area.

The systems and methods disclosed herein provide a fun and interactive way for consumers, retailers and others to engage in a dialogue about a particular item or product through an internet platform. Users can be located anywhere in the world and have a conversation about an item or product. Previously, there has been no single location on social media focused on product or item specific social media dialogue.

The systems and methods disclosed herein allow connections between users of the system. Individuals and corporations may help each other make decisions about purchasing an item or product, may quickly and easily answer questions to each other, may provide information to each other about the product or item, and/or may simply engage in a dialogue about an item or product.

In one embodiment, the systems and methods disclosed herein allow greatly enhanced communication between the retailer and the consumer. Consumers may ask questions and have a conversation with the retailer about a particular item. Retailers may engage current and potential customers about a particular product or item. This back and forth dialogue greatly increases the ecommerce shopping experience, personalizes shopping, makes ecommerce shopping more social, and further connects the retailer and consumer.

In one embodiment, the systems and methods disclosed herein enable a social media feed to be specifically linked to a product or item, thereby allowing people and corporations to engage in social media dialogue about that particular product or item.

In one embodiment, the present patent application discloses a method of combining computers, tablets and mobile phone platforms into a practical calendar, event tracker, event organizer, invitation system, guest list tracking, social conversation, media storage and organizer, and storage of all matters related to events for short-term or long-term review.

There are currently different methods in existence to organize events using the internet. There are currently different methods in existence to engage in social media about events. There are currently different methods in existence invite guests and track guest status for events. There are currently different methods in existence for people to upload digital media pertaining to events. There are currently different methods in existence for people to store social media and/or digital media for short-term or long-term viewing.

However, there is currently no system in existence that provides a method for the user to collectively use these methods and then store them collectively for short-term or long-term accessing.

The systems and methods disclosed herein provide a method for a user to collectively link an event notification, event invitation, social media dialogue, media storage and conversation, and a gift list whereby the event organizer may actually get the physical gift(s) in the gift list.

The systems and methods disclosed herein enable users to engage in the exchange of comments, ideas, digital media, and a general dialogue as it pertains to any event planning and organizing. In one embodiment, the systems and methods disclosed herein enables multiple users to upload digital media to be easily accessed by the event organizer and/or event attendees.

In one embodiment, the systems and methods disclosed herein enable event organizers and/or event attendees to access a collective time capsule of the entire event activities and related matters.

In one embodiment, the systems and methods disclosed herein enable event organizers to post exactly what gifts they want to receive, and allows event attendees to access the list(s), make purchases towards the actual physical gift and/or part(s) of the actual physical gift, and once fully funded or paid, the system issues an order for the recipient to receive the actual item.

In one embodiment, the systems and methods disclosed herein enhance the internet using experience, and enhances the social connection between people by providing a way to engage in easier dialogue associated with an event, share mutually digital media with the party host and/or each other, organize and store all memories associated with an event in one location, and keep all event related matters in one easy to access and locate spot on the internet.

The systems and methods disclosed herein enables users to organize events from start to finish, provides an easier and faster way to organize events, to have a social platform about the event, get gifts associated with the event, and store data related to the event with any number of individuals on the internet.

In one embodiment, the systems and methods disclosed herein enable users to upload pictures or video or any other digital media format so that others may see it as well, and this digital media will be associated with the particular event. Other users may engage in comments with regards to the digital media, as is typical of social media, but the media and its dialogue is associated and linked to the product. This media will be incorporated into the event and stored collectively with the event, thereby encompassing an overall event experience.

In one embodiment, the systems and methods disclosed herein allow a user to list or link a gift list(s) to the event so that the guests know exactly what the host wants to receive, allows the guests to purchase actual gifts from the list(s) and/or part(s) of the items from the list(s), and the system will desirably execute the transaction and order the actual item so that the host gets the item(s) that the host wants.

This method of engaging in event planning, event organizing, event communicating, event sharing of comments and digital media, event gift giving, and event data storage, has substantial benefits to the public as a whole. In one embodiment, the systems and methods disclosed herein allow users to engage in social media conversations about a event, enhances the communications between everyone about an event, shares and provides a method for giving the host the gift he or she wants, provides a method for everyone to easily share photos, videos and digital media associated with that event, provides a portal for party participants to communicate and engage in dialogue before, during and after the event, and keeps all the event data in one easy to find location on the internet where people can find the event and its related data. The organization of all-inclusive event related data and its accessibility collectively is of substantial benefit to the public.

Figure 28A:
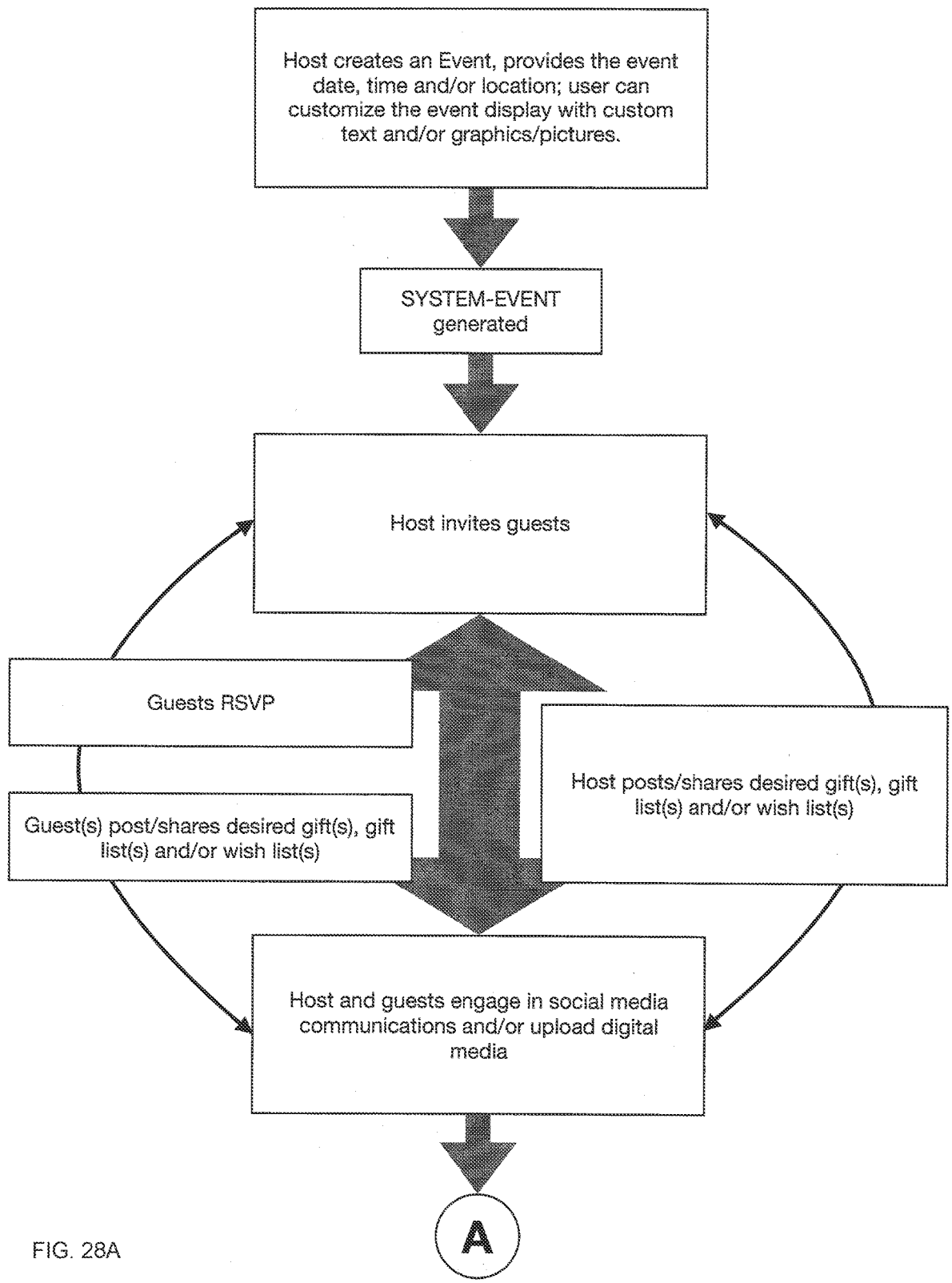
FIG. 28A depicts a first portion of a flow diagram showing steps for creating an event, in accordance with one embodiment of the present patent application.
Figure 28B:
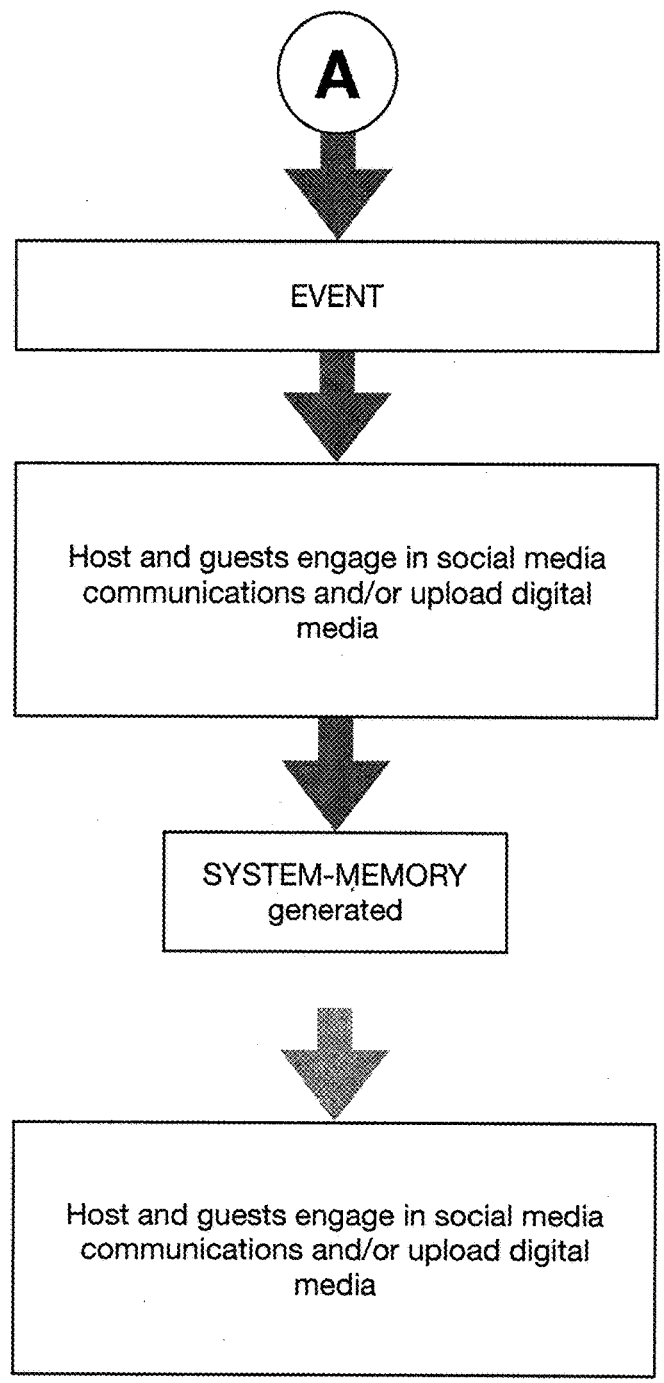
FIG. 28B depicts a second portion of a flow diagram showing steps for creating an event, in accordance with one embodiment of the present patent application.

FIGS. 28A and 28B depict a flow diagram showing steps typically performed by the system and users while using the system and methods disclosed herein.

Event planning, inviting, organizing, gifting, and post-memory organization and storage, is an important aspect of people's social routines.

However, internet companies have not traditionally and do not provide an all inclusive pre-event, during-event, and post-event experience. In one embodiment, the systems and methods disclosed herein provide an improved method for users to participate in an all inclusive pre-event, during-event, and post-event experience.

Although there are several technologies that touch on various aspects of the systems and methods disclosed herein, no single use can be found that combines all of the methods together. For example, traditional social media allows a user to comment, engage in conversation with other site users, upload digital media, share feelings about particular comments and/or media, and otherwise engage in social dialogue in its various forms of communication and sharing of data (irrespective of the medium) as it pertains to an event. Traditional electronic-invitation services provide a method for users to send invitation cards through email, text and other methods, and for the user to track guest RSVP information. Traditional gift lists provide a method for users to find what somebody may want for a gift. In one embodiment, the systems and methods disclosed herein combine all of the various individual components about an event, adds other novel system and methods, and creates new systems and methods for pre-event, during event, and post-event management, engagement, organization, storage and display.

Various embodiments of the invention provide a software method for allowing the user to engage in pre-event, during event, and post-event activities.

Pre-event. In one embodiment, a host may use the systems and methods disclosed herein to create an event in the system. In one embodiment, this system-event may have its own landing webpage or display page. In another embodiment, the system-event may be inclusive within the host's display pages.

The system-event can be decorated and customized with any numerous display graphics and text, to personalize the system-event to the host's preferences.

The host may provide information about the event, by specifying the system-event's date, time and/or location, and other information may be entered.

In one embodiment, the systems and methods disclosed herein enable a host to provide guest information for an event. In one embodiment, the host may be provided with the option to enter emails to be notified of the event. In another embodiment, the host will be provided with the option to enter telephone numbers for text message. In another embodiment, the host will be provided with the option to enter addresses for written invitations. In another embodiment, the host will be provided with the option to login to his or her third-party email providers so that the system automatically uploads email addresses stored in those third-party email providers. In another embodiment, the host will be provided with the option to login to his or her various third-party social media platforms to share the event on those other third-party social media platforms. In another embodiment, the host will be provided with the option to share the event invitation with other users on the same system. In another embodiment, one, various, or all of these embodiment are used.

In one embodiment, the systems and methods disclosed herein enable a host of a system-event and/or other users to manage guests and RSVPs, share comments and engage in conversation, and upload digital media. In one embodiment, the host is be able to view the guest list, manage the guest list by adding and/or deleting guest, and manage any of the various system-event settings. In another embodiment, the host is able to CRUD various customizable text and graphics on the system-event page. In another embodiment, any user can RSVP on the system-event. In another embodiment, all users can engage in social media comments within the system-event, so that any user can provide a comment, and any other user can comment on the comment. In another embodiment, all users can upload and/or share digital media, with or without a comment, and others can provide comments to the digital media. In another embodiment, users can share their likes, dislikes or other feelings to a comment and/or digital media on the social media feed. In another embodiment, one, various, or all of these embodiment are used.

In one embodiment, the systems and methods disclosed herein enable hosts to notify the guests and/or other users of what gift or gifts the host would like to receive associated with the system-event. In one embodiment, the host can link a list of items to the system-event so that guests of the system-event and/or users, can view the list to make purchases from the list. In another embodiment, the host can link a specific item or items to the system-event, so that guests of the system-event and/or users, can view the item or items to make purchase(s). In another embodiment, the guests and/or users can add gift item(s) to the system-event for anyone to purchase. In another embodiment, one, various, or all of these embodiment are used.

In one embodiment, the systems and methods disclosed herein allow any invited guest to the system-event to notify or make aware to the other the guests and/or other users of what gift or gifts the invited guest would like to receive associated with the system-event. In one embodiment, when the guest is invited to the system-event, the guest can link a gift list or wish list to the system-event so that anyone can access by way of a link or viewed list the invited guest's list of items, whether one or many, which the invited guest wants to receive. In another embodiment, the guest that is invited to the system-event can link, at any time, a gift list or wish list to the system-event so that anyone can access by way of a link or viewed list the invited guest's list of items, whether one or many, that the invited guest wants to receive. In another embodiment, guests to the system-event can link or specify gift(s), gift list(s) and/or wish list(s) to the system-event so that anyone can access this information so that the guests get the gift(s) they want. In another embodiment, people who access the guest's gift description, gift list and/or wish list can make a purchase immediately from the system-event's host, the retailer or third-party company selling the item. In another embodiment, one, various, or all of these embodiment are used.

In one embodiment, the systems and methods disclosed herein allow any invited guest and/or permitted user to engage in conversation and/or social media activities during the date and time of the system-event. In one embodiment, guests and/or permitted users can post comments, and comments to the comments. In another embodiment, guests and/or permitted users can upload digital media with or without text comments, and others can provide comments to the digital media. In another embodiment, guests and/or permitted users can make contributions to requested gift(s). In another embodiment, one, various, or all of these embodiment are used.

In one embodiment, the systems and methods disclosed herein generate a system-memory after the system-event date and time elapse. In one embodiment, this is triggered automatically after the date and time of the system-event pass. In another embodiment, the host sets a specific date and time for the system-event to be converted to a system-memory. In another embodiment, the system automatically sets the system-event to a system-memory at a specified date and time.

In one embodiment, the systems and methods disclosed herein allow for managing and engaging a system-memory. In one embodiment, all the functions of system-event continue to operate after the transition of a system-event to a system-memory. In another embodiment, only certain functions of system-event continue to operate after the transition of a system-event to a system-memory. In another embodiment, no functions of system-event continue to operate after the transition of a system-event to a system-memory, and so the system-memory becomes frozen or locked from adding additional data.

In one embodiment, the systems and methods disclosed herein display a system-memory. In one embodiment, the system-memory has a unique identifying marker of any kind to so designate it as a system-memory, so that when users can find system-memories in the system and select the applicable button to view or access the system-memory. In another embodiment, viewing the data in the system-memory is selected by any kind of user interface button without special designation of it as a system-memory.

When selecting the system-memory, the user can view the data that was stored in the system-event plus, if applicable, any additional data stored after it was converted to a system-memory. All the data that was stored connected with the event identified as system-event and system-memory, including but not limited to the invitation, RSVPs, social media, digital media, and/or any other data, can be viewed to the user.

In one embodiment, the systems and methods disclosed herein locate all the data stored for a system-event and system-memory within one section of the user experience that is easily linked with each other so that it is interconnected.

The methods so described can be used by individuals and/or corporations, and for any type of event whether personal, business or otherwise.

In one embodiment, the systems and methods disclosed herein provide a fun and interactive way for consumers, retailers and others to plan, organize, manage and engage in events. Users may be located anywhere in the world and participate in all aspects of the event. Previously, there has been no single location on social media or the internet with such diverse and complete event information.

In one embodiment, the systems and methods disclosed herein provide a fun and interactive way for consumers, retailers and others to share information about an event. Users can take part and exchange communications and share digital media, interconnecting event guests in a more dynamic and engaging method.

In one embodiment, the systems and methods disclosed herein allow for connection between users of the system. Individuals and corporations may help each other make decisions about event planning, may quickly and easily answer questions to each other, may provide information to each other about the event, and may simply engage in a dialogue about an event.

In one embodiment, the systems and methods disclosed herein allow guests to know what gift(s) the host and/or the guests of the event would like to have, and provide an easy method of making such purchases, which simplifies the event guests' preparedness for the event, saves time by not having to look for a gift or searching for the right item to buy someone, and greatly streamlines the gift buying process whether purchasing an item for the host or many items for many guests.

In one embodiment, the systems and methods disclosed herein enable users to use the internet for event planning, inviting guests, notifying others of the gifts event hosts and/or event guests want to receive. The systems and methods disclose herein preferably facilitate the gift giving-receiving process, provide a way for event participants to share dialogue and digital media, and provide a way for an event data and memory to be stored for future use, viewing and reflection, thereby allowing people and corporations to better create, engage, participate and store memories of events.

In one embodiment, the systems and methods disclosed herein may use computer software including smart phone software. In one embodiment, the systems and methods disclosed herein may involve user interface (UI) development and implementation.

In one embodiment, the systems and methods disclosed herein provide the user of a handheld smart phone device or any other handheld digital interface screen with the option to select whether the user prefers an upper or lower button experience and/or a left or right handed button experience.

In one embodiment, the systems and methods disclosed herein enable a user to select the locations for the buttons needed to interact with the software. For example, the user may select to have the buttons located at the top of the screen or at the bottom of the screen. In one embodiment, the user may elect to have the buttons needed to interact with the software set for primary right hand use or left hand use.

There is currently no system in existence that provides a method for a user to make these settings as an all encompassing experience of upper, lower, left and/or right button settings. The system and methods disclosed herein will desirable permit users to customize their user experience with the software (e.g., by enabling a user to select the locations where the entry keys or buttons are located on the visual display of a smart phone). Thus, the systems and methods disclosed herein enable users to customize their settings as to where they want the user interface buttons to be located, thereby facilitating the use of a mobile device or smart phone using only one hand.

In one embodiment, the systems and methods disclosed herein permit users to select to have all the buttons needed to interface with the software to be on the bottom, and right hand dominant, so that when a user is carrying the mobile device in one hand he or she can fully engage and interact with the software without having to use a second hand or move one's hand position. The same concept and capabilities apply for users preferring a left hand dominant setting. In one embodiment, if a user, for whatever reason, prefers an upper button experience, he or she may make that selection and, if so implemented, have the option of selecting right or left hand dominant for the upper button preference.

In one embodiment, the systems and methods disclosed herein provide a novel method for users to use a mobile device exclusively with one hand, without having to use two hands or drastically shift the hand holding the device. In one embodiment, the systems and methods disclosed herein will allow a user to carry and fully use a mobile device's software with one hand and easily carry something else in the other hand.

This method of engaging and using a mobile device's software, fully with only one hand, has substantial benefits to the user. In one embodiment, the systems and methods disclosed herein allow users to use their mobile device while freeing the other hand to do any other activity. For example, individuals often walk and use their mobile devices, simultaneously carrying a bag, documents, or anything else in the other hand. Prior art software systems on the market require the person to either reposition their one hand to reach buttons on various parts of the screen or inconveniently put down whatever is in the other hand to fully engage the software. In one embodiment, the systems and methods disclosed herein solve this problem, thereby providing a significant benefit.

Figure 29:
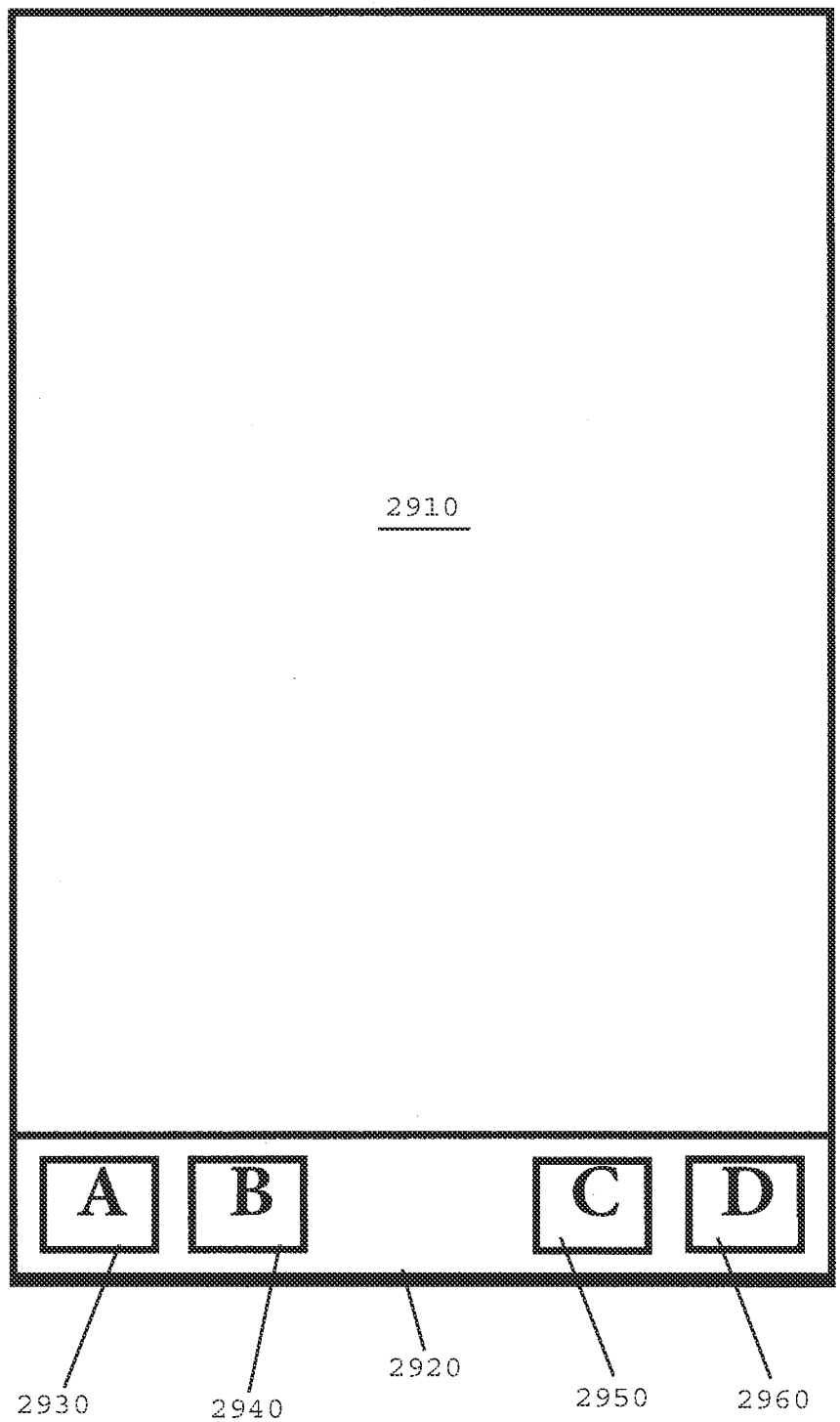
FIG. 29 is a plan view of a mobile device showing the placement of the user-interface digital screen buttons, in accordance with one embodiment of the present patent application.
Figure 30:
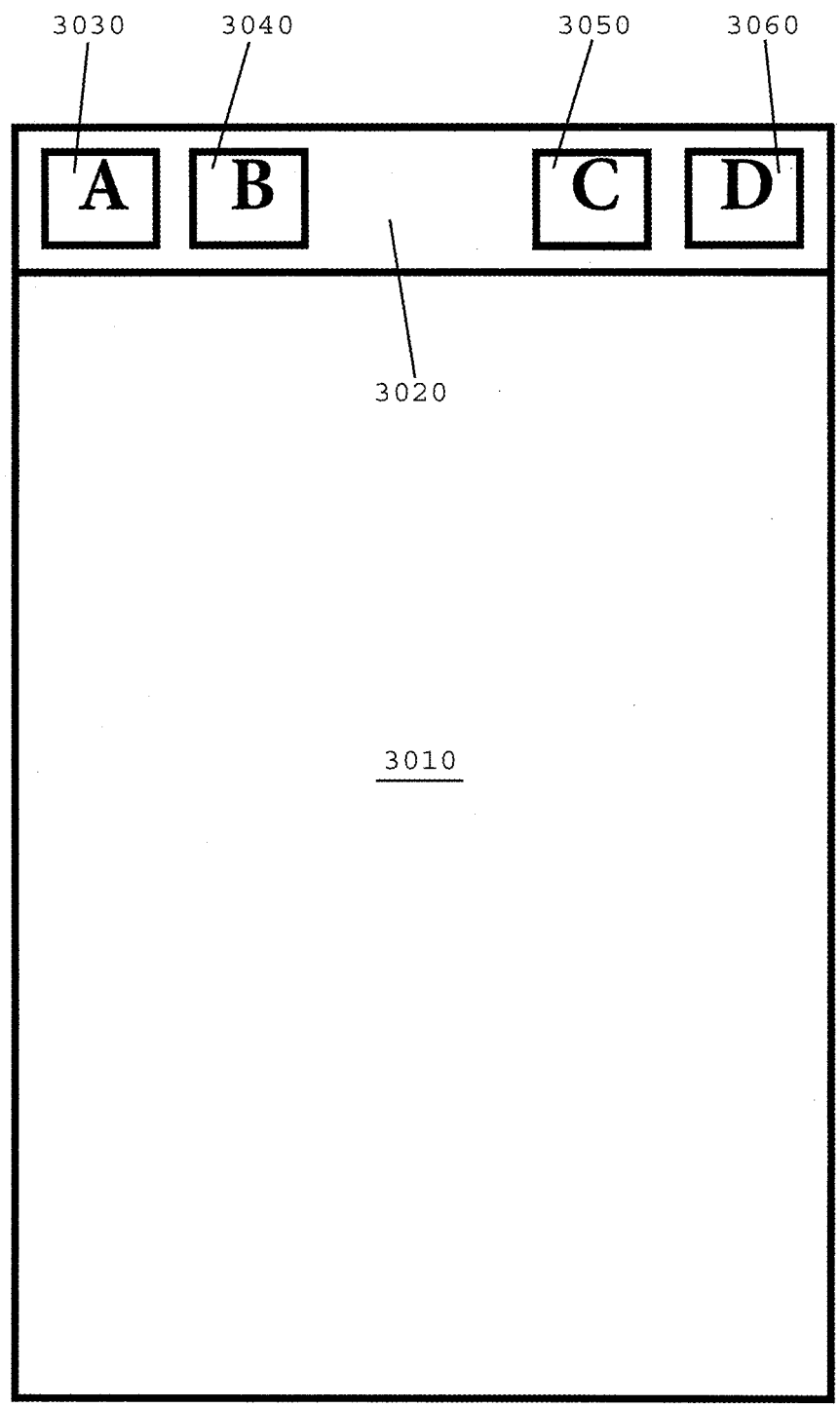
FIG. 30 is a plan view of a mobile device showing the placement of the user-interface digital screen buttons, in accordance with one embodiment of the present patent application.
Figure 31:
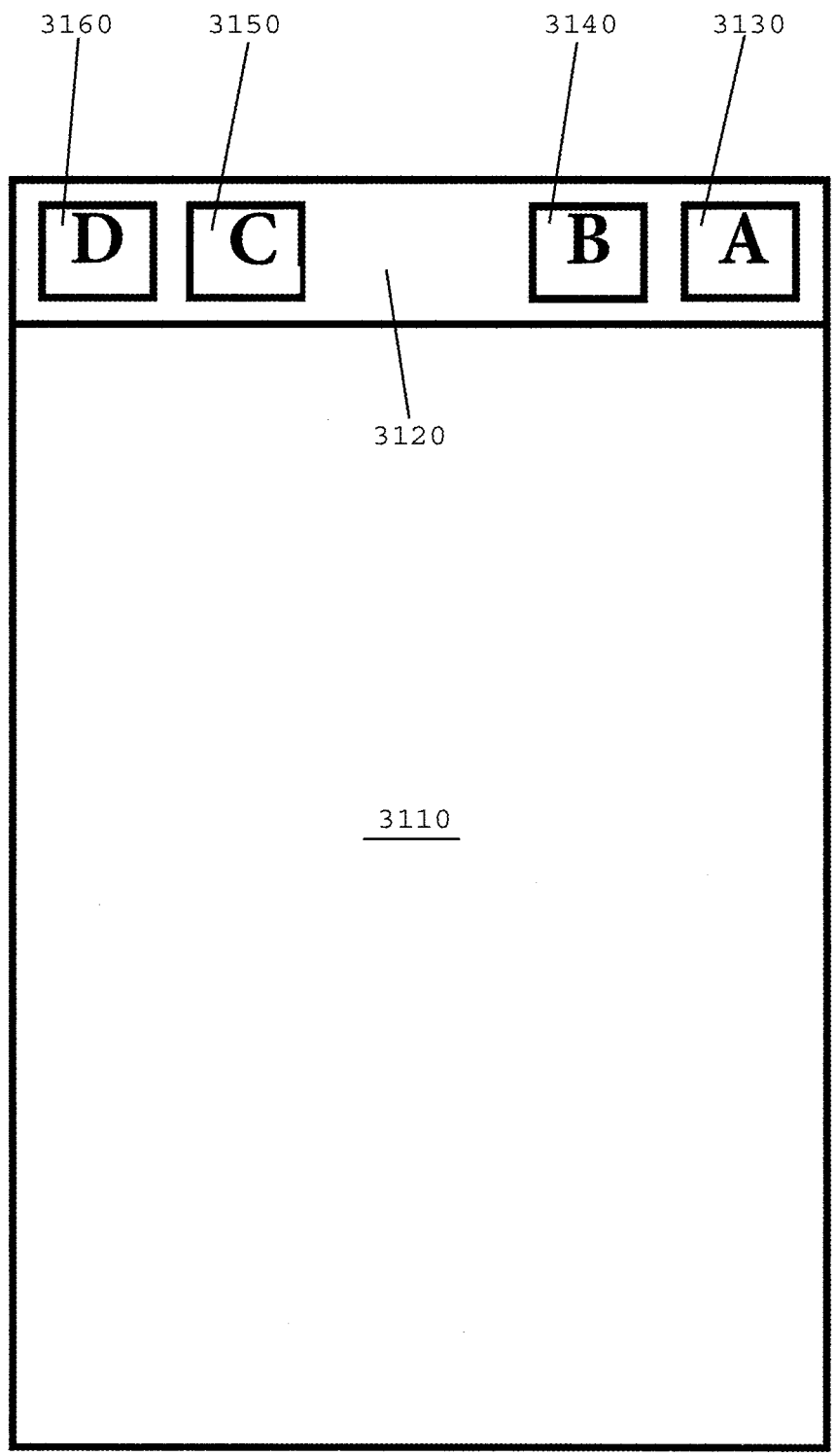
FIG. 31 is a plan view of a mobile device showing the placement of the user-interface digital screen buttons, in accordance with one embodiment of the present patent application.
Figure 32:
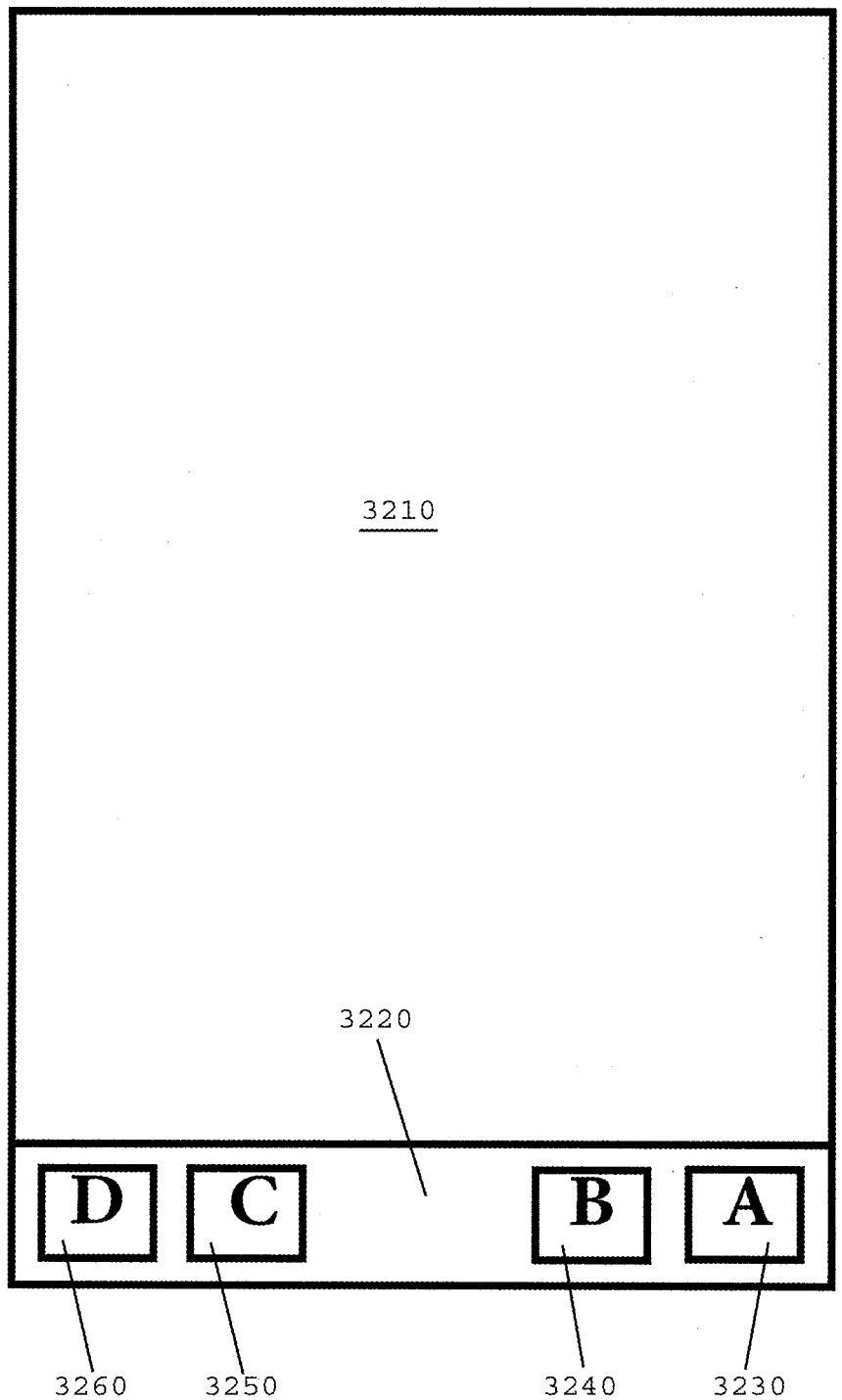
FIG. 32 is a plan view of a mobile device showing the placement of the user-interface digital screen buttons, in accordance with one embodiment of the present patent application.

FIG. 29 is a plan view of a partially-diagrammatic typical display of a mobile screen view showing the placement of the user-interface digital screen buttons;

FIG. 30 is a plan view of a partially-diagrammatic typical display of a mobile screen view showing the placement of the user-interface digital screen buttons;

FIG. 31 is a plan view of a partially-diagrammatic typical display of a mobile screen view showing the placement of the user-interface digital screen buttons;

FIG. 32 is a plan view of a partially-diagrammatic typical display of a mobile screen view showing the placement of the user-interface digital screen buttons.

In mobile software development, it has been the norm for the users to engage with the software by pressing input buttons. These buttons can be located anywhere on the screen. However, it is traditional for some buttons to be on the bottom and some towards the top of the digital screen. For example, if one presses a button to engage in a search functionality on a mobile experience, the search button may be on the bottom, but then an input bar may appear on the upper part of the screen. In other mobile device software, input selection buttons may be prioritized on the bottom or the upper part of the screen, but the user has no way of selecting whether to have the buttons on the top or the bottom. Users are not provided a way of prioritizing whether the buttons should be left or right hand organized on the screen.

In one embodiment, the systems and methods disclosed herein solve the above-described problems. In one embodiment, the systems and methods disclosed herein provide a method for s user to select where they want the input button controls, on the top or bottom, and/or left or right orientation.

In one embodiment, the systems and methods disclosed herein allow the user to select whether the user-interactive buttons are upper, bottom, left or right preference, or any combination thereof.

Mobile devices are commonly used for the use of websites and mobile software applications. The traditional method of software development has placed the user interface buttons at various spots on the display, with a mixed of upper, lower, left and right buttons. Many users of mobile devices use one hand during such operation, and there is no option allowing the users to have control of where the buttons for user involvement are located on the screen. In one embodiment, the systems and methods disclosed herein provide software that allows a user to control whether the buttons are dominant upper, bottom, left and/or right.

In one embodiment, the systems and methods disclosed herein allow users to select and control where the buttons are located on the display screen or visual display of electronic devices such as mobile devices and smart phones.

FIG. 29 demonstrates by way of example a mobile device screen, the large all encompassing rectangle, with an area for user engagement buttons 2920 and buttons identified as A 2930, B 2940, C 2950 and D 2960.

In one embodiment, the user will be able to select a preference for lower buttons interface. The user engagement buttons and/or functions will be in lower portion of the mobile device, as is demonstrated by way of example in FIG. 29.

FIG. 30 demonstrates by way of example a mobile device screen, the large all encompassing rectangle, with an area for user engagement buttons 3020 and buttons identified as A 3030, B 3040, C 3050 and D 3060.

In another embodiment, the user will be able to select a preference for upper buttons interface. The user engagement buttons and/or functions will be in upper portion of the mobile device, as is demonstrated by way of example in FIG. 30.

FIG. 31 demonstrates by way of example a mobile device screen, the large all encompassing rectangle, with an area for user engagement buttons 3120 and buttons identified as A 3130, B 3140, C 3150 and D 3160.

In another embodiment, the user will be able to select a preference for left buttons interface. The user engagement buttons and/or functions will be prioritized for a left-side experience of the mobile device, as is demonstrated by way of example in FIG. 31.

FIG. 30 and FIG. 31 both similarly demonstrate by way of example an upper preference button interface as previously described; however, FIG. 30 demonstrates by way of example an upper, left preference, while FIG. 31 demonstrates by way of example an upper, right preference. In one embodiment, the icon and/or button experience is flipped so that button A 3130 on the right side in FIG. 31 is then placed on the left side when the alternate preference is selected so that the A 3030 icon and/or button now appears on the left side. In another embodiment, any of the other icon(s) and/or button(s) can also be alternated for either a right or left side preference. For example, icon and/or button B 3140 is moved to a different location on the screen as is shown in B 3040. In another embodiment, any of the icon and/or buttons can be moved from the left to the right, and the right to the left, and vice versa, dependent on user preference as is demonstrated between FIG. 30 (A 3030, B 3040, C 3050 and D 3060) versus FIG. 31 (A 3130, B 3140, C 3150 and D 3160). In another embodiment, any of the other icon(s) and/or button(s), whether on the upper or bottom setting, can also be alternated for either a right or left side preference. For example, icon and/or button B 3140 or B 3240 is moved to a different location on the screen as is shown in B 3140 or B 3040. In another embodiment, any of the icon and/or buttons can be moved from the left to the right, and the right to the left, and vice versa, dependent on user preference as is demonstrated between FIG. 29 (A 2930, B 2940, C 2950 and D 2960) versus FIG. 32 (A 3230, B 3240, C 3250 and D 3260).

In one embodiment, the systems and methods disclosed herein provide users with the ability to select, by way of control preference or any method of choosing a choice, to select either an upper or lower buttons and icon preference, and a left or right buttons and icon preference.

The present patent application discloses improved ways for users to select whether they want their user interface buttons on the top or the bottom of the screen, thereby providing a method to customize this important part of use of software and also significantly improving their software use experience.

In one embodiment, the systems and methods disclosed herein allow users to select whether they want an upper or lower button interface, thereby greatly improving the user's ability to engage with the mobile device with one hand.

In one embodiment, the systems and methods disclosed herein allow right or left handed users to select how they want the user interface buttons prioritized. In prior art systems, mobile software has had the buttons set and fixed on the screen. When selecting the order and preference of the buttons, from left to right, the software developer typically sets those buttons in an order setting preference to a particular left or right handed user. In one embodiment, the systems and methods disclosed herein allow a user to flip those buttons, so that whether the user is left-handed or right-handed, the user can have the ideal experience.

In one embodiment, the systems and methods disclosed herein provide a digital device have user customizable locations for the buttons used for user interface input.

In one embodiment, the systems and methods disclosed herein provide for an automated purchase method. In one embodiment, the systems and methods disclosed herein provide an internet user with an automated way of tracking an item's purchase price and executing a purchase.

In one embodiment, the systems and methods disclosed herein enable a user to select a product or item they want to track for price, and then execute the purchase when the price reaches or goes below that amount. In one embodiment, the systems and methods disclosed herein provide a method whereby a user may select a product or item they want to track for a price at a preferred amount, and then get notified when the price reaches or goes below that preferred amount.

There is currently no system in existence that provides a method for a user to track a price of a product or item online, and then automatically execute the purchase.

In one embodiment, the systems and methods disclosed herein provide an ideal system, individually and collectively, to permit a user to get a product or item for a purchase price at or below an amount that they determine.

In one embodiment, the systems and methods disclosed herein enhance the ecommerce experience by giving users a tool to track a price of an item or product, and execute a purchase at a price level the user determines on the onset.

Figure 33:
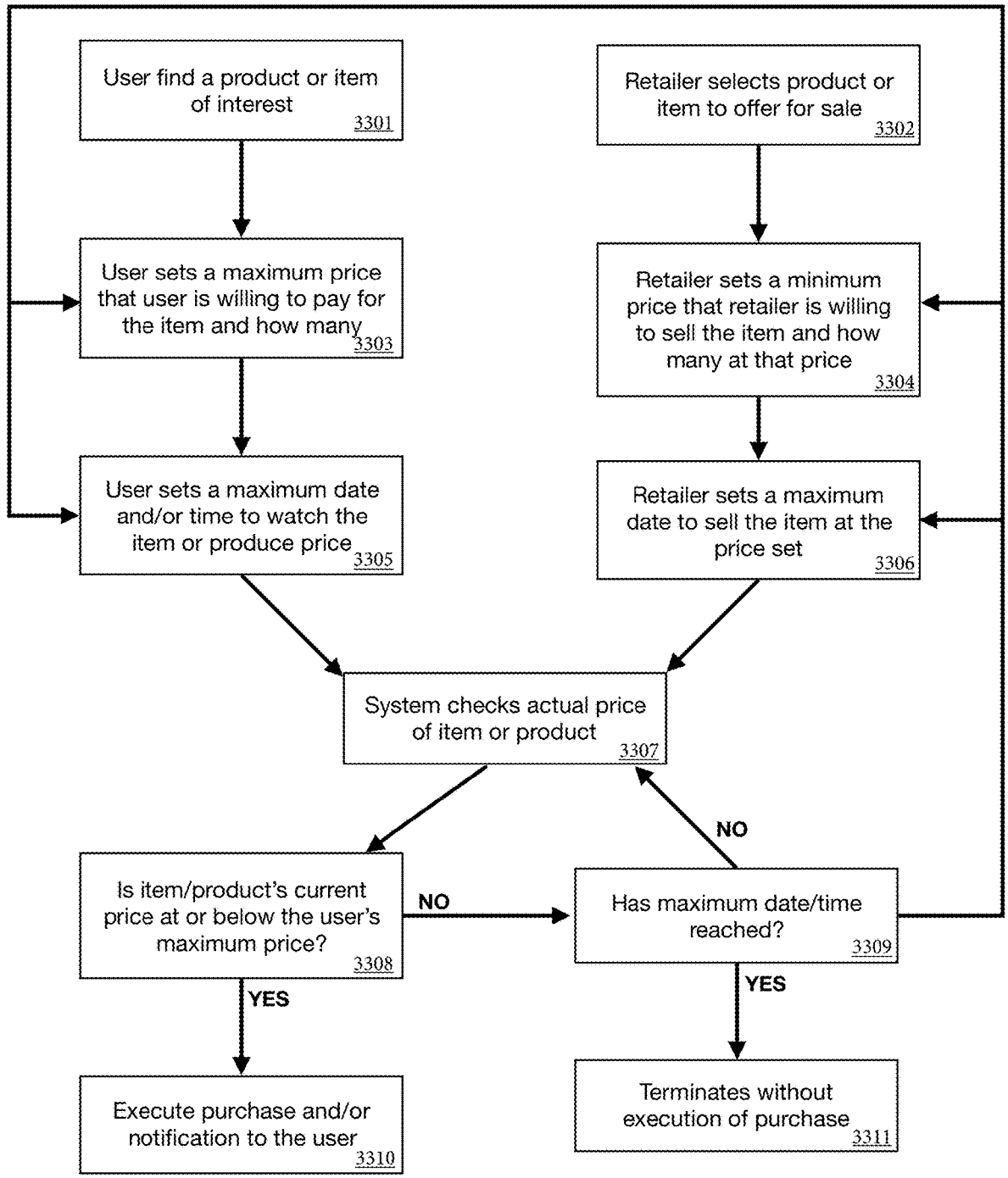
FIG. 33 is a flow diagram showing steps performed when using a gifting system, in accordance with one embodiment of the present patent application.

Referring to FIG. 33, in one embodiment, a software methods allows users to track an item's purchase price, set an automated execution and/or notice upon a price limit being reached, and execute either a notice and/or purchase at that price, within either a predefined time period or no predefined time period.

Items for sale are often sold for a price below the MSRP (Manufacturers Standard Retail Price), its prices can vary from website to website, and its price can vary daily. Also, retailers often add incentives or promotions that fluctuate daily.

In one embodiment, the systems and methods disclosed herein allow users to use the internet to track a product's price fluctuations. In one embodiment, when and if the price reaches a set amount, as determined by the user, the user may receive a notification and/or an order may be immediately executed by the system.

In one embodiment, the user may select the item he or she wishes to track the price for sale. In one embodiment, the user may enter a date range for price tracking, with a start date and an end date. In one embodiment, the user may only select an end date. In another embodiment, the user may only select a start date. In one embodiment, the systems and methods disclosed herein will preferably track the price of the item over the time set (or infinitely long if no time limit was set).

In one embodiment, if the system finds that the price selected by the user is at or below the current sale price, the system sends a notification to the user; notifications can be sent in any method of communication. In another embodiment, if the system finds that the price selected by the user is at or below the current sale price, the system executes a purchase of the item using the payment method selected by the user. In another embodiment, a combination of all the methods is used, including both communication and execution of purchase.

In one embodiment, the retailer, or multiple retailers selling the same item, can be notified that the user has set a limit price for notification and/or execution of purchase. In another embodiment, once the retailer(s) is/are notified of the limit price set by the user, the retailer can drop the price of the item to the limit price as set by the user. If the retailer drops the price of the item to the amount set by the user, an embodiment provides that the user may be notified of that price drop. In another embodiment, once the retailer drops the price to the limit price set by the user, or below such price, the purchase is automatically executed.

In one embodiment, the retailer, or multiple retailers selling the same item, may be notified that the user has set a limit price for notification and/or execution of a purchase. In one embodiment, once the retailer(s) is/are notified of the limit price set by the user, the retailer may agree to and/or actually execute the purchase at the price that the user has set. In one embodiment, the user may provide a payment method to automatically execute payment to the retailer that agrees to the price that is no higher than the price set by the user.

In one embodiment, the consumer or user may set one or multiple items for purchase at a highest amount willing to pay, and the retailer(s) may set one or multiple items for sale with the lowest price point that they are willing to sell the item(s). In one embodiment, the systems and methods disclosed herein may be analogous to the New York Stock Exchange methodology whereby stock buyers set their maximum purchase price and stock sellers set their lowest selling price.

It is customary for ecommerce platforms to display products in a variety of ways. In one embodiment, the social media associated with the product may be a link associated with the product. For example, a product is displayed to the user, with a name, picture and/or description, and a link is associated with the item. If the user selects the link, the social media described herein is displayed.

In another embodiment, when a product or item is selected by the user, the user is shown on the visual display both the item and the social media feed. In smaller displays, or an alternate format, the product and social media are on separate pages but linked together.

Figure 34:
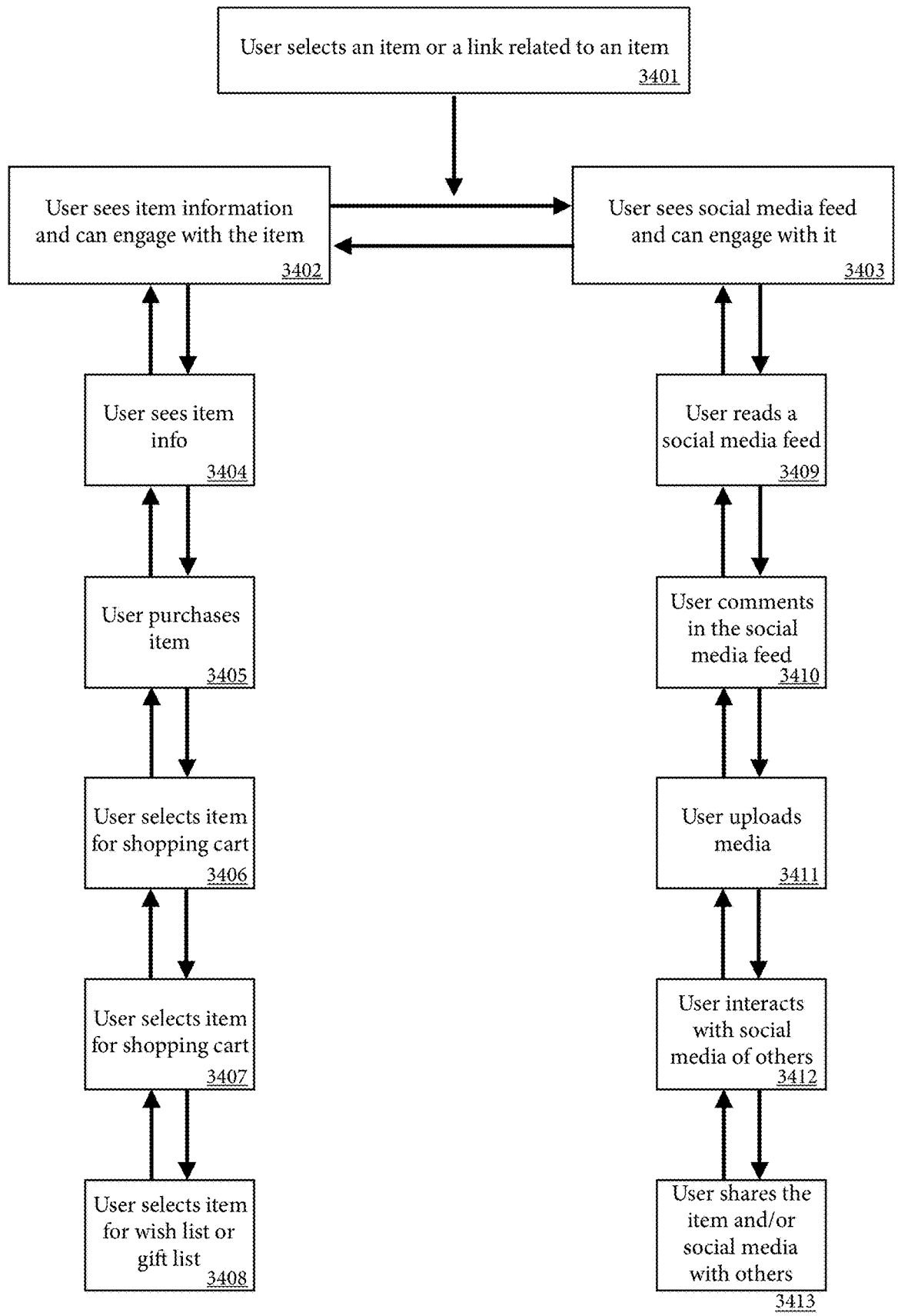
FIG. 34 is a flow diagram showing steps performed when using a gifting system, in accordance with one embodiment of the present patent application.

Referring to FIG. 34, in one embodiment, a user selects the product or item 3401. The item is displayed to the user, 3402 (FIG. 34) and the related social media, 3403 (FIG. 34). An example of this visual format is shown in FIG. 27. Both of these, the item and the social media, are interactable by the user. For example, the user can both engage with 3401 (FIG. 34) and 3402 (FIG. 34). Product description, price, pictures, and the many methods of displaying a product itself are not by themselves part of this invention. Instead, the systems and methods disclosed herein are focused on the combination of social media with specific products or items. A user of the systems and methods disclosed herein will be able to see the various aspects of item information, such as price, options, description and pictures, and make a purchase of the item, enter the item in the shopping cart, select the item for wish list, select the item for gifting, 3402, 3404, 3405, 3406, 3407 and 3408 (FIG. 34), and simultaneously see, engage and participate in social media related to that specific item, 3403 (FIG. 34). This social media connected with the specific item may include but is not limited to reading other social media posts from others, posting social media comments, sharing photographs and other media, interacting with the social media, sharing the social media, and sharing the item information, 3409, 3410, 3411, 3412 and 3413 (FIG. 34).

In another embodiment, the social media associated with an item is linked to a specific SKU (Stock Keeping Unit) or UPC (Universal Product Code) number. In this way, whenever a user selects a particular item, its unique SKU or UPC number is identified; the system then connects the SKU or UPC number with a specific social media feed, and this social media feed is made available to display to the user.

In another embodiment, the social media associated with an item is linked with a specific identifying marker. In this way, whenever a user selects a particular item, its specific identifying marker is identified; the system then connects the identifying marker with a specific social media feed, and this social media feed is made available to display to the user.

In another embodiment, the social media associated with an item is linked to both an identifying marker and a specific retailer. In this way, whenever a user selects a particular item from a specific retailer, its specific identifying marker is identified; the system then connects the identifying marker and a specific retailer with a specific social media feed, and this social media feed is made available to display to the user.

Referring to FIGS. 35-38, in one embodiment, items in a list, such as a gift list selected by a gift recipient, may be locked together by retailers and/or users. FIGS. 35-38 show a hypothetical gift list, which is identified as List 1. The items on List 1 may have one or more items. In FIGS. 35-38, six items are displayed on List 1 from three different retailers. The items identified as Items 1, 3 and 6 are from Retailer A, the items identified as Items 2 and 5 are from Retailer B, and the item identified as Item 4 is from Retailer C. As used herein, the term item means an actual product or item that may be included in List 1.

In one embodiment, the term Retailer means an actual retailer that is selling the items. In one embodiment, Retailer A is a representative name of an actual retailer, and the identifiers A, B and C in FIGS. 35-38 represent three retailers. The numbers 1-6 located adjacent the boxes identify the priority order for the items on the list. In one embodiment, Item 1/Retailer A is the first priority item for gifting, Item 2/Retailer B is the second priority item for gifting, etc.

Figure 36:
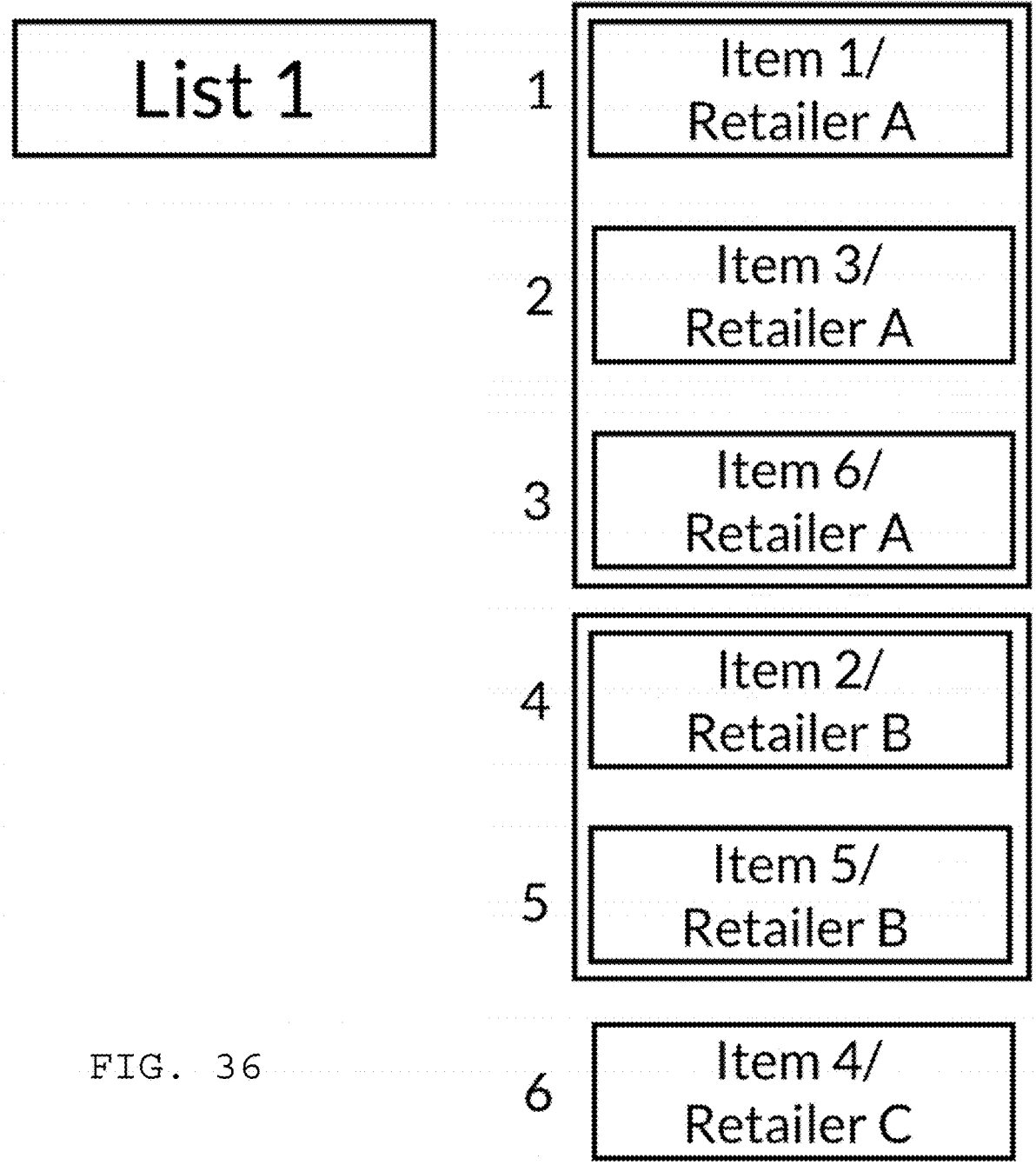
FIG. 36 shows a method for locking items together, in accordance with one embodiment of the present patent application.

In one embodiment, List 1 may encompass one or more gift items. Referring to FIG. 36, in one embodiment, List 1 contains six items. In one embodiment, a user, a gift recipient, and/or a gift contributor may add the items to List 1. In one embodiment, the items on List 1 are shown in the chronological order that the user placed the items on List 1. In one embodiment, the items on List 1 are shown in a priority ranking or order that is selected by a user. In one embodiment, the items on List 1 may be placed and shown in any order possible.

In one embodiment, the user may authorize and/or allow the system to automatically order and organize the items by Retailer. In one embodiment, if the user selects to organize by Retailer, the system reorganizes the order so that the items on List 1 that are from the same Retailer are bunched together. FIG. 36 shows one embodiment whereby the items from the list are ordered by Retailer. In one embodiment, the items sold by Retailer A are represented by numbers 1, 2, and 3 on List 1. Items from Retailer B are represented by numbers 4 and 5 on List 1. The item from Retailer C is represented by number 6 on List 1. Thus, the List 1 shown in FIG. 36 is reordered from the list shown in FIG. 35 so that items shown in FIG. 36 are listed in Retailer order. In one embodiment, a user may authorize or allow the system to lock the list by Retailer so that Items 1, 3 and 6 form Retailer A are locked together, Items 2 and 5 from Retailer B are locked together, and Item 4 from Retailer C is not locked with any other item. In one embodiment, a user may select which items to lock together, whereby the items are not locked together by retailer. In one embodiment, a user may lock items together regardless of whether they are sold by the same retailer or not.

Figure 37:
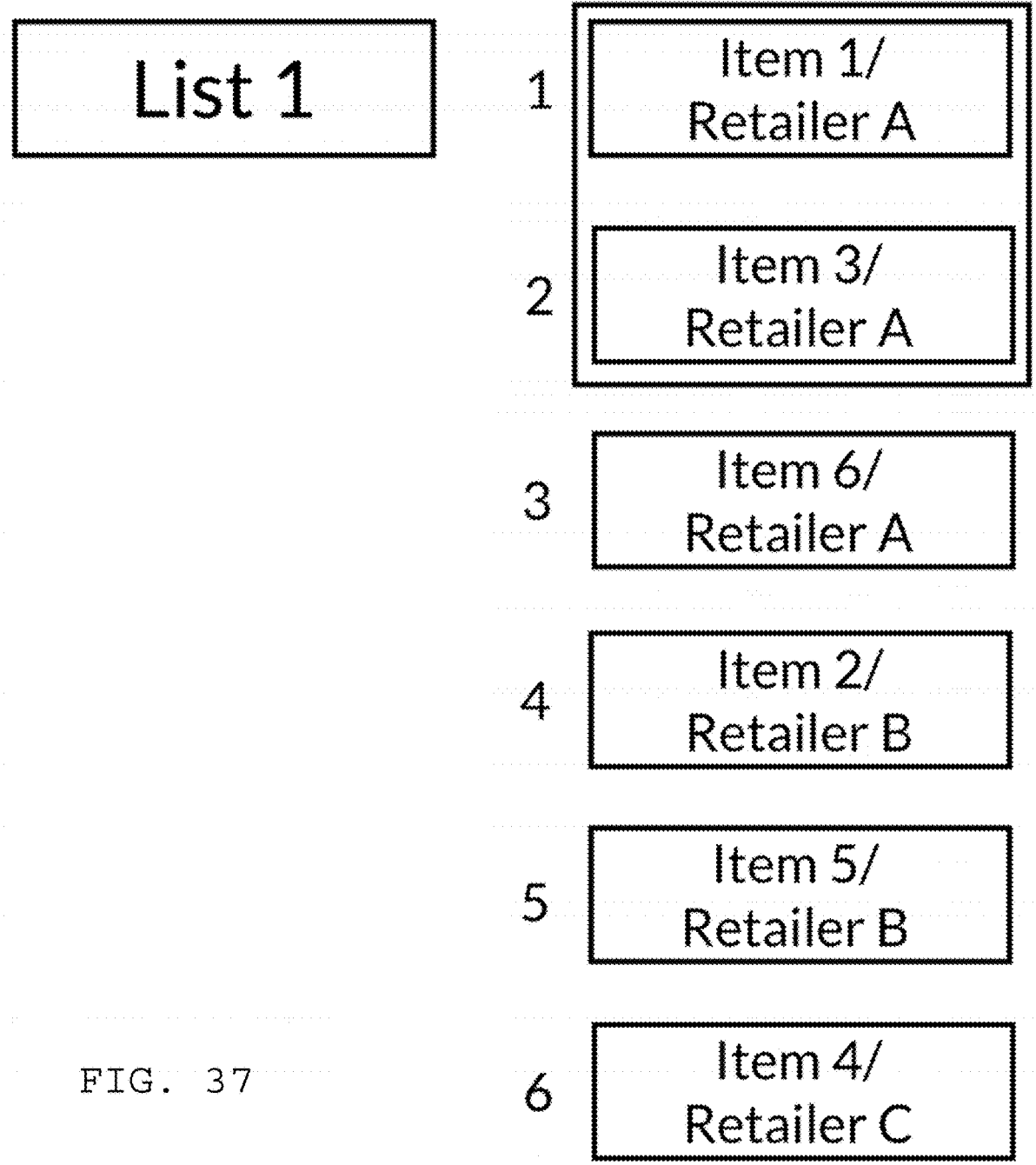
FIG. 37 shows a method for locking items together, in accordance with one embodiment of the present patent application.

Referring to FIG. 37, in one embodiment, the items on List 1 may be locked from an unlocked status, or unlocked from a locked status. In one embodiment, the system may be utilized to lock the items together by a retailer or several retailers. In one embodiment, the items that were locked, some or all, were unlocked by the user. FIG. 36 shows Items 1, 3 and 6 sold by Retailer A locked together, and Items 2 and 5 sold by Retailer B locked together. In one embodiment, a user may unlock the locked items. FIG. 37 shows an example of items (i.e., Items 1, 3, and 6) that were locked by Retailer in FIG. 36, but are shown as unlocked in FIG. 37. In FIG. 37, item 6 has been unlocked so that item 6 is no longer locked with items 1 and 3. In addition, items 2 and 5 are locked together in FIG. 36 but have been unlocked from one another in FIG. 37. In one embodiment, a user may lock items back together after they have been unlocked. In one embodiment, a user may lock only certain items together, but leave other items unlocked.

Figure 35:
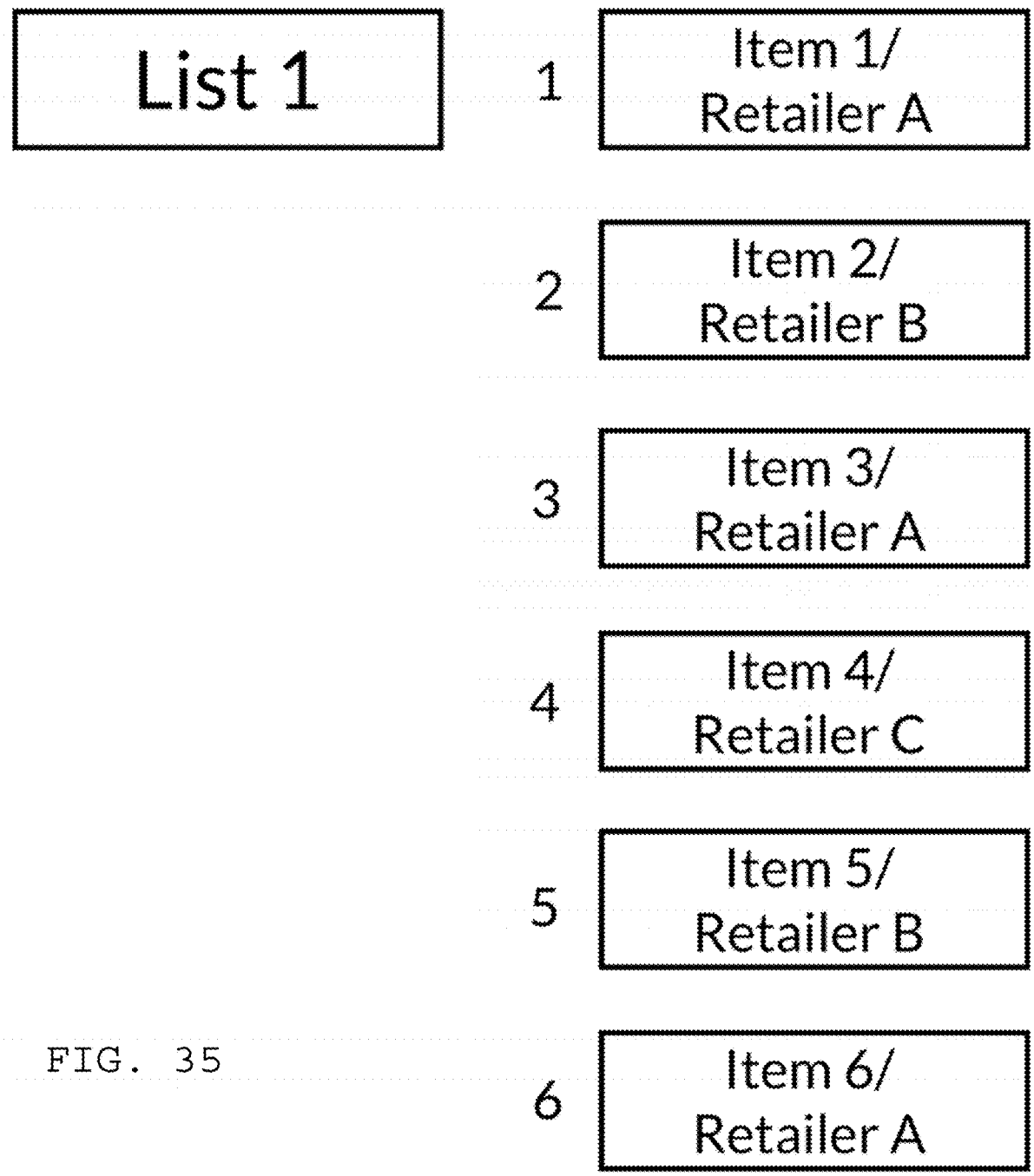
FIG. 35 shows a method for locking items together, in accordance with one embodiment of the present patent application.

In one embodiment, the items on List 1 may be moved and reorganized on the list in any order selected by a user. In one embodiment, a user may move an item having a #1 priority to an item having a #5 priority, an item having a #4 priority to an item having a #3 priority, and an item having a #3 priority to an item having a #6 priority, and any other possible combinations. Referring to FIG. 35, in one embodiment, a user may move Item 6 to the priority #1 slot, whereby Item 1 will be pushed down to the priority #2 slot, and so forth. In one embodiment, a user may drag any of the items into any one of the positions on List 1. In one embodiment, a user may enter a number for a priority slot. In one embodiment, a user may move the items and change their priority in any manner possible.

Figure 38:
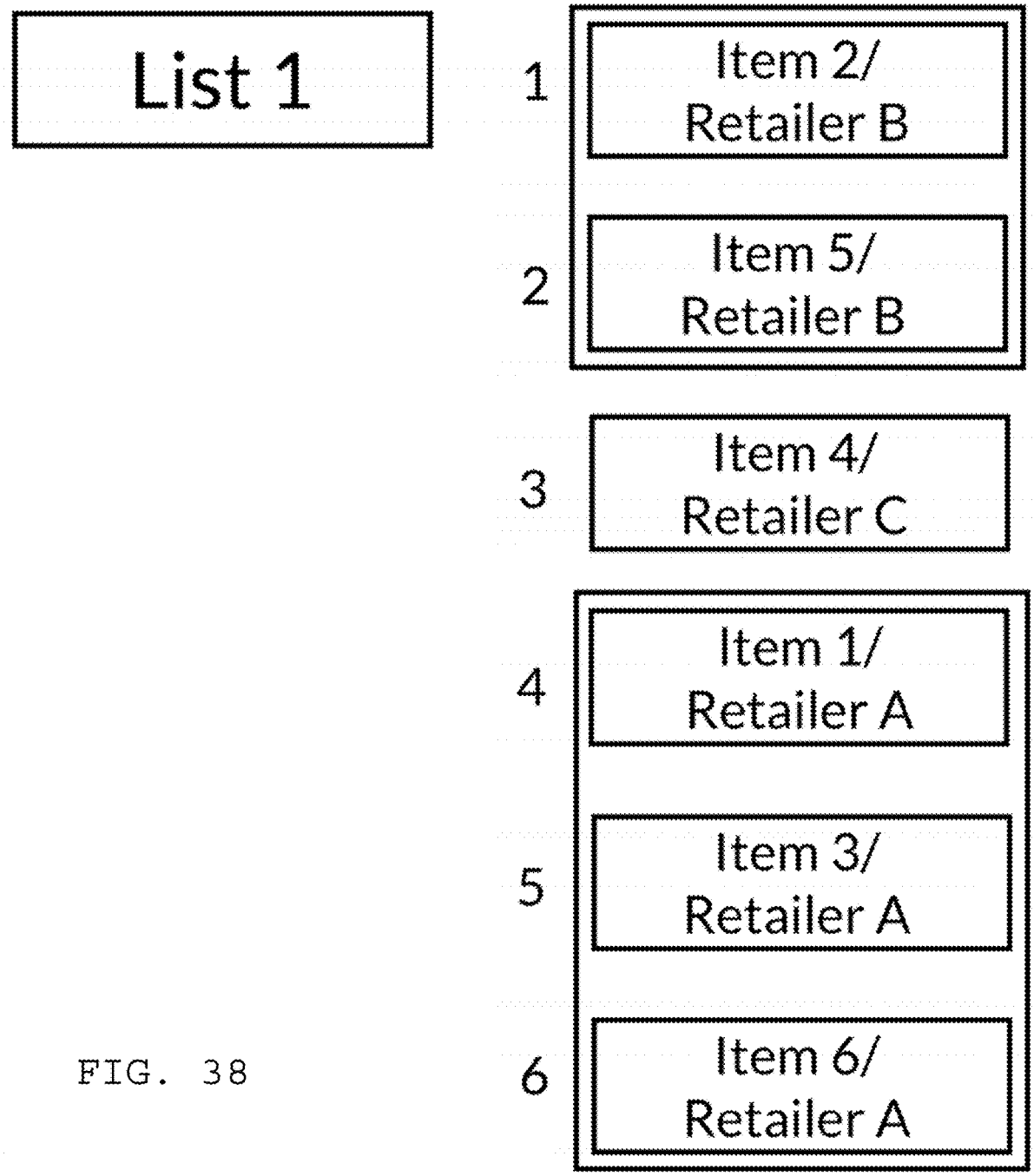
FIG. 38 shows a method for locking items together, in accordance with one embodiment of the present patent application.

In one embodiment, items that are locked together on List 1 are moved together when establishing higher and lower priority slots on List 1. FIG. 36 shows Items 1, 3 and 6 sold by Retailer A locked together, and Items 2 and 5 sold by Retailer B locked together, and Item 4 from Retailer C not locked with any other item. In one embodiment, a user may drag the locked items together and change their priority as a group. In one embodiment, a user may enter a number for a priority slot, and the group will move together to the selected priority slot. In one embodiment, a user may move the items and change their group priority in any manner possible. In one embodiment, FIG. 36 shows a first stage and FIG. 38 shows a second stage, whereby a user has moved items that are locked together as a group. From FIG. 36 to FIG. 38, a user dragged or moved the locked group of Items 1, 3 and 6 down from priority slot numbers 1, 2 and 3, respectively, to priority slot number 4, 5 and 6. In turn, the other items on List 1 moved up in priority on List 1. In one embodiment, changing the priority order of the items may occur if a user drags any of the items in a locked group, causing all the items in the locked group to move together. In one embodiment, a user may change the priority order of the items that are locked together in a group. For example, Items 1, 3, and 6 in a locked group may have the order changes so that Item 6 is the first listed item in a locked grouping, followed by Item 1, which is followed by Item 3. In one embodiment, a user may move the items in a locked group together and change their priority within the locked grouping in any manner possible.

In one embodiment, a system may have multiple lists (e.g., List 1, List 2, List 3, etc.), whereby each list operates as set forth herein for List 1. In one embodiment, items that are locked together on one list may be dragged from one list to another list, and will remain locked as they are dragged between the lists.

The systems and methods disclosed here improve efficiency and savings for both retailers and consumers. Locking items by retailer allows for the items to be shipped together. It is the custom and practice of retailers in ecommerce to provide free shipping or discounted shipping once an order total exceeds a certain amount. Single items that do not reach this discounted shipping threshold will incur shipping charges. By locking the items together using the systems and method disclosed herein, retailers will ship the items once all of the linked items are purchased, thereby resulting in a shipping charge based on the total purchase of all the items that were locked together. This system provides a way for individuals to bundle items together to get discounted shipping. This system also benefits retailers because the efficiency of bundling items together increases their productivity and ultimately their profitability.

In one embodiment, the systems and methods disclosed herein provide users with flexibility and control over how they want their items shipped, whether individually or collectively in groups. In one embodiment, a user may select which items supplied by the same retailer will be shipped together, which gives the user more control over their delivery and how they obtain the purchased items. Users may select to lock only some of the items sold by the same retailer on a list, or all the items sold by that retailer, and once the items are locked the user may easily manage the list by changing the order of these items on a list by moving all the locked items together, increasing efficiency, practicality, and ease of use.

In one embodiment, the systems and methods disclosed herein also benefit retailers, because users of the lock systems and methods will have ways to save on shipping by bundling items together, thereby encouraging adding more items to the list and making more sale transactions. The flexibility of the system and methods gives users additional control over their items on their lists, increases use functionality, and enhances the management of items on lists.

In one embodiment, the systems and methods disclosed herein provide a simplified method for a person to track an item's sale price and purchase the item at a maximum price that the user defines. In one embodiment, the systems and methods disclosed herein enable purchasers and sellers to engage in commerce and exchange items for a value that is acceptable to both buyer and seller.

In one embodiment, the systems and methods disclosed herein track prices, keep consumers aware of daily price fluctuations, and keep sellers aware of consumer demand and price-point interest in items for sale.

In one embodiment, the systems and methods disclosed herein provide users with the ability to track an item's or product's purchase price on the internet for daily price fluctuations, and then execute a transaction (or notification) upon the price reaching a certain level at or below the predetermined price by the user, thereby allowing users to purchase items for a price at or below what the user wants.

In one embodiment, the present patent application discloses systems and methods for a retailer or seller to be aware of what price the customer is willing to pay and make a sale transaction at a price point agreeable to both the retailer and consumer.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A computer-implemented method of purchasing items comprising:
    under control of one or more configured computing systems; enabling a user to create a list having items that are sold by retailers;
    enabling the user to lock together any of the items on the list that are sold by a first retailer;
    enabling the user to prioritize the items on the list from a highest ranked item to a lowest ranked item, wherein the items on the list that are locked together by the first retailer move together up and down the list as the list is re-prioritized;
    dividing each of the items on the list into two or more parts, wherein each of the two or more parts has a monetary value assigned thereto;
    enabling one or more contributors to purchase one or more of the parts of the items on the list at the monetary value assigned thereto;
    authorizing the one or more contributors to purchase one of the parts of a lower ranked item on the list only after all of the parts of a higher ranked item on the list have been purchased;
    after dividing a selected one of the items into the two or more parts, displaying the selected one of the items on a visual display by
    generating a boundary on the visual display that defines a bounded area,
    showing an image of the selected one of the items on the visual display, wherein the image of the selected one of the items is located within the bounded area and is surrounded by the boundary,
    generating at least one dividing line inside the bounded area that divides the bounded area into the two or more part sections of the selected one of the items that are visible on the visual display, wherein each of the two or more parts is assigned to a different one of the part sections.

2. The method as claimed in claim 1, further comprising:
    locking together any of the items on the list that are sold by a second retailer, wherein the items on the list that are locked together by the second retailer move together up and down the list as the list is re-prioritized.

3. The method as claimed in claim 2, further comprising:
    creating a second list having items that are sold by retailers;
    moving the items that are locked together by the first retailer from the first list to the second list.

4. The method as claimed in claim 3, prioritizing the items on the second list from a highest ranked item to a lowest ranked item, wherein the items on the list that are locked together by the first retailer move together up and down the second list as the second list is re-prioritized.

5. The method as claimed in claim 1, further comprising:
creating multiple lists, each of the multiple lists having items that are sold by retailers;
for each list, locking together the items on the each list that are sold by a single retailer;
moving the locked items from the first list to a second list, wherein the locked items from the first list remain together as they are moved from the first list to the second list;
moving the locked items from the second list to the first list, wherein the locked items from the second list remain together as they are moved from the second list to the first list.

6. The method as claimed in claim 5, further comprising after moving the locked items on the first list to the second list, re-prioritizing the order of the items on the second list, wherein the locked items that have been moved from the first list to the second list move together up and down in priority as the second list is re-prioritized.

7. The method as claimed in claim 1, further comprising:
after all of the parts of the higher ranked item on the list have been purchased, shipping the higher ranked item to a purchaser or a recipient.

8. The method as claimed in claim 1, further comprising:
displaying the monetary value for each of the two or more parts that are visible on the visual display.

9. A computer-implemented method of purchasing items comprising:
under control of one or more configured computing systems, creating a list having items that are sold by retailers;
sorting the list so that the items on the list that are sold by a common retailer are located adjacent one another on the list;
locking the sorted list so that the items that are sold by the common retailer are locked together in a locked group;
prioritizing the items on the list from a highest ranked item to a lowest ranked item, wherein the items on the list that are locked together in the locked group move together up and down the list as the list is re-prioritized;
dividing each of the items on the list into two or more parts, wherein each of the two or more parts has a monetary value assigned thereto;
enabling one or more contributors to purchase one or more of the parts of the items on the list at the monetary value assigned thereto;
authorizing the one or more contributors to purchase one of the parts of a lower ranked item on the list only after all of the parts of a higher ranked item on the list have been purchased;
after dividing a selected one of the items into the two or more parts, displaying the selected one of the items on a visual display by
generating a boundary on the visual display that defines a bounded area,
showing an image of the selected one of the items on the visual display, wherein the image of the selected one of the items is located within the bounded area and is surrounded by the boundary,
generating at least one dividing line inside the bounded area that divides the bounded area into the two or more part sections of the selected one of the items that are visible on the visual display, wherein each of the two or more parts is assigned to a different one of the part sections.

10. The method as claimed in claim 9, further comprising moving the locked group from the first list to a second list, wherein the items in the locked group move together between the first list and the second list.

11. The method as claimed in claim 10, wherein the locked group is moveable automatically using code or manually by dragging the locked group from the first list to the second list, and wherein the locked group is moveable up and down the list automatically using code or manually by dragging the locked group.

12. The method as claimed in claim 9, further comprising:
displaying the monetary value for each of the two or more parts of the selected one of the items that are visible on the visual display.

13. A computer-implemented method of purchasing products comprising:
under control of one or more configured computing systems, enabling a user to create a list having products that are sold by retailers;
enabling the user to prioritize the products on the list from a highest ranked product to a lowest ranked product;
dividing each of the products into two or mere product parts;
assigning a monetary value to each of the two or more product parts;
enabling one or more contributors to purchase one or more of the product parts of the products on the list at the monetary value assigned to each of the product parts;
authorizing the one or more contributors to purchase one of the product parts of a lower ranked product on the prioritized list only after all of the product parts of a higher ranked product on the prioritized list have been purchased;
after dividing a selected one of the products into the two or more product parts, displaying the selected one of the products on a visual display by
generating a boundary on the visual display that defines a bounded area,
showing an image of the selected one of the products on the visual display, wherein the image of the selected one of the products is located within the bounded area and is surrounded by the boundary,
generating at least one dividing line inside the bounded area that divides the bounded area into two or more product part sections that are visible on the visual display, wherein each of the two or more product parts is assigned to a different one of the product part sections.

14. The method as claimed in claim 13, further comprising:
displaying the monetary values for each of the two or more product parts on the visual display.

* * * * *